United States Patent [19]

Pitroda et al.

[11] 4,256,926
[45] Mar. 17, 1981

[54] MICROPROCESSOR CONTROL COMPLEX FOR A TELECOMMUNICATION SWITCHING SYSTEM

[75] Inventors: Satyan G. Pitroda, Villa Park; William A. Fechalos, Naperville; Carl J. Stehman, LaGrange, all of Ill.

[73] Assignee: Wescom Switching, Inc., Oakbrook, Ill.

[21] Appl. No.: 842,091

[22] Filed: Oct. 17, 1977

Related U.S. Application Data

[63] Continuation-in-part of Ser. No. 734,732, Oct. 21, 1976, abandoned.

[51] Int. Cl.³ .................. G06F 15/16; H04M 3/22; H04Q 11/04
[52] U.S. Cl. .................. 179/18 ES; 179/18 EE; 179/18 ET; 179/175.2 C; 364/200; 370/58
[58] Field of Search .......... 179/18 ET, 18 DA, 18 D, 179/18 B, 18 ES, 15 AT, 15 AQ, 175.2 C, 18 EE; 370/58; 364/200

[56] References Cited

U.S. PATENT DOCUMENTS

| 3,631,405 | 12/1971 | Hoff et al. ............... 364/200 |
| 3,721,769 | 3/1973 | Krock et al. ............ 179/18 AD |
| 3,838,261 | 9/1974 | Rice et al. ............ 179/18 ES X |
| 3,898,621 | 8/1975 | Zelinski et al. ............ 364/200 |
| 3,924,081 | 12/1975 | Rohrig et al. ............ 179/18 EB |
| 3,969,701 | 7/1976 | Hemdal ............ 179/18 ES X |
| 3,974,343 | 8/1976 | Cheney et al. ............ 179/18 ES |
| 3,978,455 | 8/1976 | Valassis et al. ............ 340/172.5 |
| 3,997,874 | 12/1976 | Kelly et al. ............ 179/15 AT X |
| 4,010,326 | 3/1977 | Schwartz ............ 179/15 BA |
| 4,021,783 | 5/1977 | Highberger ............ 340/172.5 |
| 4,031,328 | 6/1977 | Pitroda ............ 179/18 BC |
| 4,074,072 | 2/1978 | Christensen et al. ....... 179/18 ES X |
| 4,095,054 | 6/1978 | Anizan et al. ............ 179/18 ES |

OTHER PUBLICATIONS

"New Digital Electronic PABX Family" by Ronald C. Garavalia, GTE Automatic Electric Journal, May 1977, pp. 303–311.

Primary Examiner—Thomas W. Brown
Attorney, Agent, or Firm—Leydig, Voit, Osann, Mayer & Holt, Ltd.

[57] ABSTRACT

A microprocessor control complex for a telecommunications switching system disclosed in the context of a digital time division multiplex switching system. The control complex is arranged as a cluster of hardware identical microprocessors in a distributed processing configuration wherein each microprocessor is provided with its own memory and clock and is programmed to perform a portion of the total function of the switching system. Each microprocessor performs the functions assigned to it independently and asynchronously of the others. Data is transferred between microprocessors in a manner which minimizes the amount of time spent in interprocessor communication. This communication is accomplished via interprocessor buffers which provide dedicated communication channels between partner processors while allowing those processors to continue to operate asynchronously. The distributed control complex allows the software to be modularized with resulting economies in program generation and debugging.

62 Claims, 47 Drawing Figures

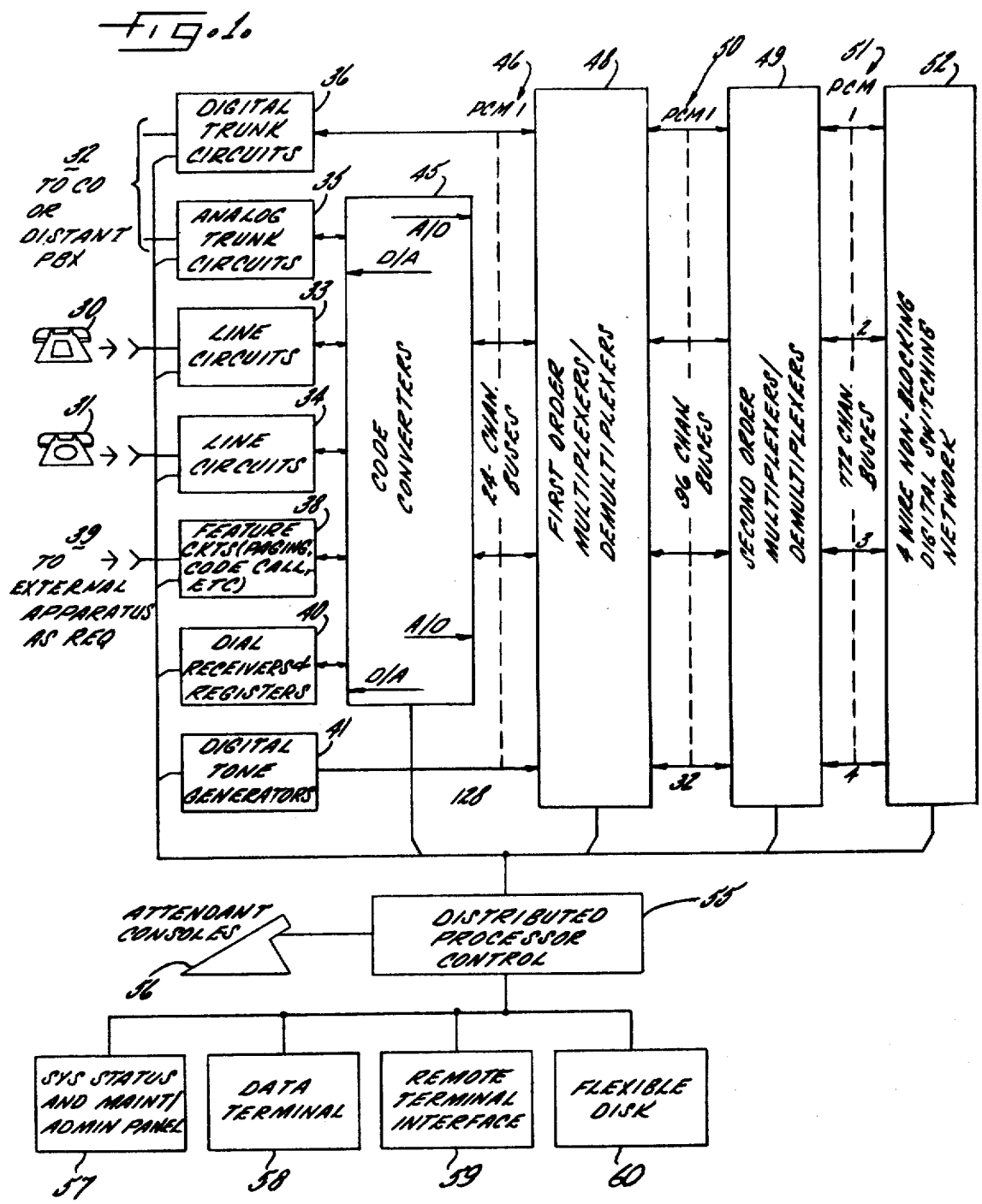

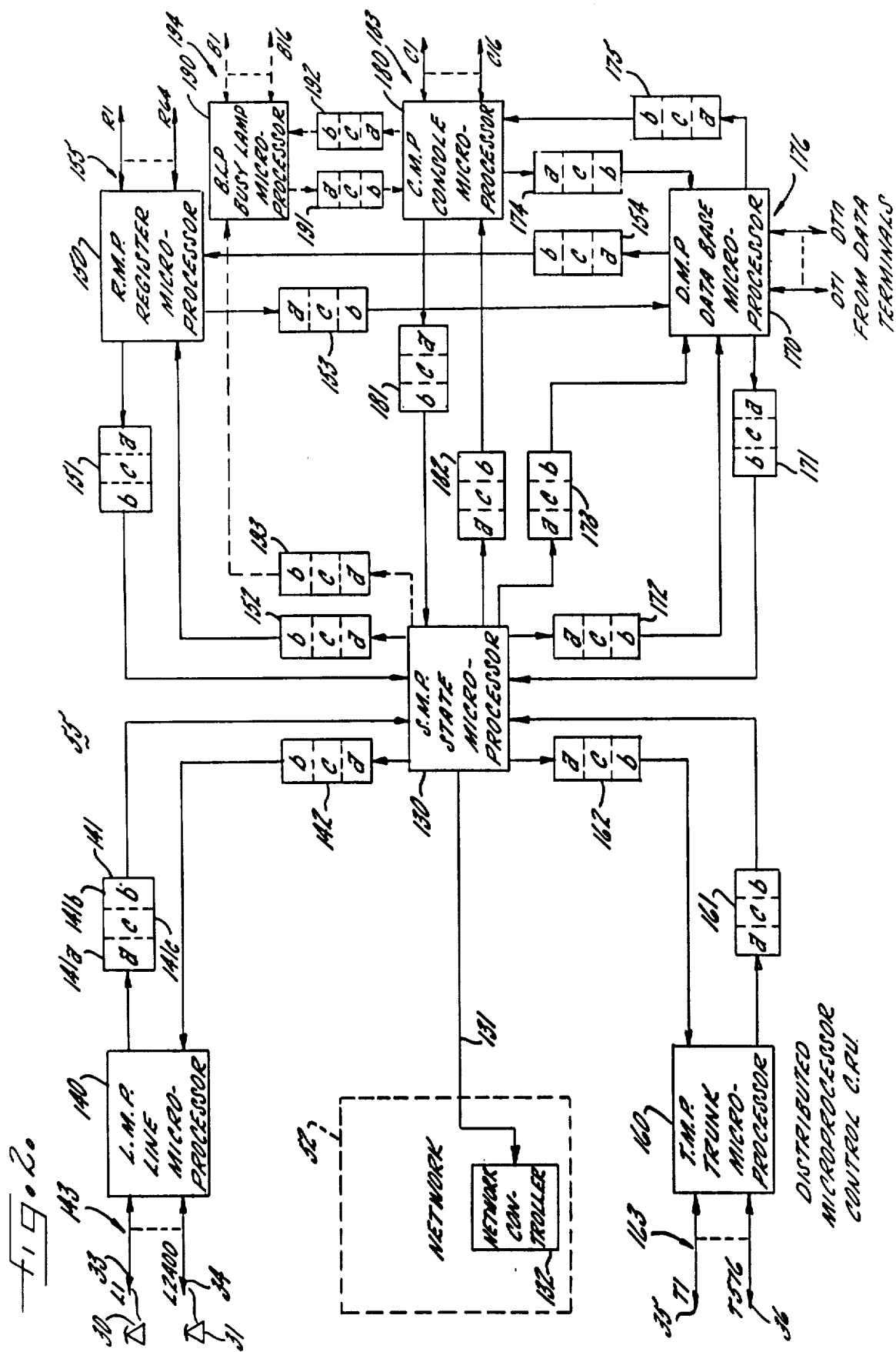

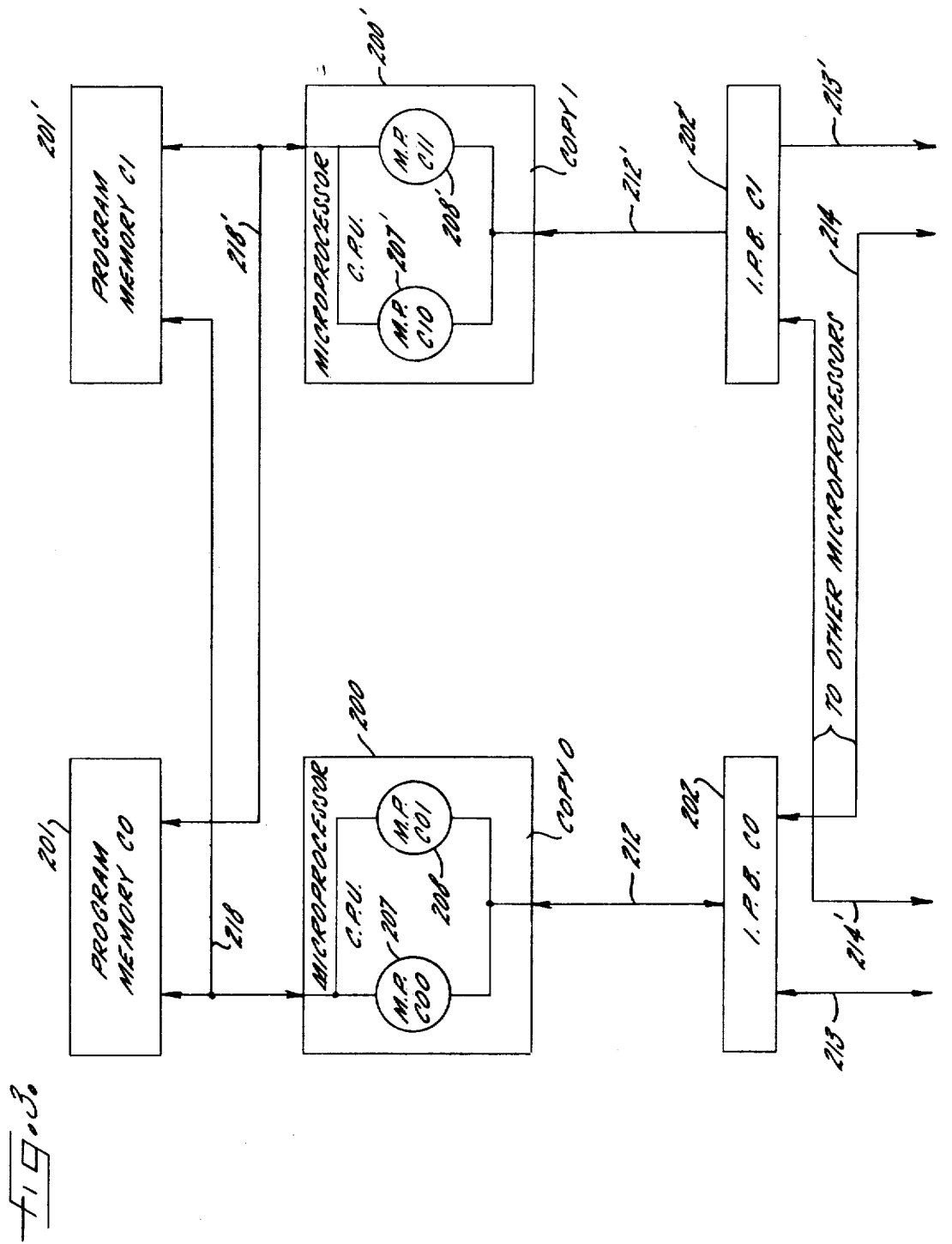

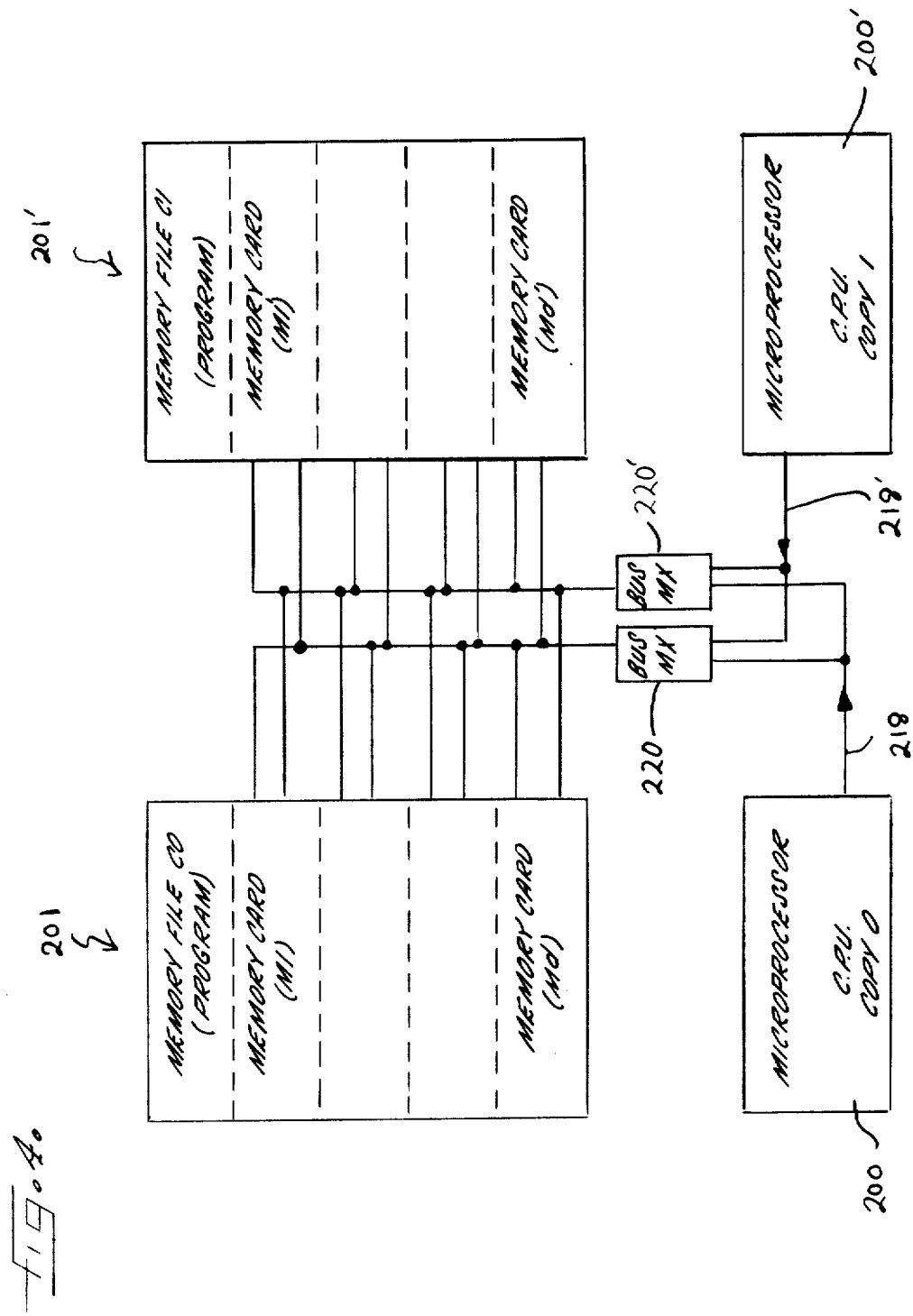

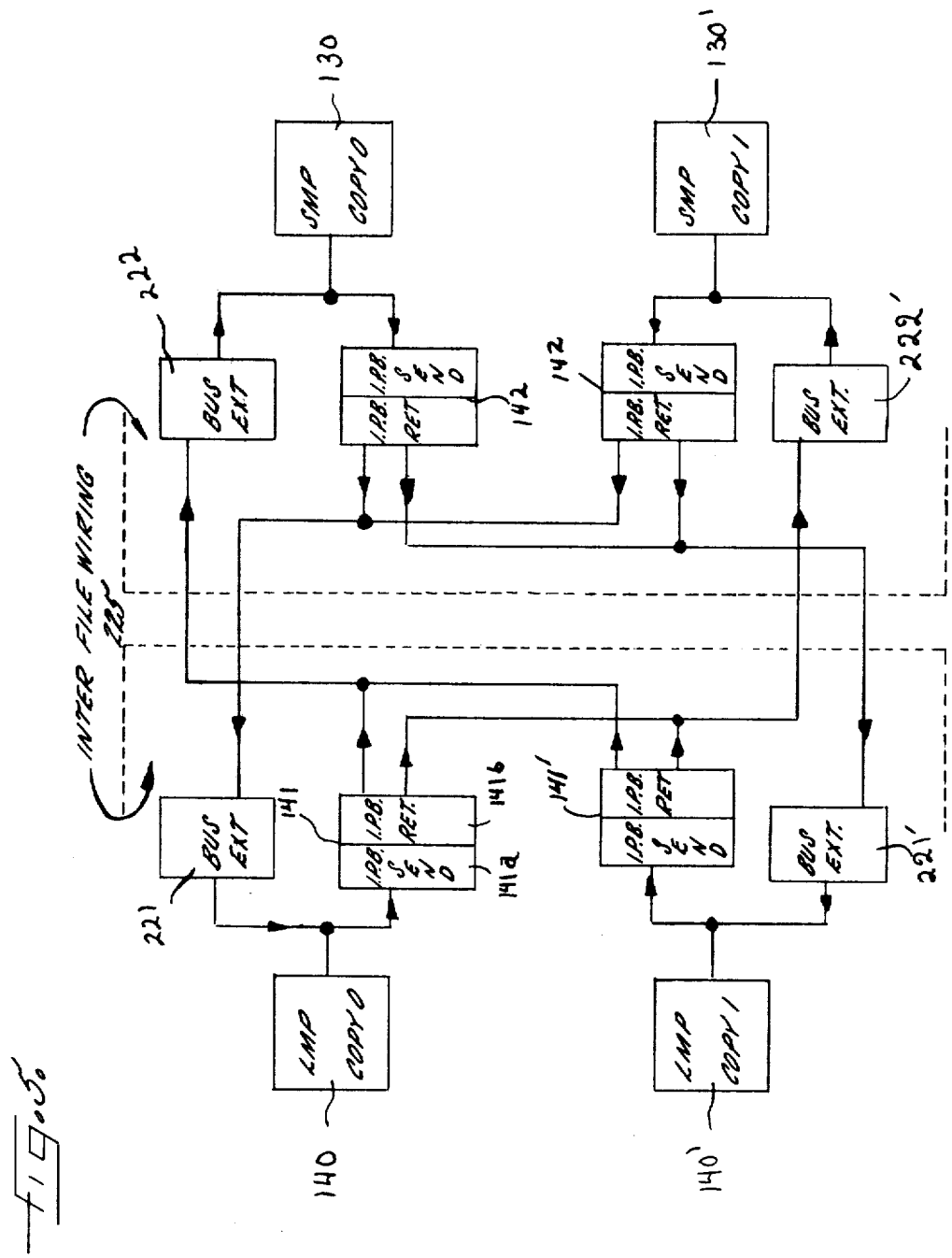

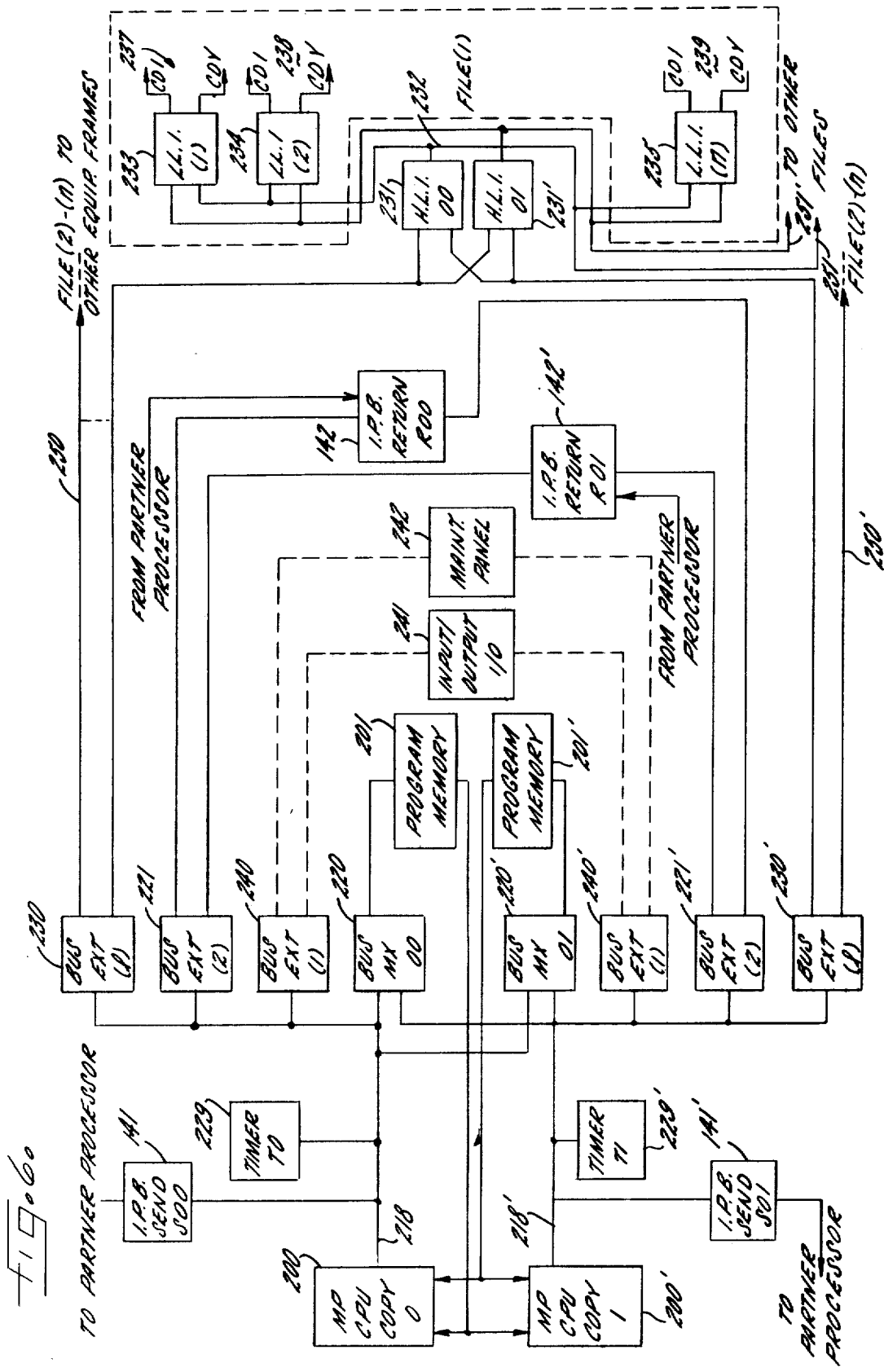

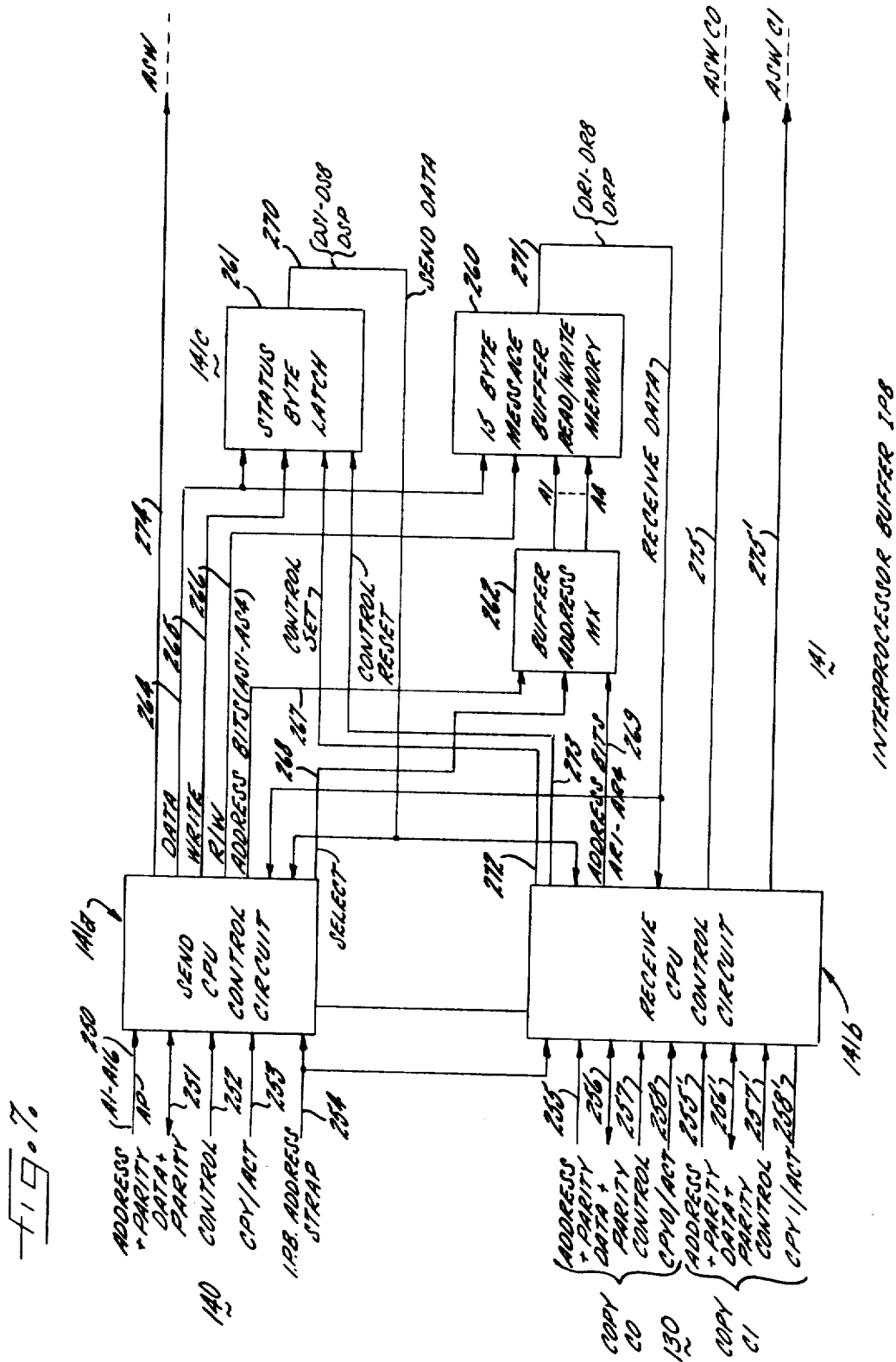

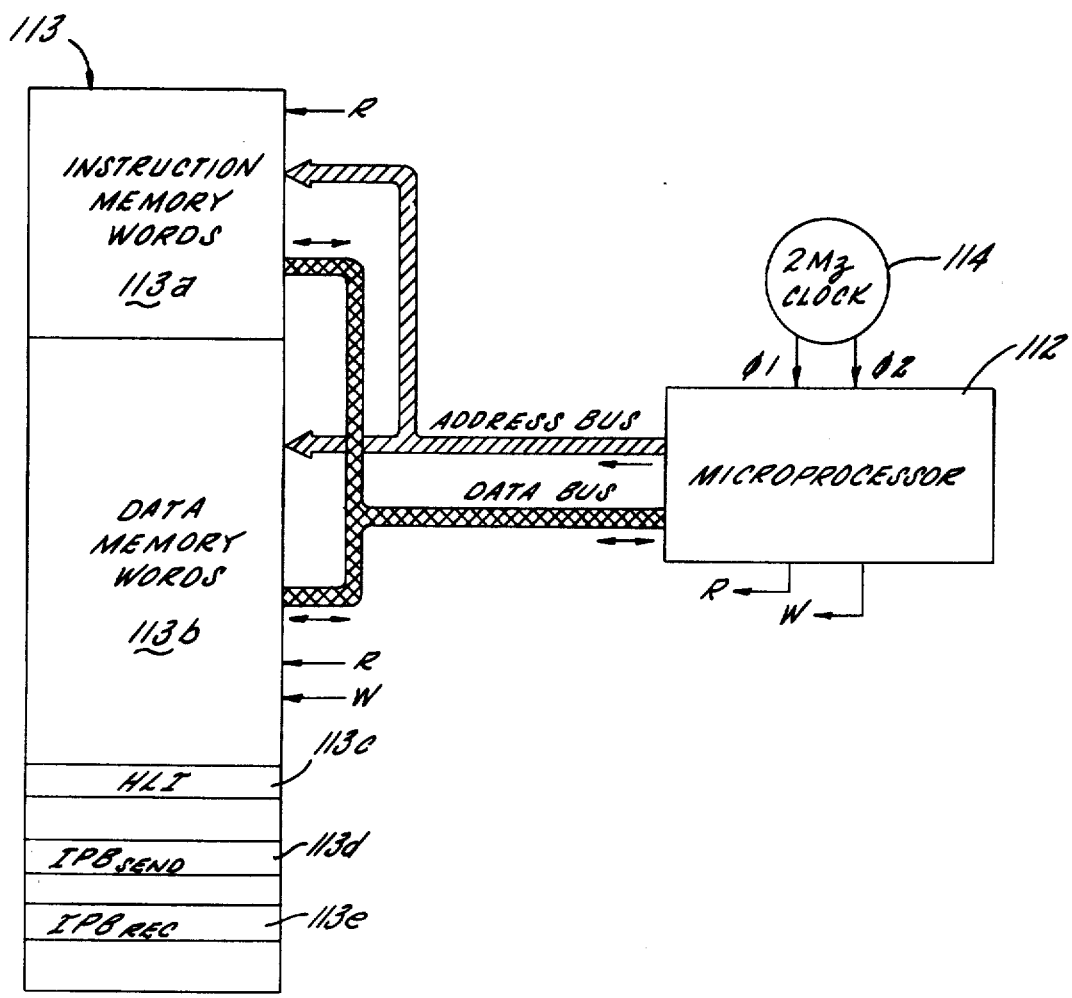

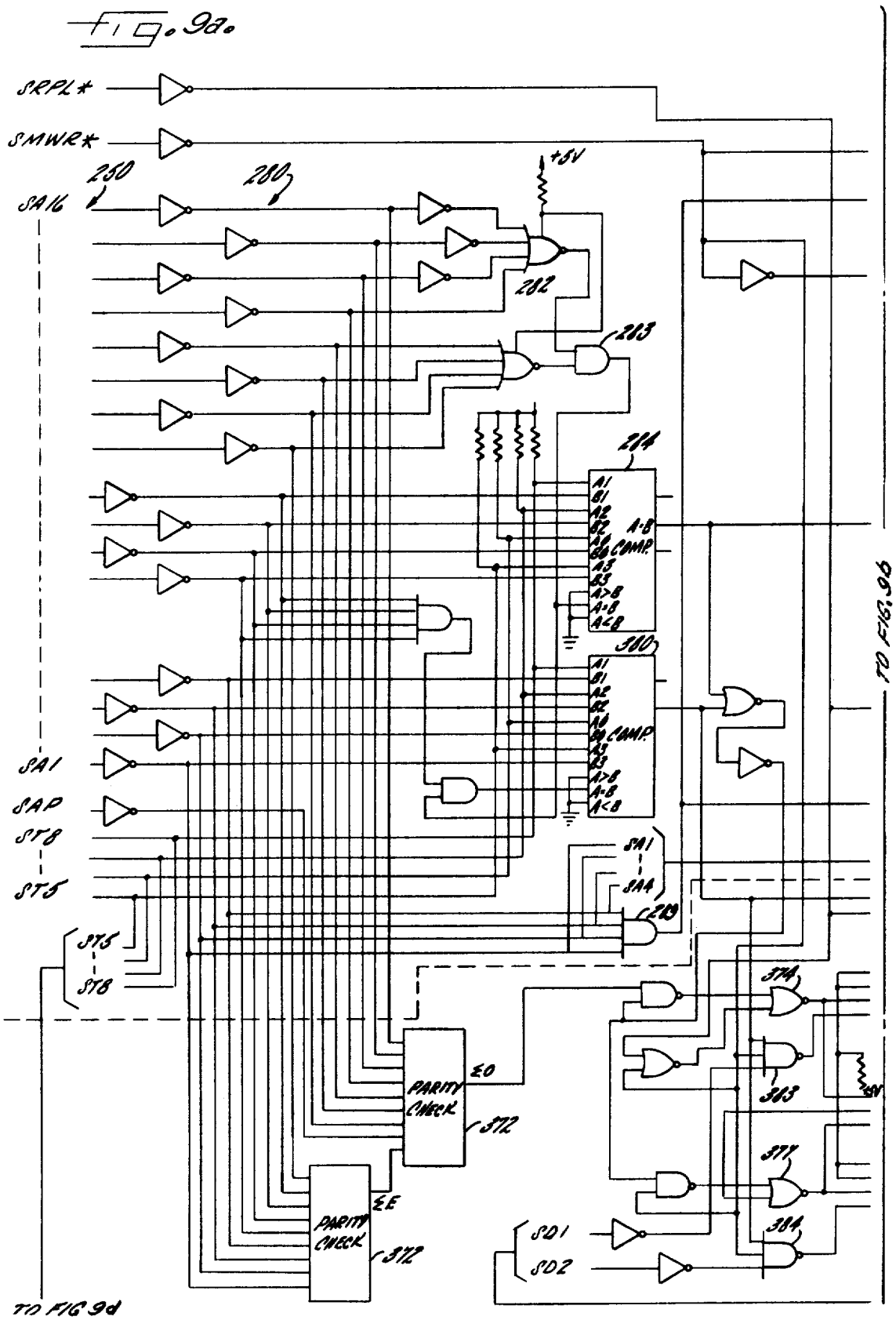

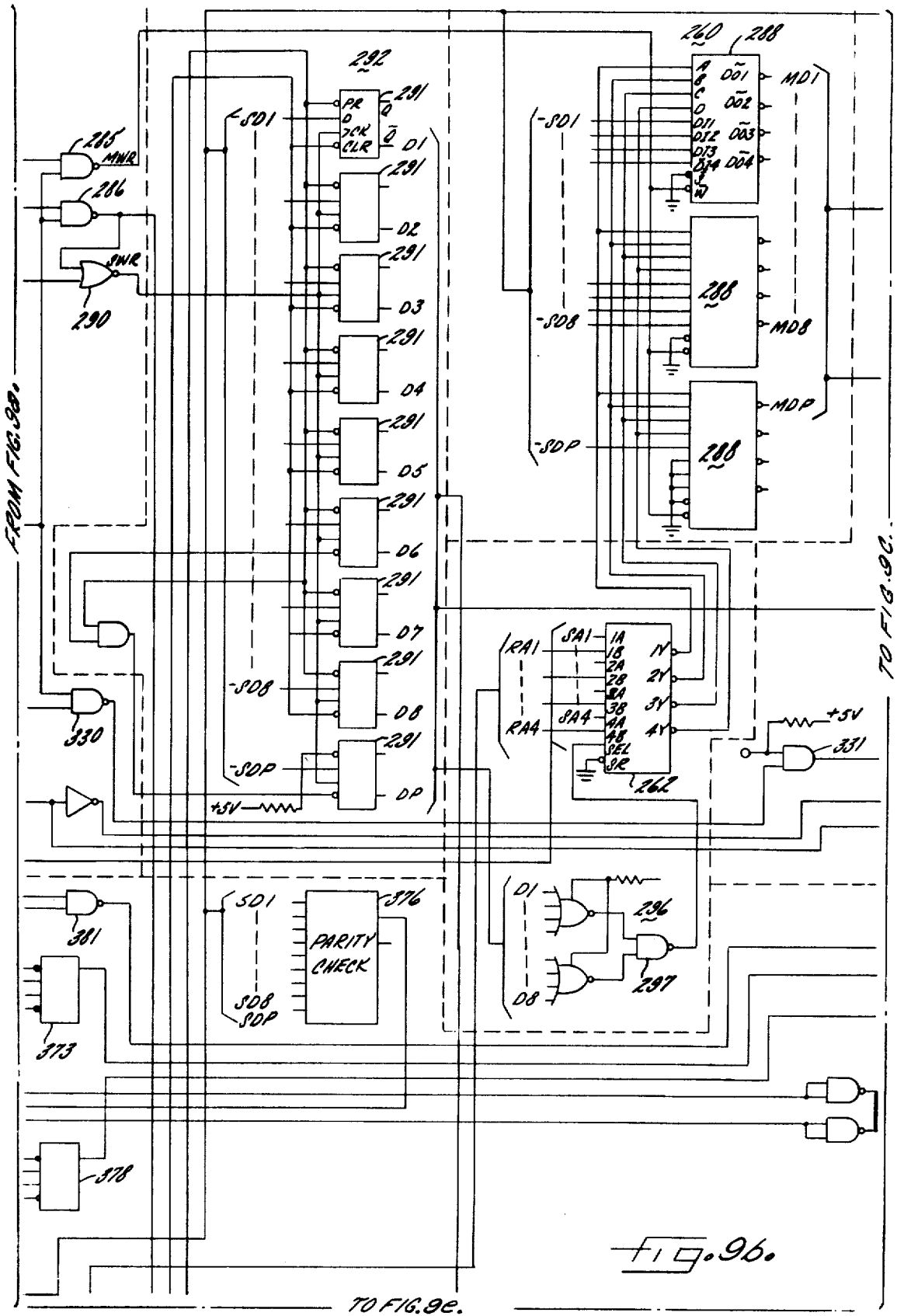

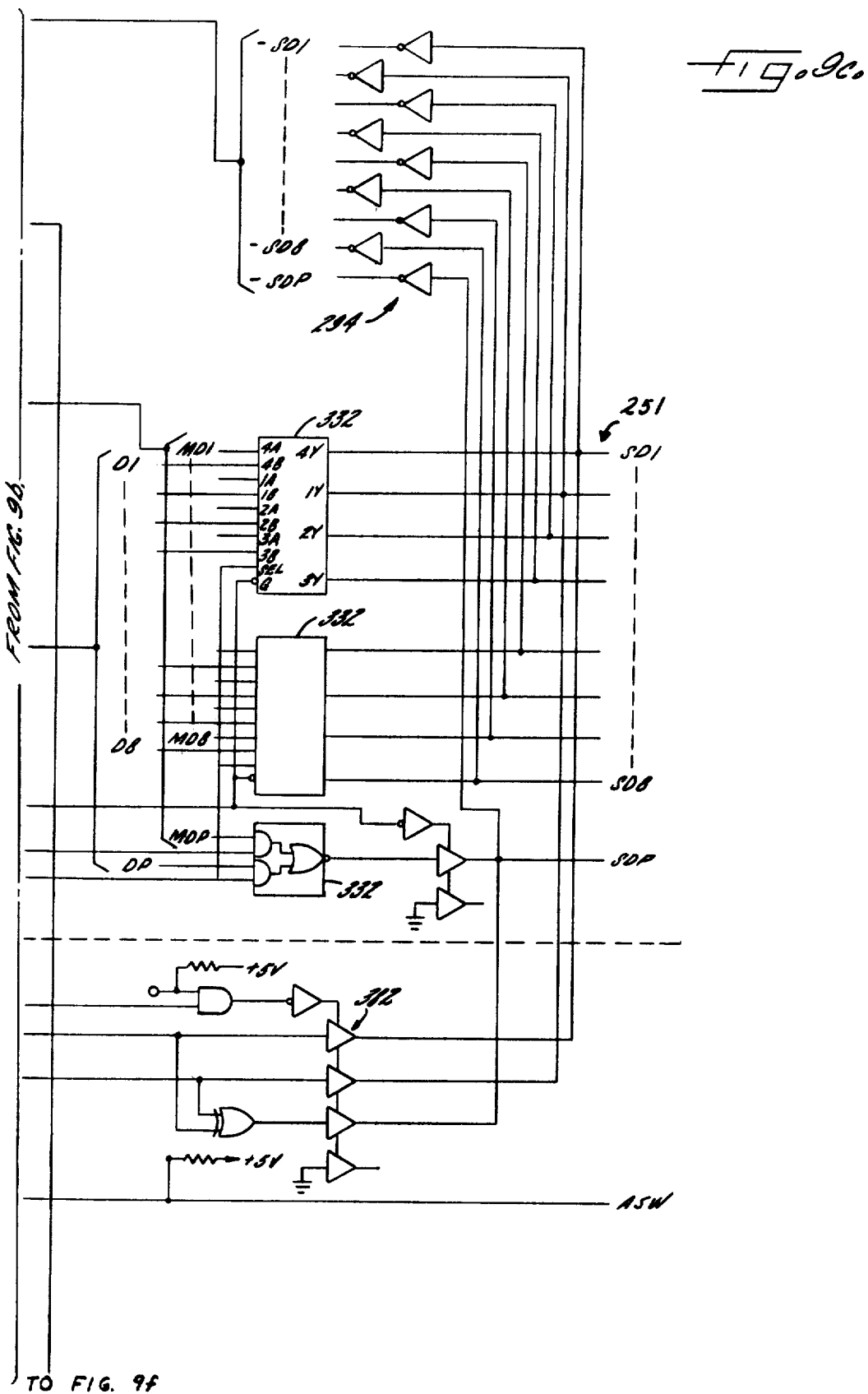

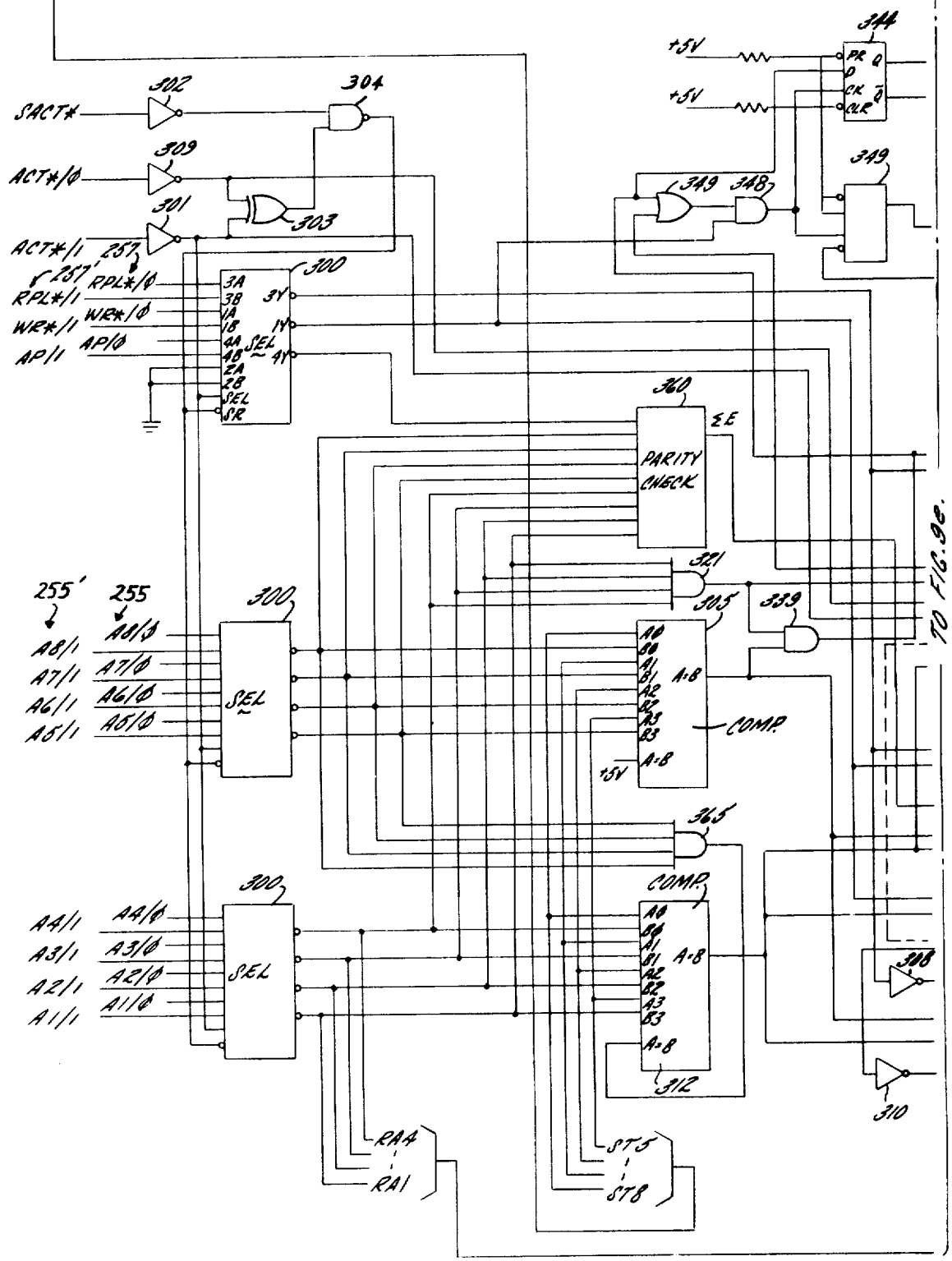

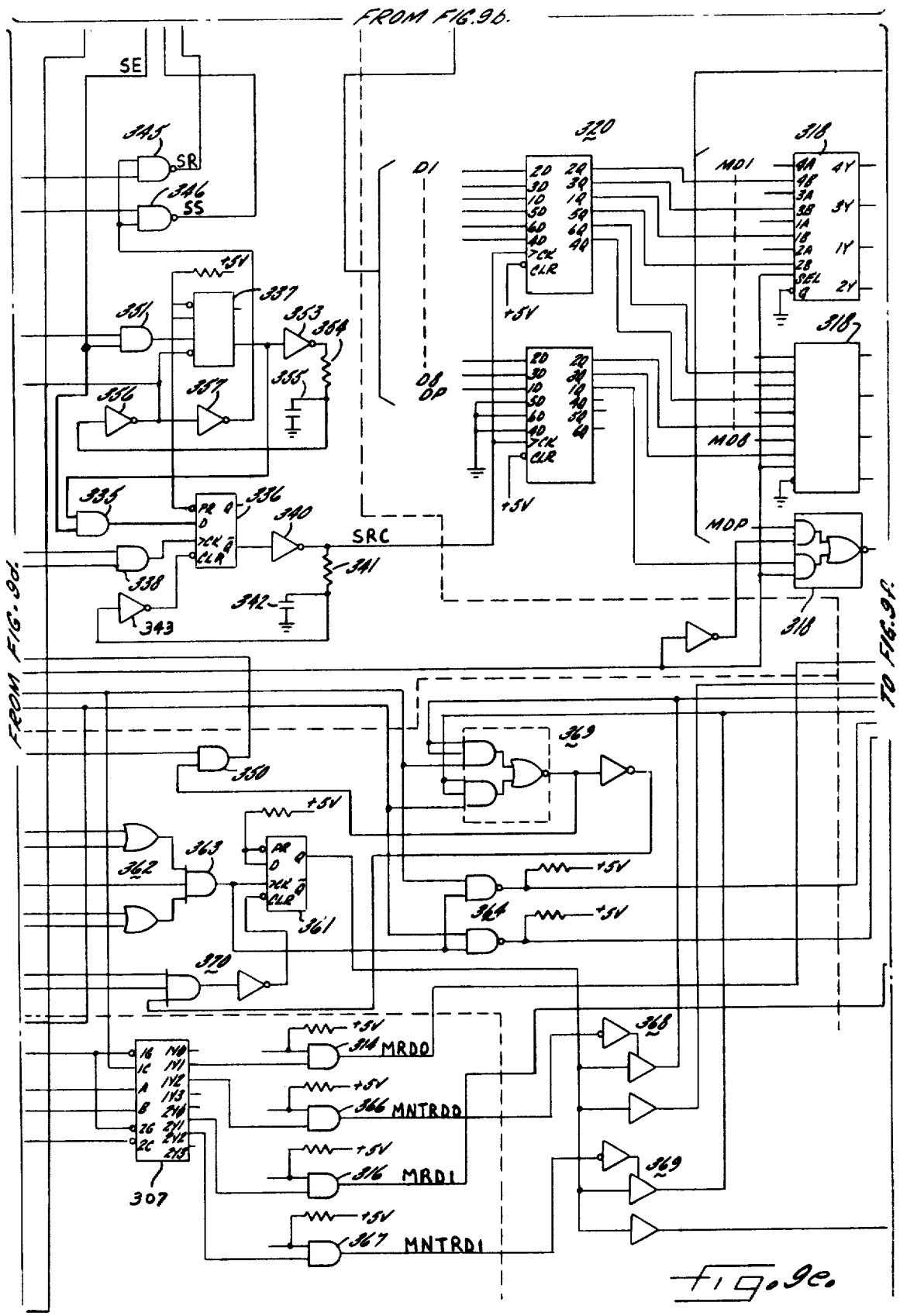

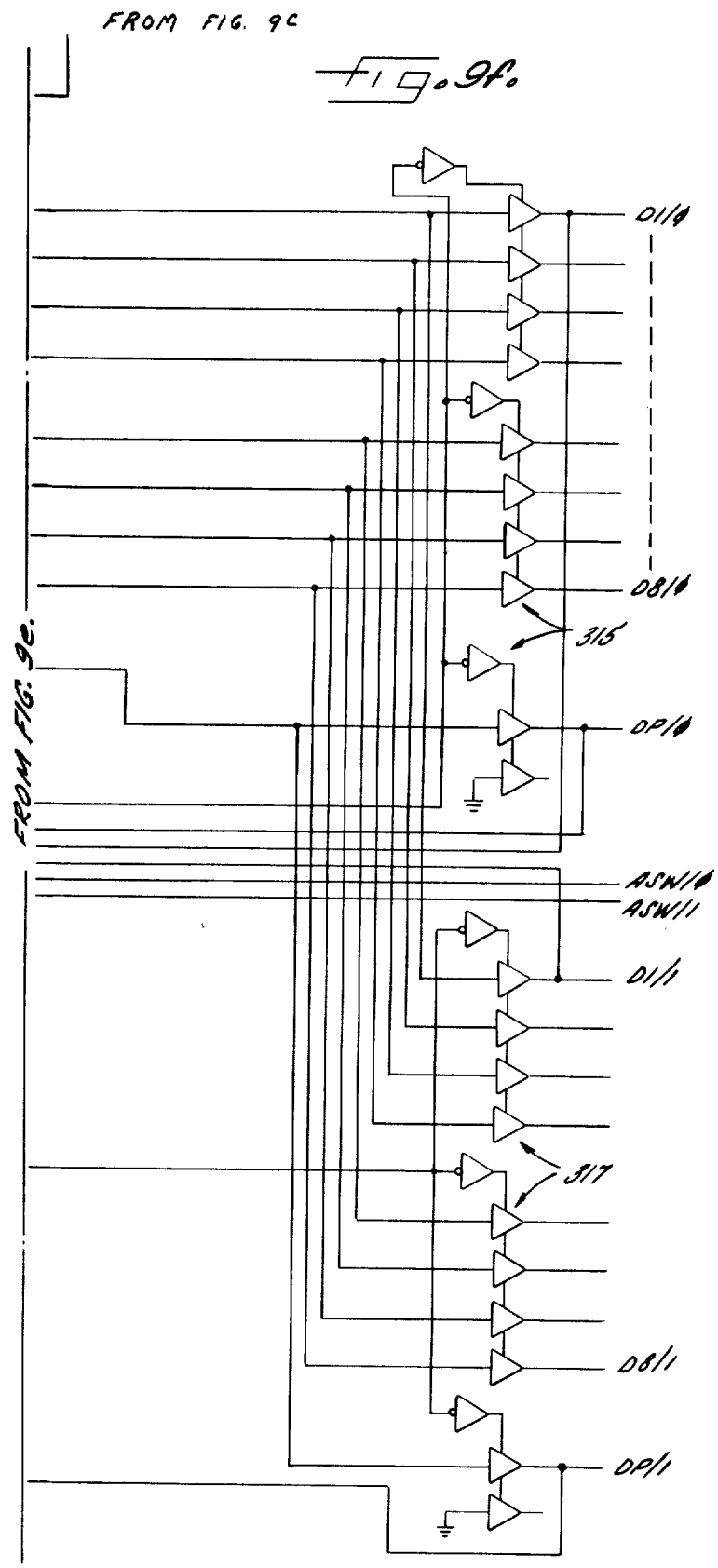

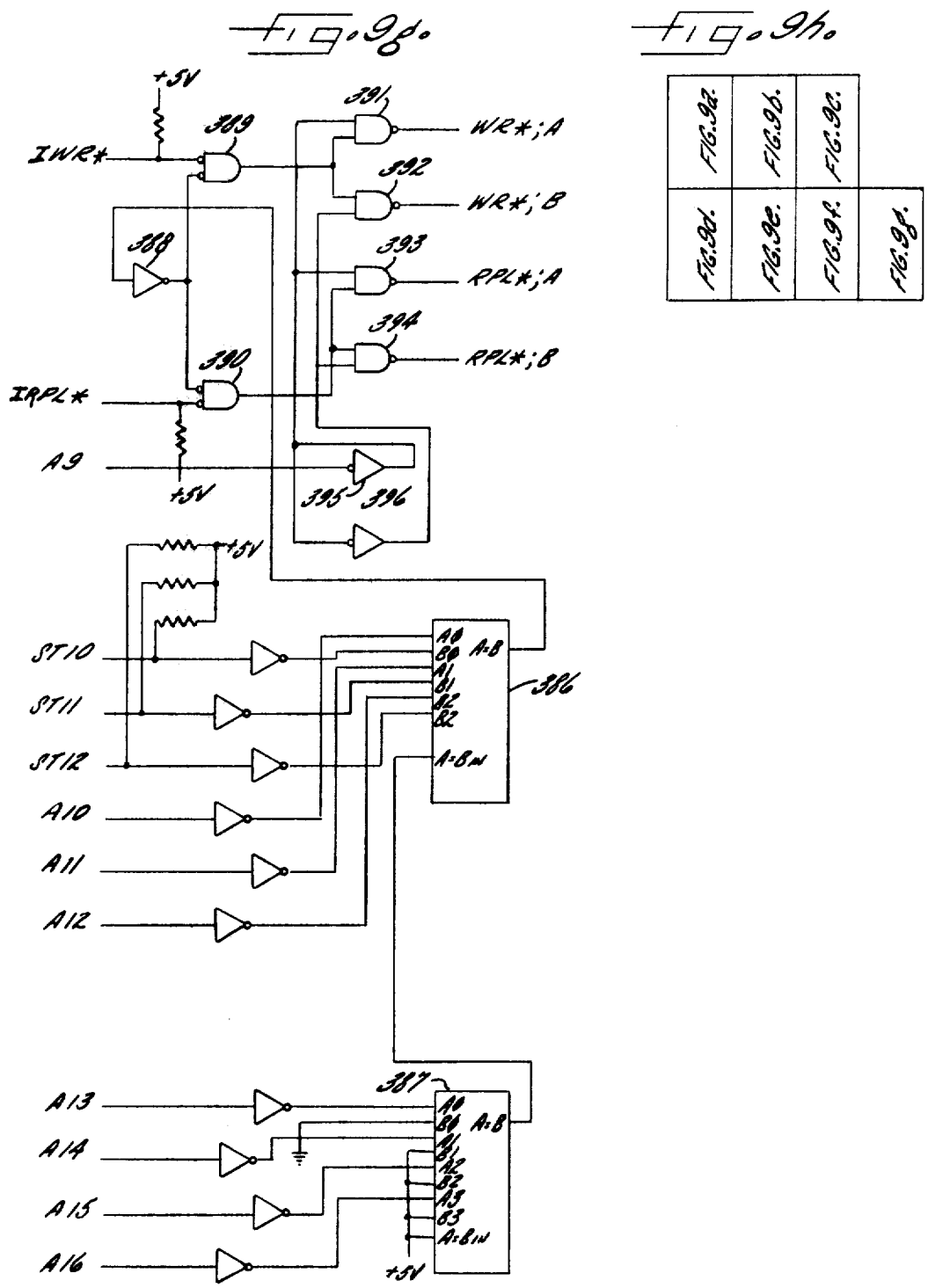

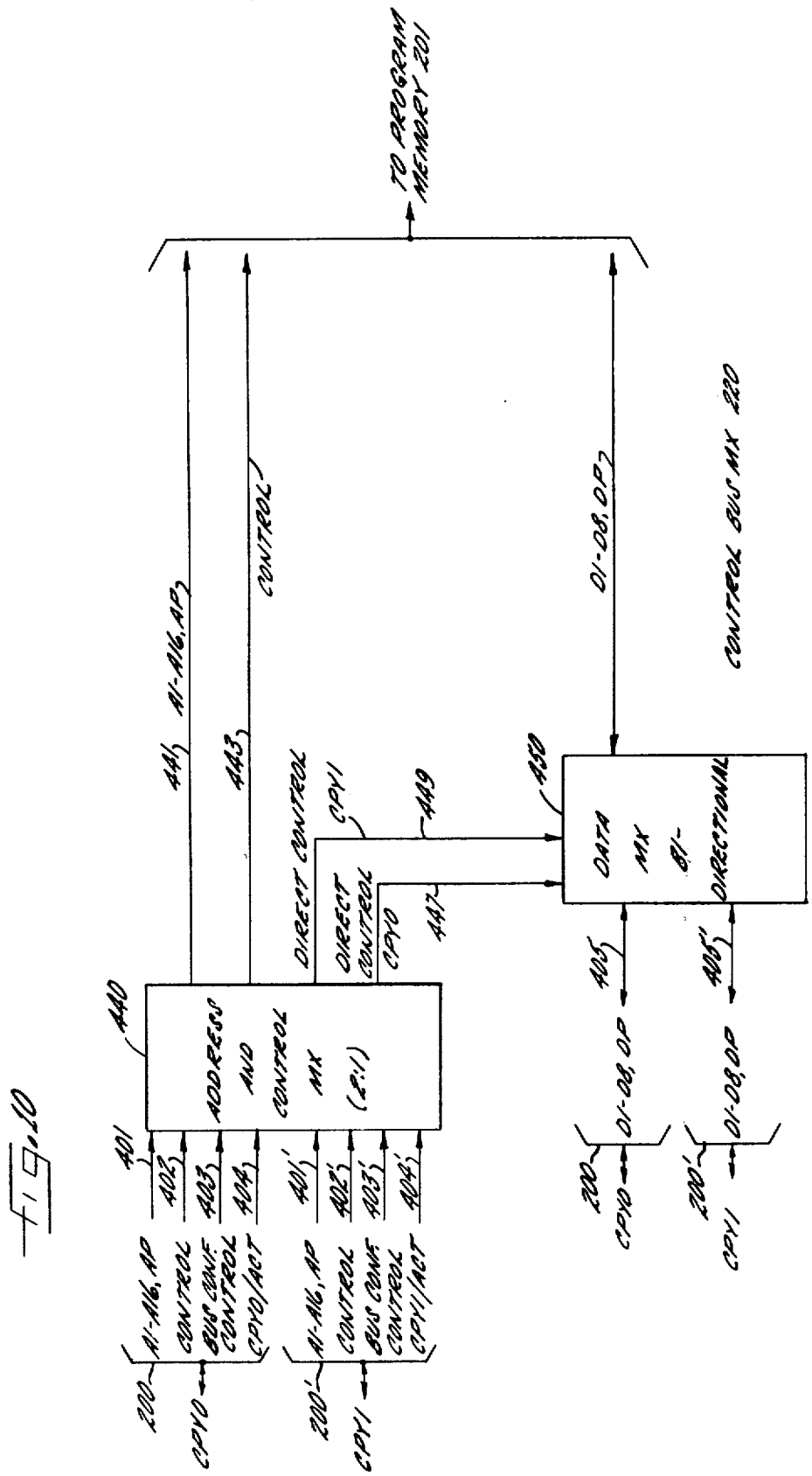

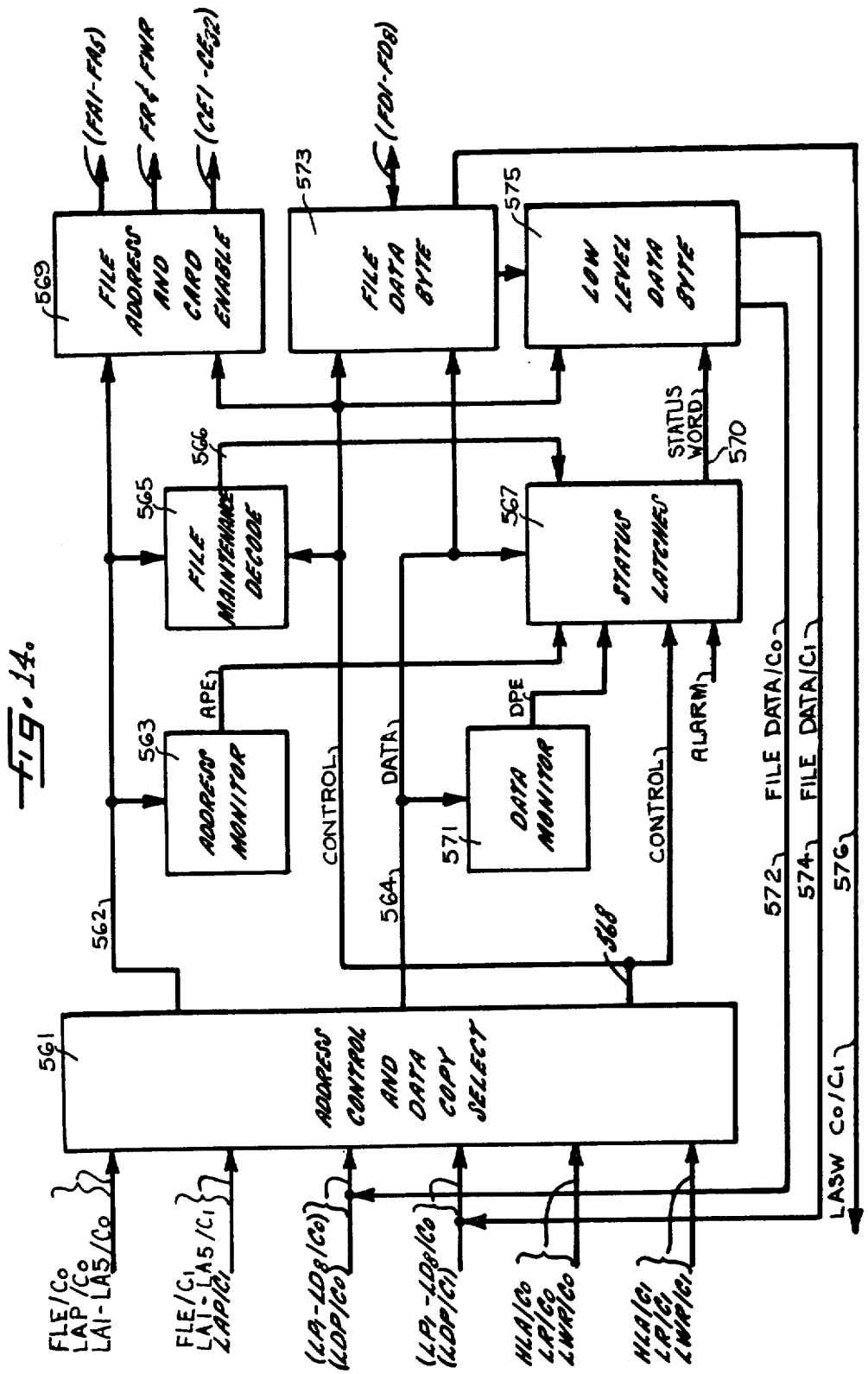

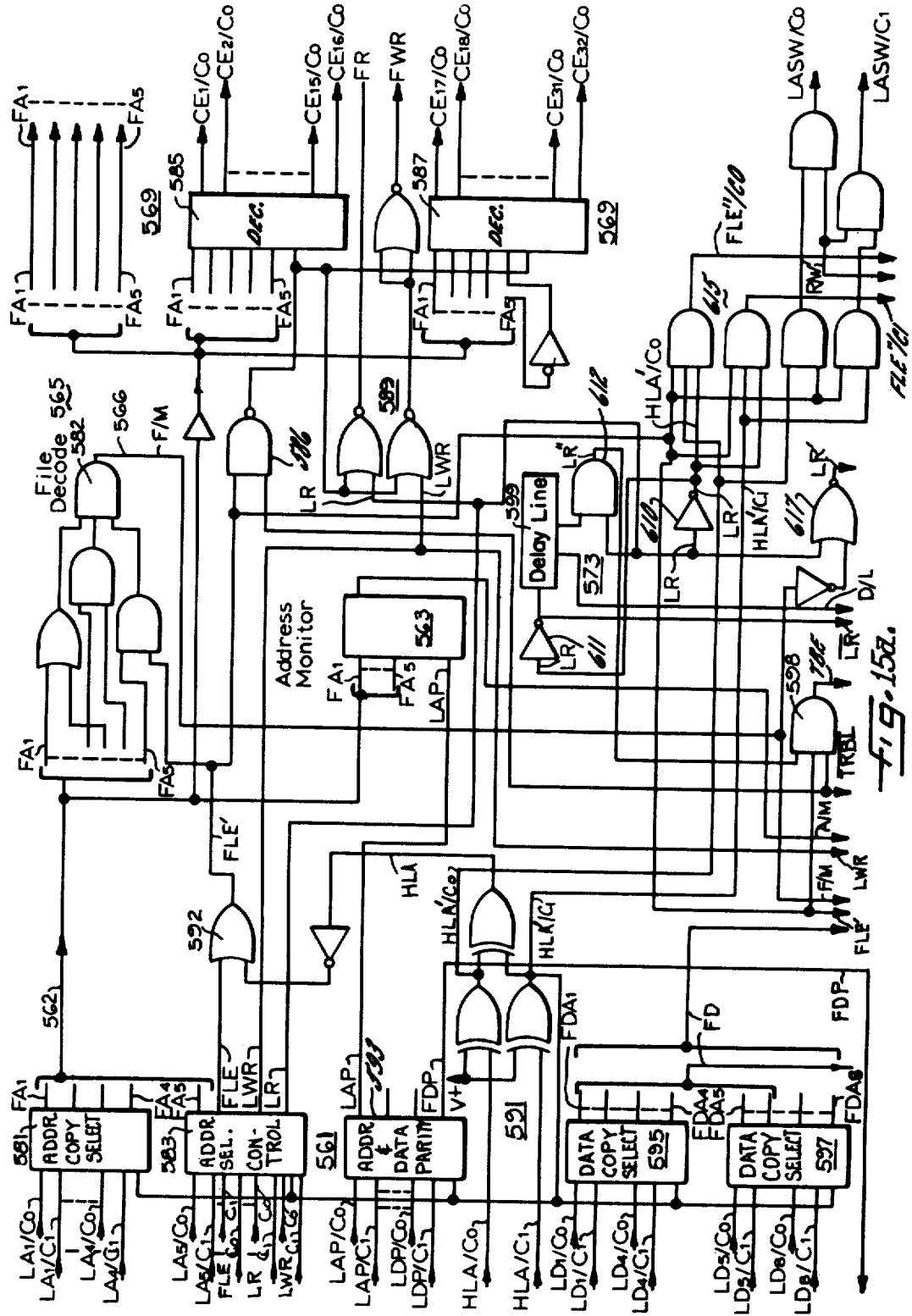

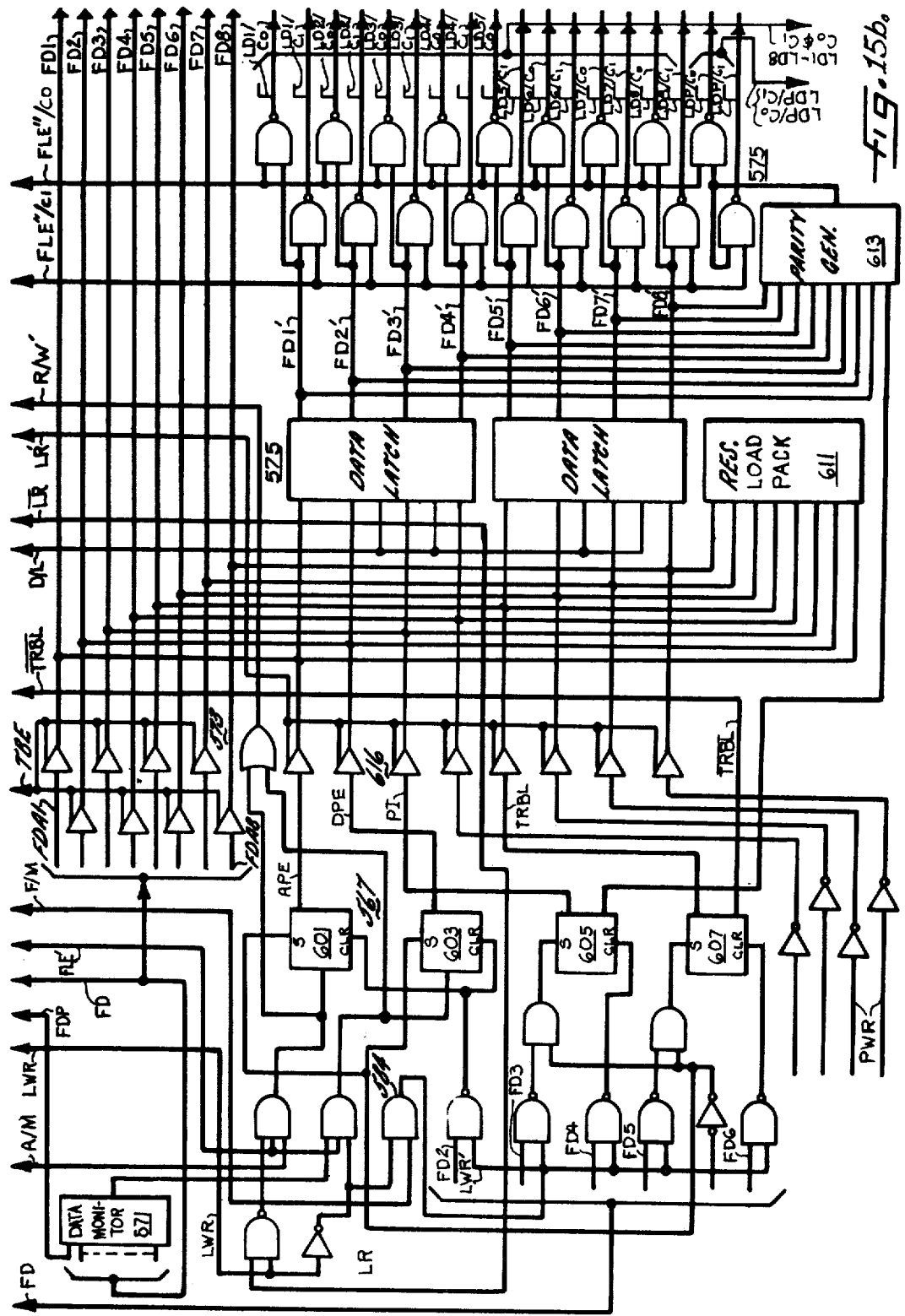

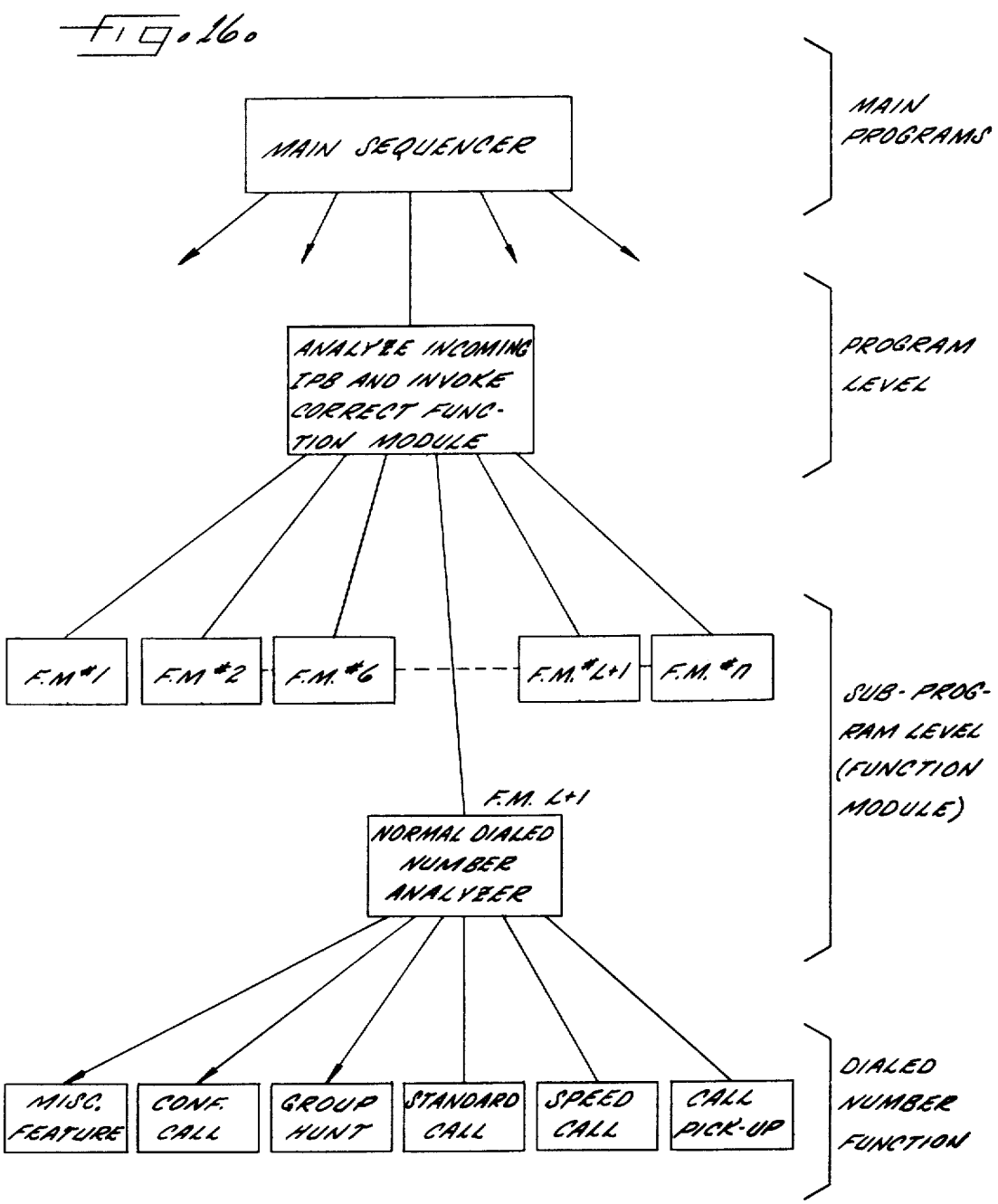

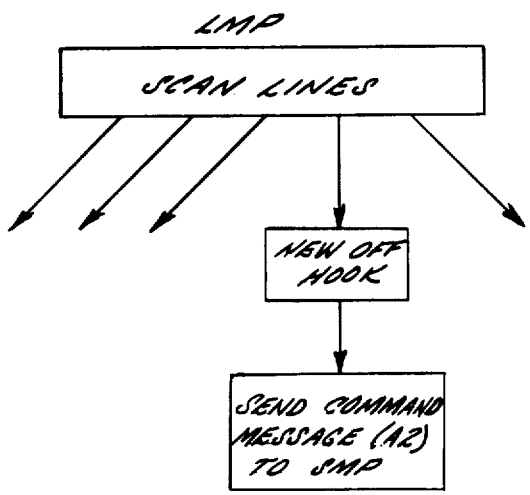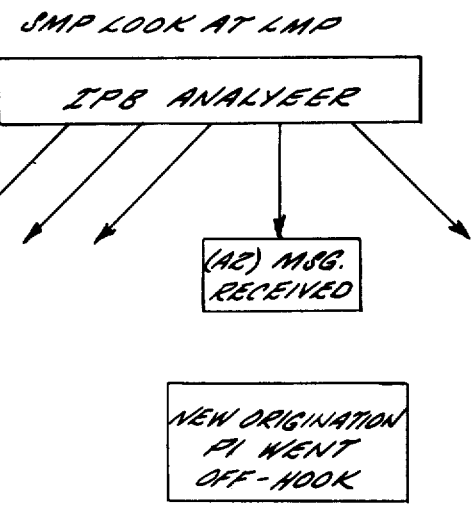

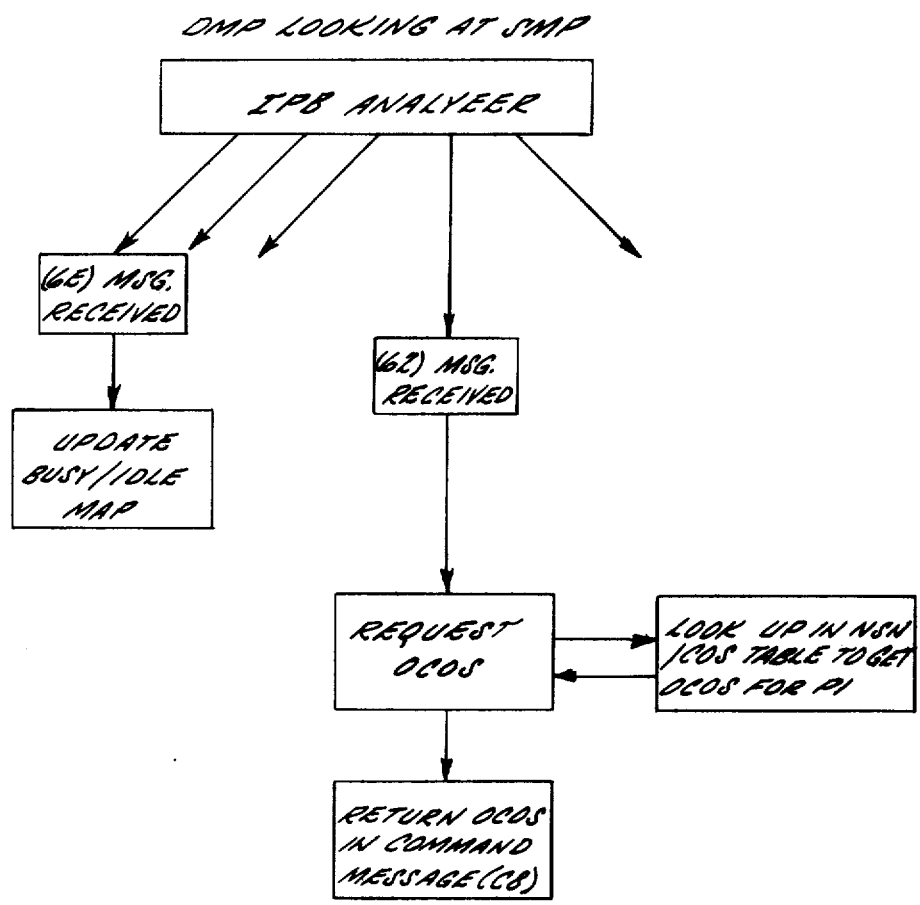

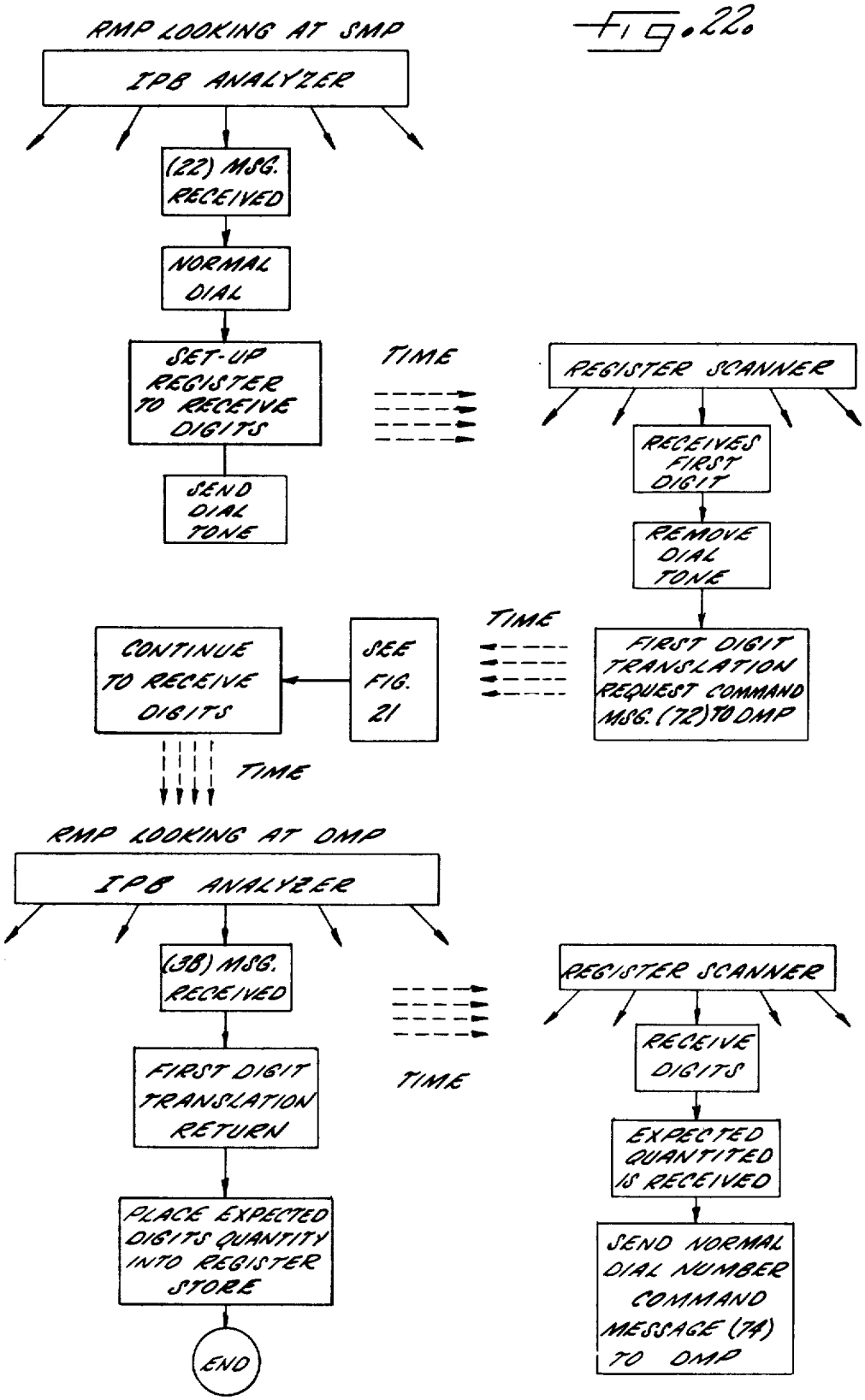

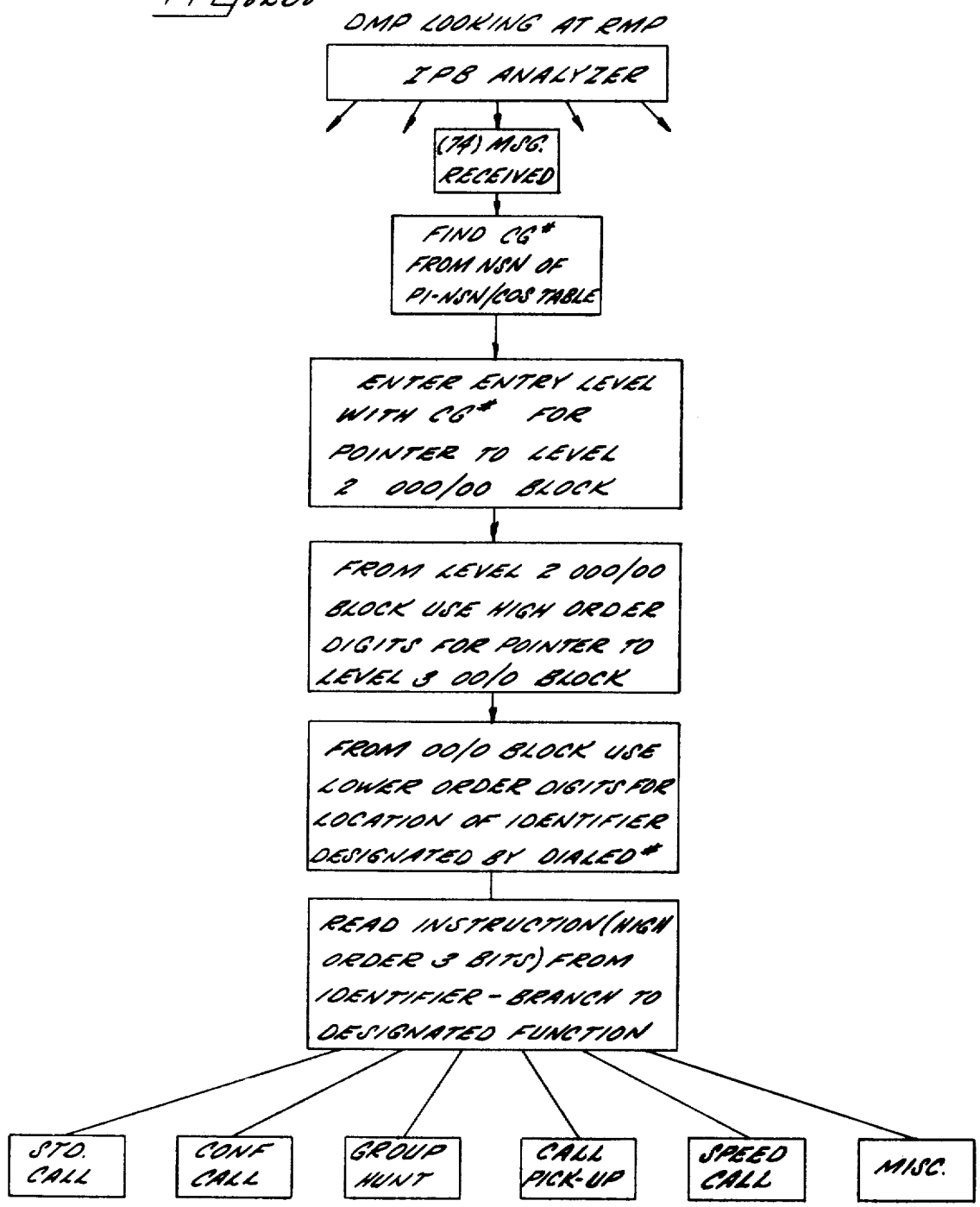

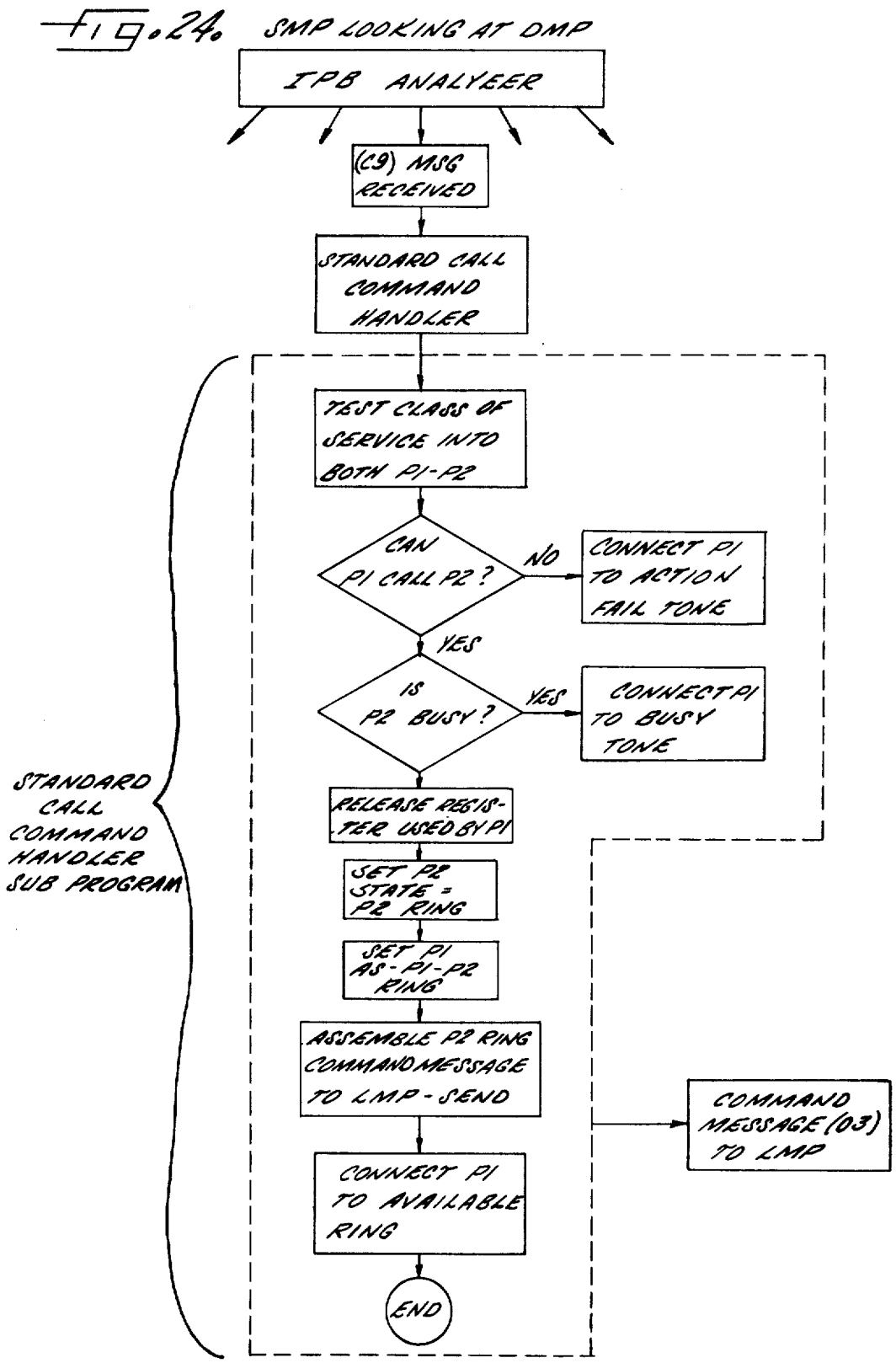

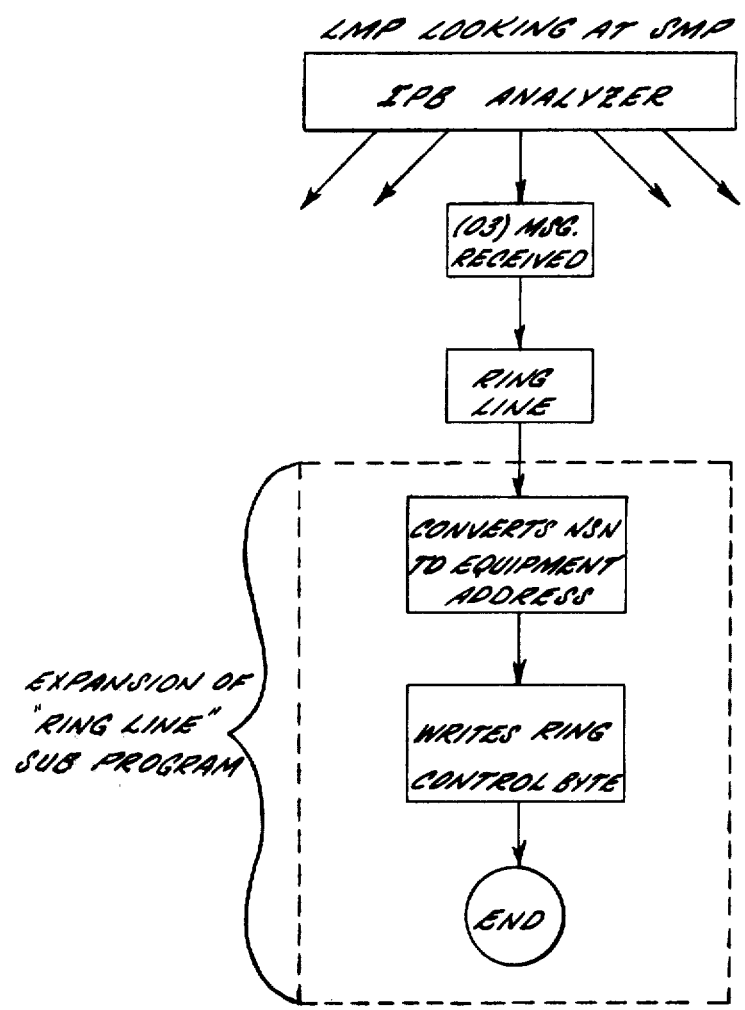

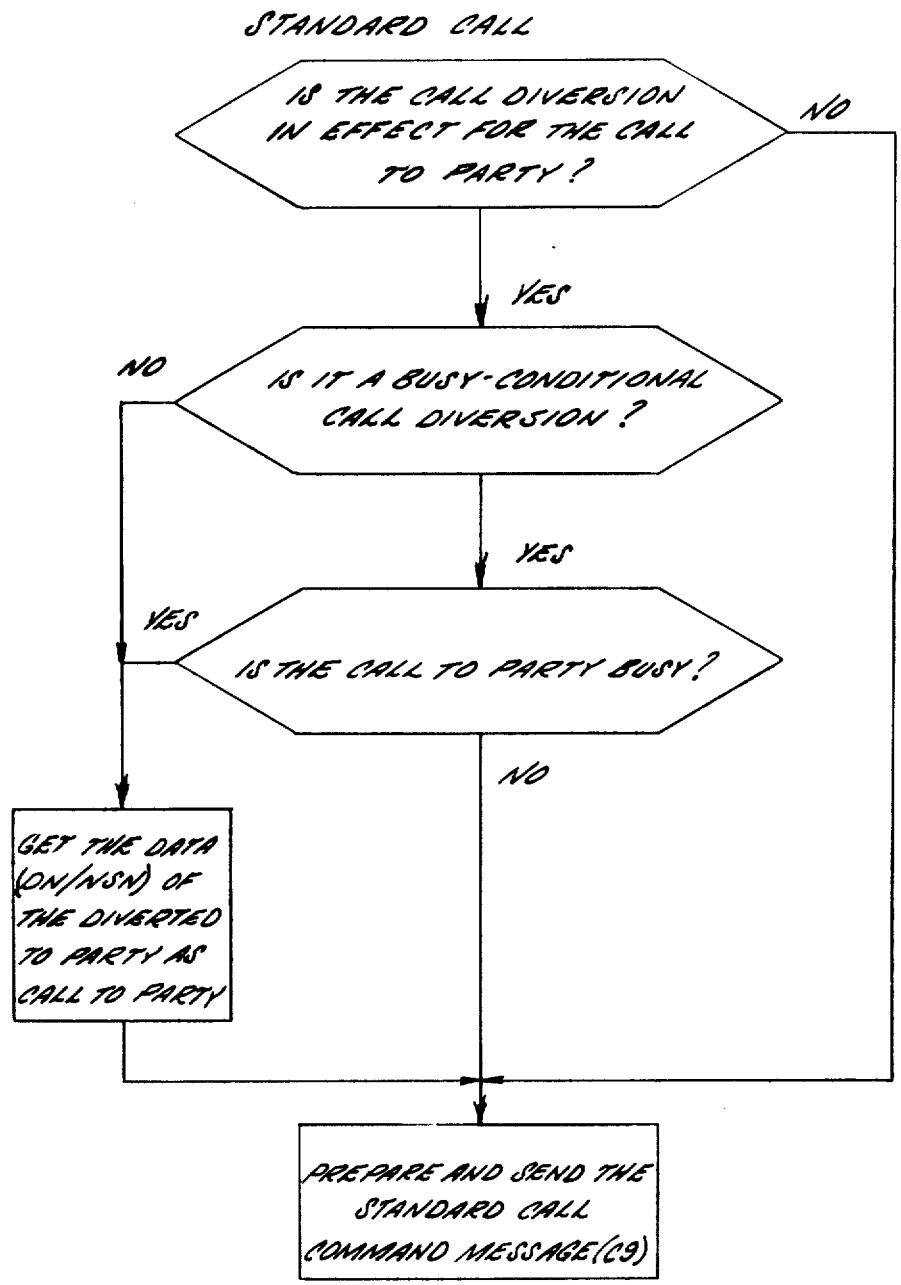

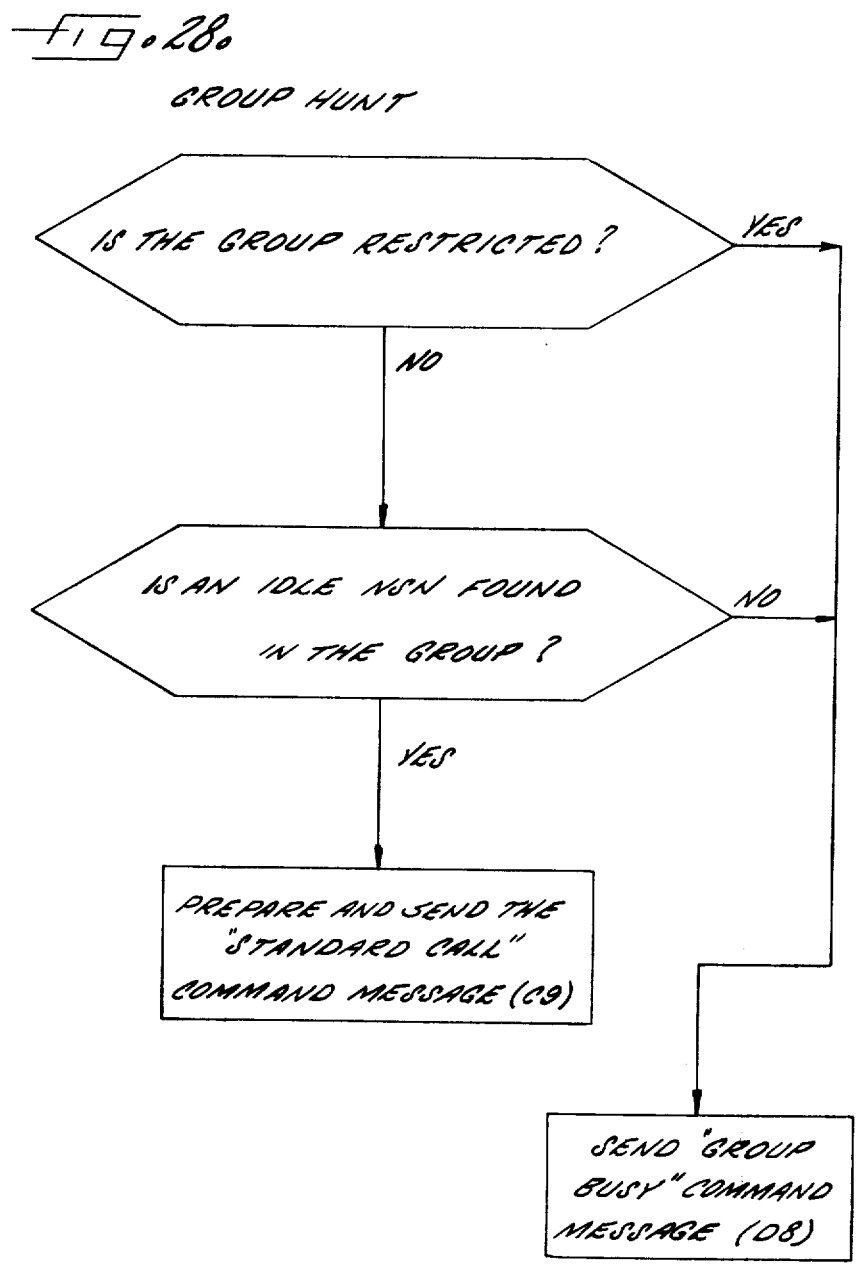

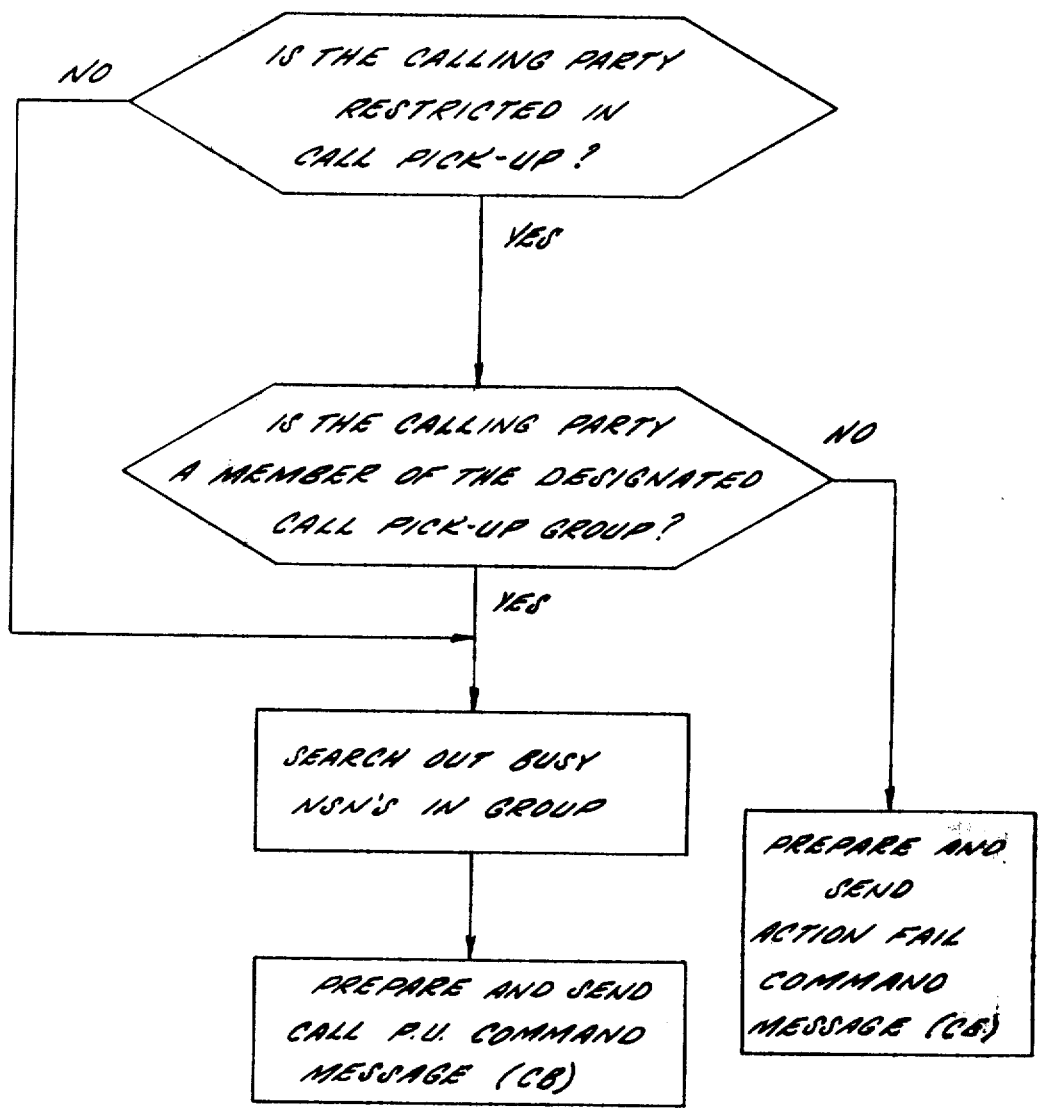

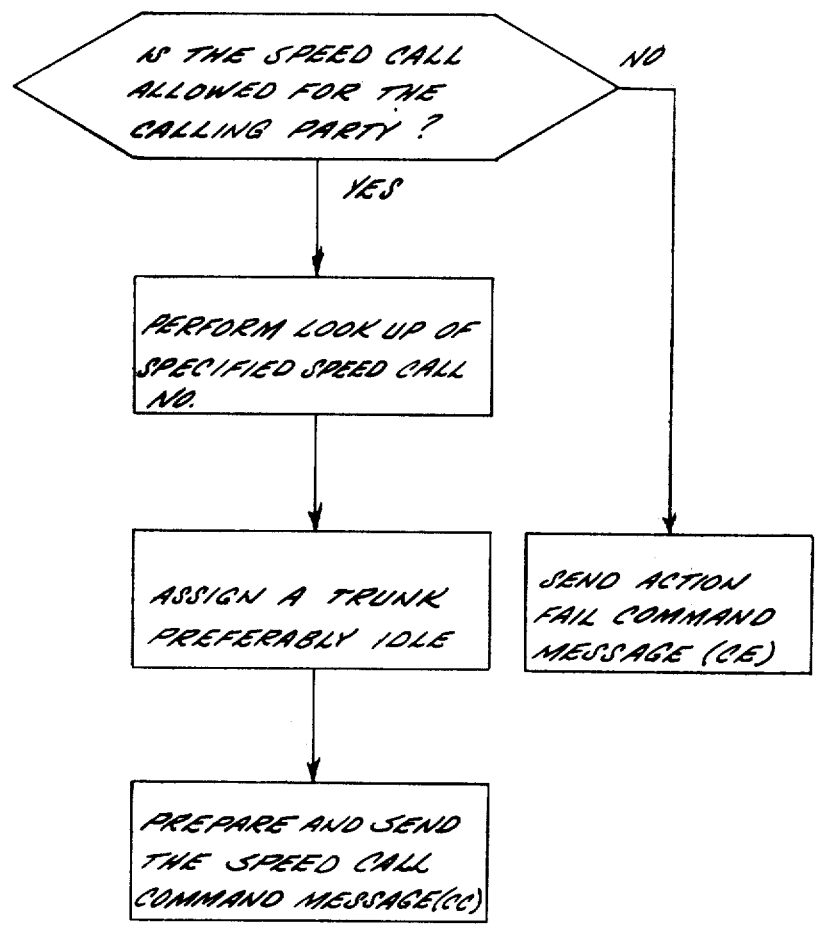

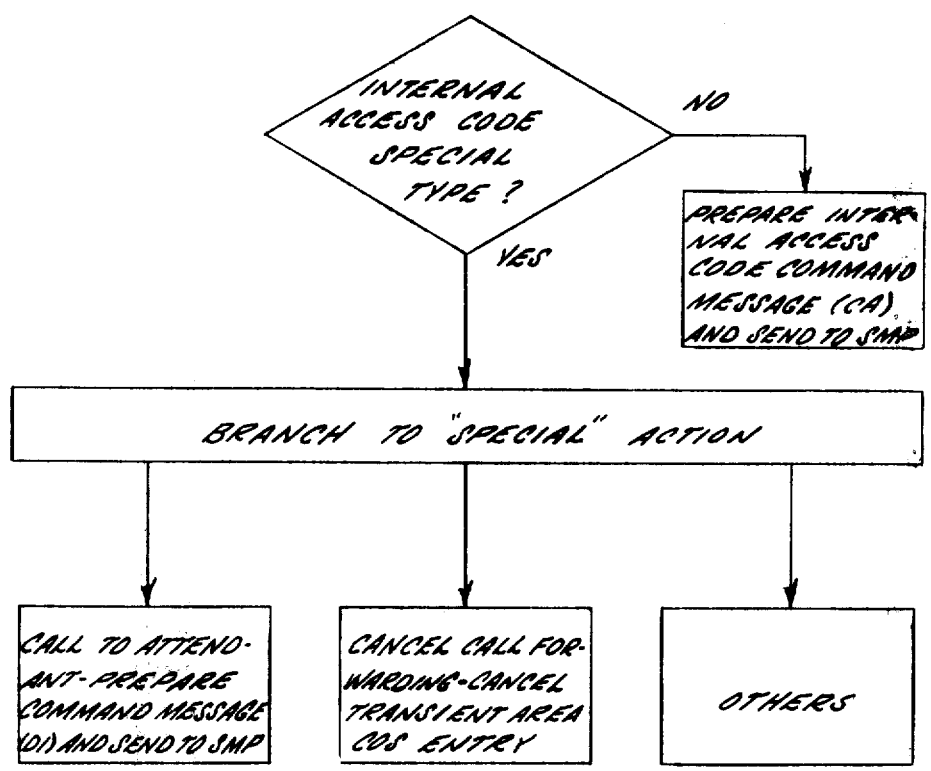

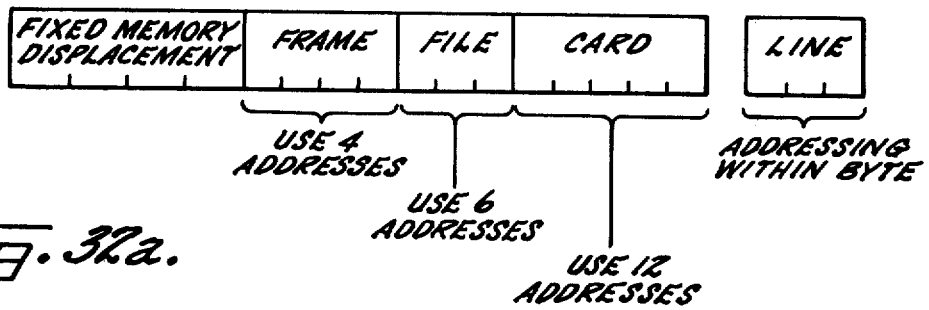
Fig. 32a. ADDRESSING OF LINE CONTROL AND SENSE BYTES
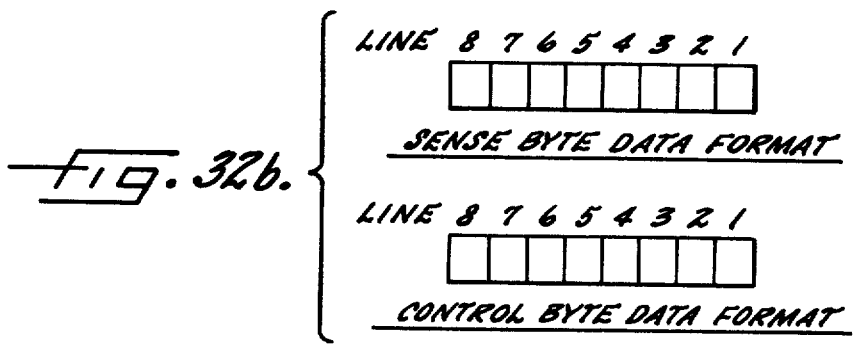
Fig. 32b. DATA FORMAT IN LINE SENSE AND CONTROL BYTES
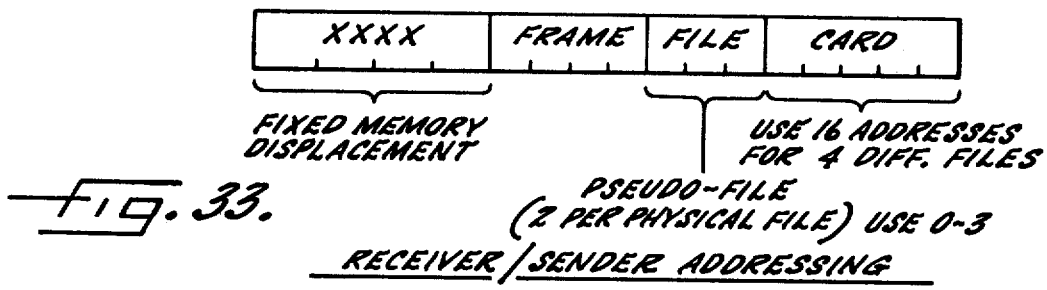
Fig. 33. RECEIVER/SENDER ADDRESSING
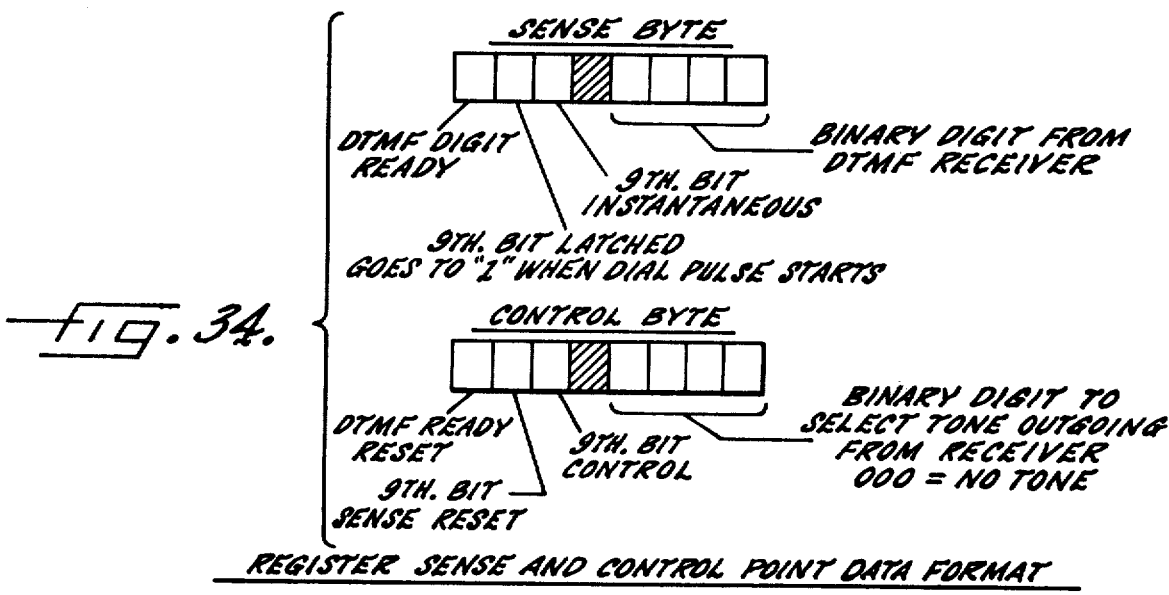
Fig. 34. REGISTER SENSE AND CONTROL POINT DATA FORMAT

ADDRESSING OF SENSE AND CONTROL BYTES

NOTE:

1. EACH ADDRESS ACCESSES POINTS FOR 2 TRUNKS
2. EACH PHYSICAL TRUNK CARD CONTAINS 4 TRUNKS
3. TO ACHIEVE UNIFORM ADDRESSING, EACH CARD IS TWO SUB-CARDS AND EACH FILE IS 24 SUB-CARDS

DATA FORMAT IN TRUNK SENSE AND CONTROL BYTES

MICROPROCESSOR CONTROL COMPLEX FOR A TELECOMMUNICATION SWITCHING SYSTEM

This is a continuation-in-part of Pitroda et al. Application Ser. No. 734,732, filed Oct. 21, 1976, now abandoned.

This invention relates to telephony, and more particularly to a stored program control complex of the type which finds application in controlling the operation of a telecommunications switching system.

Telephone switching systems have evolved to include various forms of computerized common controls of the programmable or stored program variety. Conventionally the computerized controls have been configured as multi-task monoprocessors with the result being the need to implement relatively complex control tasks and memory configurations. One of the characteristics of the monoprocessor approach is the need for an executive program or an executive processor for controlling system operations. Typically this results in a program which is interrupt driven thereby requiring a potentially complex hierarchy for the various interrupts. Moreover it is generally necessary to queue work for the purpose of distributing the real time work load of the processor. The resultant complexity of the programming task will be apparent from the foregoing, not only as it applies to initially generating and debugging the programs, but also in maintaining the system should a fault develop.

In view of the foregoing it is a general aim of the present invention to provide a telecommunications switching system having a multiprocessor control complex which provides distributed call processing and also does away with the need for executive control. More specifically an object is to distribute the call processing functions among the several processors in the control complex in such a way as to modularize the control function and simplify the programming. A resulting object is to minimize system complexity and increase system reliability.

A general objective of the invention is to simplify the control tasks of the control complex of a telecommunications switching system by partitioning such tasks along functional call processing lines and assigning those tasks to respective processors in a distributed processor configuration.

According to a particular aspect of the invention an object is to configure the control complex in a distributed multiprocessor arrangement with specific tasks assigned to the respective processors so as to minimize inter-processor communication. A further object is to simplify the control task by allowing the processors to operate asynchronously independently of any controlling executive. A detailed object is to provide such a control complex wherein the control tasks are sectioned along functional lines relating to call processing.

According to another aspect of the invention it is an object to provide a highly reliable telecommunications switching system with a distributed multiprocessor control complex having redundant processors in the control complex individually brought on line in the event of a failure of a primary processor. Thus, an object is to enhance reliability by automatically replacing only the malfunctioning unit rather than the entire control complex.

Finally, and according to a still further aspect of the invention, it is an object to economically implement a telecommunications switching system by configuring the control complex in a distributed multiprocessor arrangement wherein the processors include commercially available at relatively low cost microprocessor circuits and memories. Furthermore an object is to simplify the structure of such a system by providing each microprocessor with its own program memory, eliminating the need for the distributed microprocessors to share memory.

In accordance with the invention, a multiprocessor control complex is achieved for providing distributed call processing in such a manner as to minimize complexity of the control from both a hardware and software standpoint. A plurality of microprocessor control units are provided, each having a microprocessor and an instruction memory associated therewith. The various instruction memories are programmed to cause their associated microprocessor to perform a portion of the total function of the switching system, so that the total function is distributed among the microprocessors. With this arrangement each microprocessor control unit may continue to perform the functions assigned to it independently and asynchronously of the other control units. Of course, it is necessary to transfer data between the control units for performance of the total switching function. To minimize the amount of time spent in interprocessor communication, and to decrease system complexity due to such communication, the processors which must intercommunicate are paired, and each pair is provided a dedicated asynchronous communications channel. In this way each of the microprocessors may continue to operate under the control of its particular program, asynchronously of the other processors in the complex. In the preferred embodiment, the asynchronous communication channels are provided by interprocessor buffers having a temporary data store separately accessible by the microprocessors in the pair associated therewith.

As a further facet of the invention, there is provided a method of controlling a telephone switching exchange having a plurality of call processing functions comprising the steps of providing a plurality of microprocessors each having memory means associated therewith, individually conditioning the memory means to cause each associated microprocessor to respond to input commands to execute particular portions of the functions of the switching exchange and to produce output commands as a result of said execution, wherein at least some of the input commands result from functions of the switching exchange performed by the other processors and at least some of the output commands are intended as input commands for the other processors such that the total function of the switching exchange is distributed among the respective microprocessors, pairing the microprocessors for exchange of output commands from one as input command for the other in a pair, and asynchronously communicating said commands along dedicated communication channels between paired processors so that the processors interact to accomplish the total function of the switching exchange.

Other objects and advantages will become apparent from the following detailed description when taken in conjunction with the drawings in which:

FIG. 1 is an overall block diagram of a telecommunication switching system in which a preferred form of the invention is embodied;

FIG. 2 is a block diagram showing the arrangement of the distributed processors of the control complex portion of the system illustrated in FIG. 1;

FIG. 3 is a block diagram schematically illustrating the redundant construction utilized for the microprocessor control units in the control complex 55.

FIG. 4 is a schematic diagram of the program memory and bus structure for each processor;

FIG. 5 is a diagram illustrating the communication channels joining a pair of partner processors;

FIG. 6 is a more extensive schematic diagram of the redundant microprocessor arrangement of one of the distributed processors illustrating the interface thereof with the switching system;

FIG. 7 is a block diagram illustrating the structure of an interprocessor buffer exemplifying a dedicated communications channel between partner processors;

FIG. 8 is a schematic diagram showing the elements of a microprocessor control unit and on a general basis, illustrating the interrelationship therebetween;

Figure 11B:
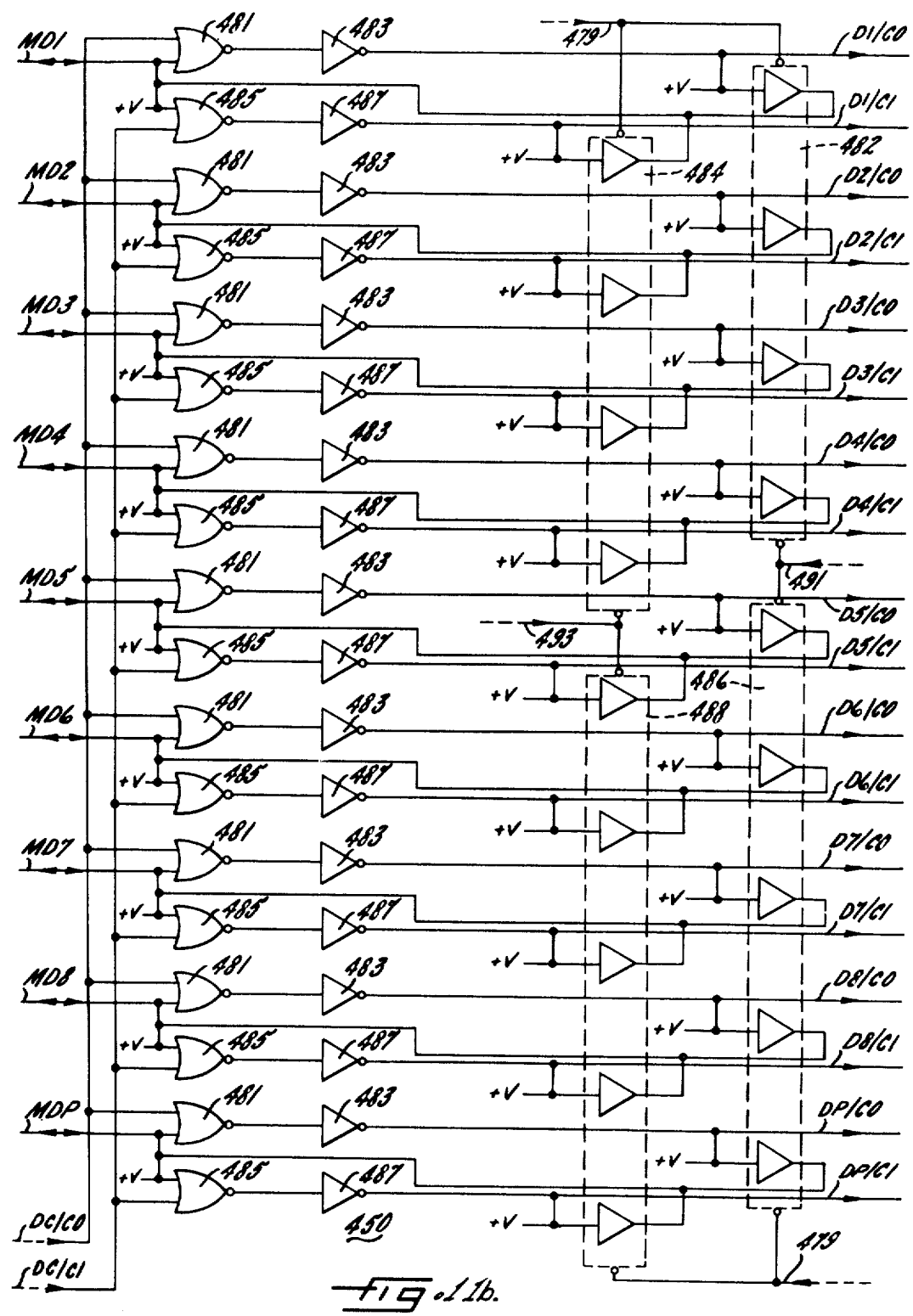
Figure 12:
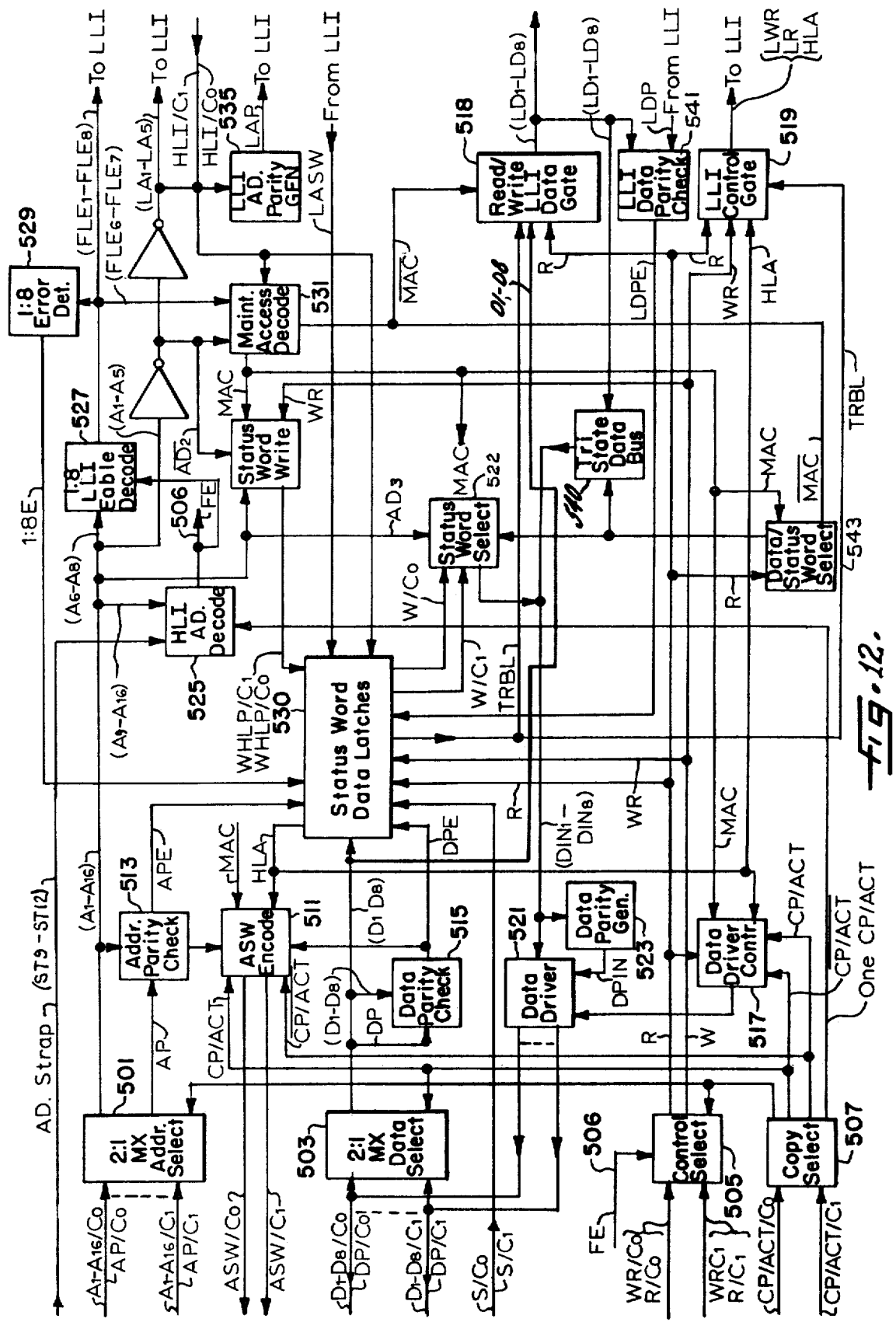
Figure 13A:
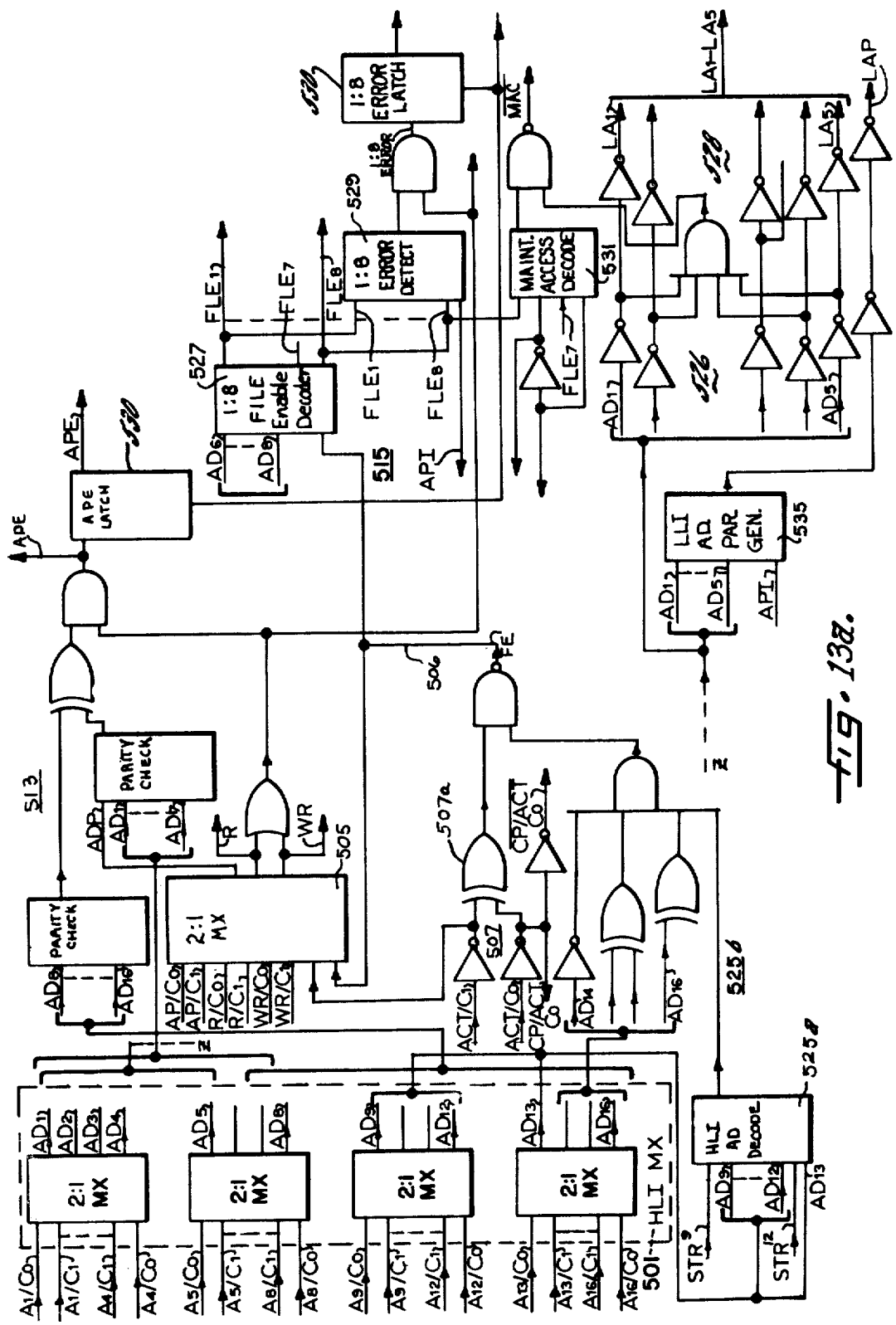
Figure 13B:
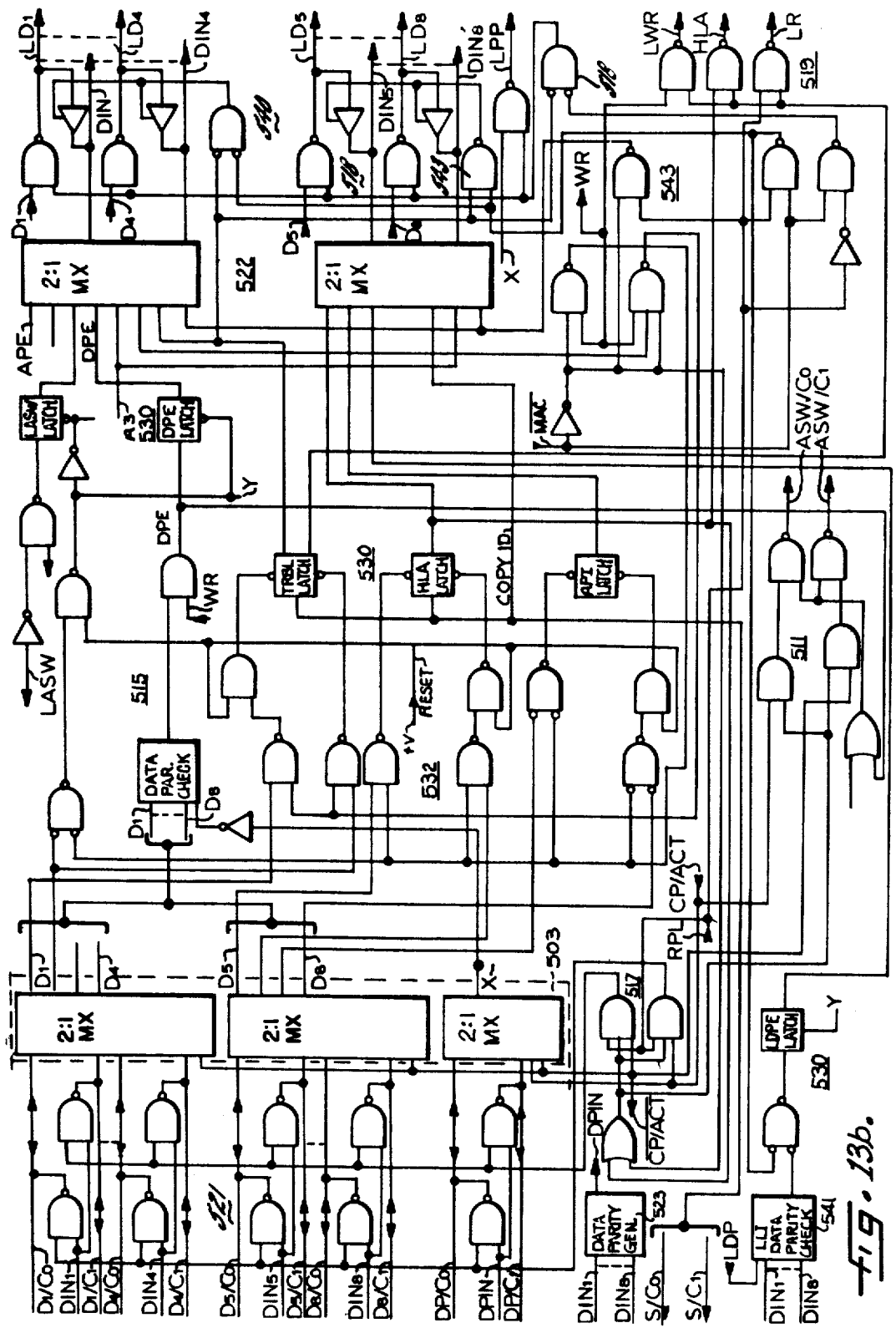

FIGS. 9a–9h form a circuit diagram of an interprocessor buffer;

FIG. 10 is a block diagram of a bus multiplexer interconnecting a microprocessor with its associated program memory;

FIGS. 11a–11b form a schematic diagram of the bus multiplexer;

FIG. 12 is a block diagram of a high level interface circuit for interfacing a microprocessor with the switching system;

FIGS. 13a–13b comprise a schematic diagram of the high level interface circuit;

FIG. 14 is a block diagram of a low level interface circuit for interfacing a microprocessor with the switching system;

FIGS. 15a–15b comprise a schematic diagram of the low level interface circuit.

FIG. 16 is a diagram illustrating the program hierarchy of the stored programs for the line, trunk, state, register, data base, console and busy lamp field microprocessors;

FIGS. 17–25 are flow charts illustrating subprograms executed by various processors which combine to provide the "standard call" system function; and FIGS. 26–31 are flow charts illustrating subprograms for one of the processors, specifically the data base processor, exemplifying the subprograms for the other processor.

FIGS. 32a, 32b, 33, 34, 35a and 35b are diagrams of address and data format useful in understanding the exemplary embodiment of the invention.

While the invention will be described in connection with certain embodiments presently considered to be preferred, there is no intent to limit it to those embodiments. On the contrary, the intent is to cover all alternatives, modifications and equivalents included within the spirit and scope of the invention as defined by the appended claims.

Referring now to FIG. 1, there is shown an overall block diagram of a telecommunications switching system intended to serve as an exemplary environment for the control complex according to the present invention. The system is adapted for connection to a plurality of lines represented by telephone instruments 30, 31, and also to a plurality of trunks generally indicated at 32. The general term access ports will be used herein to denote these and other system inputs. Circuitry is provided to interface the lines and trunks to the switching system, such circuitry being represented by line circuits 33, 34, analog trunk circuits 35 and digital trunk circuits 36. Since the switching system is of the four wire variety, the line circuits 33, 34 and the analog trunk circuits 35 include hybrids for converting the two wire line signals to four wire for use by the switching system. Additionally, and as will be explained in greater detail below, the line circuits, 33, 34 and the trunk circuits 35 include appropriate sense points for indicating the status of the lines or trunks to which they are connected and also appropriate control points for allowing the switching system to control the status thereof. The digital trunk circuits 36 are not necessary in the practice of the invention, but are shown for sake of completeness. Such circuits are intended to directly interface a T1 digital line to the switching system without the need for code conversion of any sort.

In addition to establishing and maintaining "standard call" connections between lines and trunks, the system is capable of providing additional features where desired, the apparatus for effecting such features being represented by element 38. For example, the system may be configured to carry out, as optional functions, paging, code call, multi-port conferences and the like. Additional apparatus as required, for example audio equipment for use with the paging feature, is indicated generally at 39.

Means are provided for receiving and storing dialed digits for use by the control complex in establishing connections between the lines and trunks as required. Such equipment, generally indicated at 40, may include both dial pulse receivers and DTMF receivers, the general term dial receivers being used to encompass both. In addition, the equipment includes registers for storing the digits as they are received.

In order to inform a user of the response of the system to his request, progress tones are required, such tones in the instant embodiment being produced by digital tone generators 41. The tones produced by such generators include dial tone, ring back, busy tone and the like. While analog tone generators may be utilized, the digital tone generators 41 of the instant embodiment eliminate the need for code conversion, and are therefore directly compatible with the switching system.

As noted above, the switching system is configured as a four wire digital system, and therefore requires conversion between the analog information on the trunks and lines to a digital format. To that end, a plurality of code converters are provided indicated generally at 45. In the preferred embodiment the digital code utilized is compatible with North American Industry standards, utilizing an eight-bit format, a 1.544 megabit transmission rate and compression with $\mu$ equal to 255. As a result the code converter block 45 may be comprised of a plurality of rather conventional T1 PCM code converters, each capable of handling 24 channels, and each providing analog to digital conversion in the direction toward the network and digital to analog conversion in the direction toward the lines and trunks. A practical embodiment of the illustrated switching system was built to handle a maximum capacity of 3088 channels, 3072 active channels and 16 lost to framing. Such a system would require approximately 128 code converters, each capable of handling twenty-four channels, thereby providing at the output of the code converters 45 a plurality of PCM buses 46, each carrying bidirectional information for 24 channels. In the 3088 channel system, there are approximately 128 of such busses, and each bus is implemented as a pair of oppositely directed unidirectional buses.

In order to properly route the coded signal samples from the lines to the network for efficient switching, and from the network to the lines for distribution, a pair of multiplexers are provided, indicated as first order or low level multiplexer 48 and second order or high level multiplexer 49. The low level multiplexer 48 time sequences the incoming information from the code converters onto thirty-two buses 50 each carrying serial information for 96 channels, and demultiplexes the signals flowing in the opposite directions. The high level multiplexer 49 receives the information on the 32 incoming buses, converts it to parallel and arranges it on four parallel buses 51 each carrying information for 772 channels. The high level demultiplexer performs the complementary function in the opposite direction. The four 772 channel buses are provided to the four wire non-blocking digital switching network 52 which serves to switch in time information from selected channels for the purpose of completing connections between those channels.

The configuration of the digital switching network itself is known, being explained, for example, in "A Review of Telecommunications Switching Concepts—Part 1" and Part 2 thereof, published in Telecommunications February 1976 and March, 1976, respectively. Suffice it to say that the network, or each block thereof includes an information memory having individually addressable locations for each channel in the system. Information received and processed through the code converters is multiplexed onto the appropriate buses where each channel occupies a dedicated time slot. This information is sequentially written into the dedicated memory locations, with all samples being updated each 125 microseconds. For the purpose of making connections, the network, or each block thereof includes one or preferably two connection memories, each having an addressable location dedicated to each channel in the system. A connection is established by writing "paired numbers" into the connection memory. The address of the first line is written at the location assigned to the second line, and vice-versa to "connect" the first and second lines. Thereafter, during the time slot for the first channel the information memory is written with the data from that channel and also data is read out of the information memory at the address established by the connection memory, thereby placing the sample from the second channel into the time slot for the first channel for return to the first channel. Subsequently during the occurrence of the time slot for the second channel a similar operation takes place, with the result being that samples from the two channels are swapped in time causing the first channel to receive samples from the second channel and vice versa. In short, a communication path is established.

In order to efficiently accommodate the 3072 channels, the network is preferably broken into four blocks. Each block writes information to only one fourth of the total number of channels, that is 772 channels. However, to provide full availability, information from each channel is written into each of the four blocks.

CONTROL COMPLEX

The interaction between the elements of the system described thus far is under the control of the distributed processor control complex 55. Stated generally, the control complex detects requests for service from lines, trunks and the like, determines available class of service for those elements and completes connections in the network. To that end the distributed processor control complex 55 has circuit connections to the line circuits 33, 34, and specifically to sense points thereof for detecting the on-hook or off-hook condition of the lines and changes between such conditions. Circuit connections are also provided to control points on the line circuits and can be used, for example, to initiate or terminate ringing to selected lines, to set attenuators in the transmission path, or the like. The complex 55 also has circuit connections to the trunks, and specifically to the sense points for detecting the conditions thereof and to control points for controlling the trunks. Similar connections are provided to the feature circuits 38. Circuit connections between the control complex and the dial receivers and registers 40 are used to cause those receivers to collect dialed digits, and to receive the collected digits for the purpose of completing connections. The complex 55 also has circuit connections to the digital tone generators 41, the code converters 45 and the multiplexers 48, 49 for exercising appropriate control over tnose elements. Connections are also provided between the complex 55 and the network 52 for allowing the complex to write addresses into the connection memories for the purpose of establishing connections between the access ports.

Additionally, the system makes provision for attendant consoles 56 which typically include an array of indicators or readouts for informing an attendant of system conditions, combined with an array of pushbuttons for allowing the attendant to cause the system to perform specific functions.

Finally, for the sake of completeness, additional elements are shown connected to the distributed processor complex 55, including a system status and maintenance administration panel 57, generally located in the equipment frame for informing a craftsperson of the operational status of the equipment. A data terminal 58 provides a port for entry of information into the system, such as for changing number assignments, and for readout of information from the system, for example, traffic information or the like. A remote terminal interface 59 allows the control complex 55 to be accessed from a remote location for the purpose of trouble-shooting or updating of the program. Finally, a flexible disc playback unit 60 containing the operating program for the system is actuated to initially load the program, and may be automatically actuated to reload the program in the event of a major system failure.

In summary, each line circuit (the exemplary 3088 channel system here to be treated provides up to 2400), each trunk circuit (the system provides up to 576) and each register (the system provides for 64) occupies a dedicated channel on one of the code converters within converter module 45. Those channels are multiplexed through multiplexers 48 and 49 such that ultimately each line, trunk, register or tone occupies a dedicated time slot on one of the 772 channel network buses. During a simplified call processing routine, the control complex 55 detects a subscriber off hook condition while scanning the array of line circuit sense points. Upon detection of the off hook, the processor ultimately establishes network-through-connections by writing corresponding addresses into the connection memories in the network. The PCM encoded samples received from the lines, trunks, or the like are exchanged between called and calling subscribers every 125 microseconds. After the network-through-connection is established by the processor, the network information memories accept the PCM encoded samples from subscriber A during subscriber A's dedicated time slot and output subscriber B's previously stored sample. The subscriber A sample is stored until the occurrence of the subscriber B time slot whereupon it is read out while a new sample is stored for subscriber B. This swapping operation continues independently of the control complex 55 until a call termination or other action is sensed whereupon the connection may be cancelled or altered via a further writing of addresses into the network connection memories.

DISTRIBUTED MICROPROCESSORS

Turning now to FIG. 2, the microprocessor control complex 55 is shown in greater detail, illustrating the novel system architecture which is an important aspect of the present invention. The complex 55 which, taken as a whole, controls all of the functions of the switching exchange, segments those functions along call processing lines, and distributes the segmented functions among a plurality of microprocessor controls. In the exemplary embodiment of FIG. 2 the functions are distributed among a state microprocessor control 130, line microprocessor control 140, register microprocessor control 150, trunk microprocessor control 160, data base microprocessor control 170, console microprocessor control 180 and busy lamp microprocessor control 190. It should be noted at the outset that this particular distribution of microprocessor controls, while preferred, is merely exemplary and that in some conditions the switching functions may be distributed in a different manner. For example, in a smaller system the functions of the line and trunk microprocessor controls might be combined to eliminate one of such controls. Additionally, the busy lamp microprocessor 190 is illustrated by dashed connections, indicating that such microprocessor is optional, and is used only when an auxiliary busy lamp field is provided with the attendant console.

One aspect of the significance of this distributed arrangement will be noted with a brief digression to FIG. 8. There is shown, on a very general basis, the operating elements of a microprocessor control. The microprocessor itself, designated 112, is a commercially available device, associated with a memory system 113 which is physically conditioned by an inserted instruction program to carry out call processing functions assigned thereto. The microprocessor 112 is driven by a clock 114 which provides the necessary timing signals. Internally the microprocessor typically includes an instruction address register, an arithmetic-logic unit (ALU), an arithmetic/logic input register, and one or more accumulators together with control circuits to route the signals from one location to another with timing controlled by the clock. An address bus leads to the memory system 113 in order to select, by coded address signals placed on the bus, any particular word of the memory system, the selected word then having signals read from it or written into it via a data bus in response to READ or WRITE signals R or W created by the microprocessor. As a logical program sequence is iteratively executed, signals representing different instructions are read from memory portion 113a into the microprocessor so as to condition the latter to execute a particular type of operation. For example, the instructions can designate that a particular word (at a particular address) in a data memory portion 113b is to be read via the data bus into the microprocessor, a certain operation to be performed with that data word, and the result written back to another designated data word memory location.

In addition to the instructions and data memory field 113a, 113b, further memory fields are reserved for communication with devices external to the particular microprocessor control under consideration. High level interface fields 113c serve as means for allowing the processor to access sense and control points in the switching system. The field 113c indicates that the sense and control points are addressable as memory, even though the points addressed are physically remote from the actual memory itself. In the same way, memory fields 113d and 113e are reserved for addressing interprocessor buffers for communication with partner processors.

It is significant to note that each of the microprocessor controls 130-180 is arranged as shown in FIG. 8, each having its own program memory, including instruction memory and data memory, each having its own memory fields for addressing the switching system or partner processors, and each having its own clock. Accordingly, each processor operates asynchronously as driven by its clock, to perform the functions assigned to it by way of its program memory. It services the portions of the switching system assigned to it via its high level interface fields. It produces output commands or task signals (field 113d) requesting other processors to perform particular functions assigned to them under control of their entirely separate programs, and it executes similar commands or task signals received from other processors (field 113e) as it gets to them, under the control of its programs.

Returning to the discussion of FIG. 2, in contradistinction to conventional monoprocessor configurations wherein the sub-units communicate via a common bus under the control of an executive, the microprocessor controls 130-190 are interconnected via dedicated communication channels joining partner processors, such that the partners can exchange information as necessary while operating asynchronously of each other. Thus each processor can each be driven by its own clock, which need not be phase locked to the clocks of the other processors. In addition, the interaction between the programs of the respective processors are greatly simplified.

In the illustrated embodiment such communication paths are provided by means of interprocessor buffers which function as asynchronous simplex communication channels having a limited amount of storage capacity for data being transmitted between partner processors. Such channels are provided only between processors which have a need to communicate. Thus, the line microprocessor which must communicate only with the state microprocessor has a first interprocessor buffer 141 for carrying data from the line to the state microprocessor controller and a second interprocessor buffer 142 for carrying data in the reverse direction. Because the interprocessor buffers are alternately under the control of the sending and receiving microprocessors, depending on whether it is accepting data from the sending processor or transmitting data to the receiving processor, each buffer may be thought of as comprising a send buffer and receive buffer. This is illustrated, for example, by interprocessor buffer 141 having send section 141a connected to the line microprocessor and receive section 141b connected to the state microprocessor. As noted above the interprocessor buffer includes a limited amount of storage for data being transferred. Because it is convenient to use the same storage for both the send and receive side buffers, it is useful to think of each buffer as having a third section, for example section 141c, as memory means accessible to both send control 141a and receive control 141b. To that end each of the interprocessor buffers illustrated on FIG. 2 is shown as a rectangle with internal dotted divisional lines providing send side control a, receive side control b and intermediate storage means c.

It should be kept in mind, when considering the interprocessor buffers, that the important concept is the independent and asynchronous operation of the processors, with communication between partners along dedicated channels without the need for an executive. The interprocessor buffers themselves can be implemented or conceptualized in numerous ways. For example, they can be conceptualized as having three sections as described above, and implemented along those lines, with all three sections on a single printed circuit card. In some cases it may be convenient to conceptualize a buffer as comprising a send buffer and a receive buffer, both associated with a given microprocessor, and means for transferring data from the send buffer of a first microprocessor to the receive buffer of a second. The buffer can be implemented along those lines, or the concept applied to the three section implementation noted above. In the latter case, the send buffer encompasses the send control and intermediate storage, the receive buffer encompasses the receive control and the intermediate storage, while the means for transferring encompasses the control circuitry which transfers control of the buffer between the sending and receiving microprocessors. The central feature remains, that the partner processors have individual access to the buffers under the control of their respective programs while operating asynchronously of each other.

LINE MICROPROCESSOR LMP

Referring now in greater detail to the illustrated architecture of the control complex of FIG. 2, it is seen that the line microprocessor 140 is provided with bidirectional communication paths 141, 142 for communicating with the state microprocessor 130. In the illustrated configuration the line microprocessor 140 need not communicate with any of the other microprocessors. The function of the line microprocessor is to service the line circuits by detecting requests for service and communicating those requests to the control complex, and by exerting some control over the line circuit, in the illustrated embodiment such control being the initiation or termination of ringing on the lines or the setting of attenuators in the voice paths. To that end the line microprocessor 140 has circuit connections to the line circuit 33, 34 to which the telephone instruments 30, 31 are connected. The two illustrated line circuit and telephone instruments represent the entire range of lines which the exemplary system may service, that fact being indicated by designating the line circuits as L1-L2400. The circuit connections to the line circuits are specifically an array of sense and control points which the microprocessor is capable of addressing as memory. In other words, a block of addresses of the line microprocessor 140 (the HLI field 113c of FIG. 8) is dedicated to line circuits, and when the microprocessor addresses any location within that block, it is then in communication with the sense or control points rather than actual memory. As will be described in greater detail below the sense points are controlled by the respective line circuits to indicate the status of the associated line. The line microprocessor continues to scan the sense points to detect significant changes of state, and to communicate such state changes to the state microprocessor via the interprocessor buffer 141. As a result the system is capable of detecting requests for service, call terminations, hook switch flashes, dial pulses and the like.

The circuit connections 143 are illustrated as bidirectional, indicating that the line microprocessor is also capable of sending data to the line circuits. In the illustrated embodiment, this feature is used to control ringing in the lines. When the control complex determines that a particular line is to be rung, that fact is communicated by task signals sent to the line microprocessor 140 by the state microprocessor 130 via the interprocessor buffer 142. The line microprocessor 140 responds by addressing the word including the line circuit of interest and writing the control point of the particular line circuit in that word which sets a latch to apply an external ringing generator to that line. The line microprocessor continues to perform other tasks while the line is being rung. If the party answers, the line circuit detects the on hook to off hook transition during the normal scanning of the sense points just as the initial request for service was detected. It communicates that fact by sending task signals to the state microprocessor via the interprocessor buffer 141, and it also writes the appropriate control point to reset the aforementioned latch and terminate ringing in the answering line. Although the description of that operation might take some moments to read, the operation itself is carried out almost instantaneously.

TRUNK MICROPROCESSOR—TMP

For performing operations analogous to those of the line circuit for the trunks in the system, the trunk microprocessor 160 is provided with bidirectional communication paths 161, 162 to the state processor and bidirectional circuit connections 163 to sense and control points in the trunk circuits 35, 36. Just as with the sense and control points of the line circuits, the sense and control points of the trunk circuits are addressable as memory, and blocks of memory (the HLI field) are dedicated to such sense and control points. Because trunk operation is somewhat more complex than line operation, each trunk circuit has four sense and four control points. Accordingly, if the sense and control points are configured as eight bit words as in a line circuit, each word will accommodate only two trunks.

The trunk microprocessor 160 continually scans the sense points via circuit connections 163 to detect significant sense point transitions. Upon detection of such a transition, an appropriate task message is configured and relayed to the state processor 130 via interprocessor buffer 161. Because of the wide variety of trunk types and signaling protocols, the trunk microprocessor must reduce all trunk signaling for any trunk type to a common set of standard messages such as trunk seize, trunk disconnect, stop dial, etc. Upon receipt of such a task message the state processor 130 determines the appropriate action, configures an appropriate control message to carry out such action, and communicates such control task message to the trunk microprocessor 160 via the interprocessor buffer 162. The trunk microprocessor 160 executes its task by writing the appropriate control point of the trunk in question via the circuit connections 163.

REGISTER MICROPROCESSOR—RMP

As noted previously the system includes a plurality of dial receivers and registers for receiving dialed information from the various network ports by way of the network. For receiving and analyzing dialed information, a register microprocessor 150 is provided having bidirectional communication paths provided by interprocessor buffers 151-154, and circuit connections 155 (readable as addressed data memory) to the registers in the system. When the state microprocessor 130 determines that dialed digits are to be received, after connecting an idle receiver to the originating station, it sends a message to the register processor via the interprocessor buffer 152 defining the type of digits to be collected. The register processor monitors the receiver dial pulses or DTMF tones via the circuit connections 155 until the first digit is recorded. Once recorded, the first digit is sent to the data base processor via the interprocessor buffer 153 with a request for a first digit translation to define the number of digits to be received. The register processor 150 continues to receive digits and awaits a reply message from the data base microprocessor which is communicated via the interprocessor buffer 154. The register processor takes in the expected digits, and after all digits have been received sends them along with identifying information to the data base processor via the interprocessor buffer 153. Thereupon the data base processor communicates with the state processor 130 for completing the connection.

DATA BASE MICROPROCESSOR—DMP

The data base microprocessor 170 stores within its program memory all class of service and number translation tables for the system. In response to the aforementioned task message from the register processor via the interprocessor buffer 153 requesting a first digit translation, the data base microprocessor 170 determines from such tables (which define the local numbering plan) the number of digits to be received, and prepares a message for the register microprocessor to be transmitted via the interprocessor buffer 153. Subsequently the data base microprocessor receives all of the digits from the register microprocessor via the interprocessor buffer 153 and performs a dialed number translation on the digits by appropriate reference to the aforementioned tables to determine the network slot number of the dialed station along with the class of service information for both the dialed and dialing stations. It configures an appropriate message including this information and transmits that message to the state microprocessor 130 via the interprocessor buffer 171.

The data base microprocessor 170 illustrates the point that a group of call processing functions can be segmented and assigned to one of the distributed processors, without the need for providing that processor with circuit connections for direct control of the switching system. The data base microprocessor has no sense points which input call processing stimuli, nor does it have control points which function directly in call processing. The call processing functions assigned to the data base processor are carried out by communication with its respective partners, the state and register processors.

The data base processor does have circuit connections to the switching system although they are not used in the call processing mode. For example, the data base processor provides input ports for external data entering the system, such as from the system status and maintenance administration panel 57, data terminal 58, remote terminal interface 59 and flexible disc 60 described in connection with FIG. 1. Such circuit connections are represented at 176, wherein the aforementioned elements 57-60 are referred to generally as data terminals.

STATE MICROPROCESSOR—SMP

As can be appreciated from the number of times the state microprocessor control 130 has been mentioned thus far, it is a focal point of the control complex in that it communicates with each of the other microprocessor controllers. The state microprocessor maintains a record of the current state of activity of each line, trunk and register in the system. Incoming interprocessor buffer messages from the various controllers inform the state microprocessor of progress by devices in the system. As a generality, the state microprocessor considers the current state of a device and the devices to which it is connected, the current incoming interprocessor buffer message, and the relevant class of service information to determine what next state the device in question should acquire. Having determined the next state, it causes the device to assume that state either through appropriate interprocessor buffer messages to partner processor or processors, or by way of establishing connections in the network. The state microprocessor has circuit connections indicated at 131 to the network 52, and specifically to network controller 132 which is illustrated as a portion of the network. The network controller 132 serves to interface the state microprocessor output lines to the network, and specifically to the connection memories. In the present exemplary embodiment, the state microprocessor uses its high level interface field (113c of FIG. 8) to access the network to write or take down connections. The state processor writes two types of data into the network controller by addressing its high level interface field. The first type is the connection memory address at which a new connection is to be written. The second type is the actual connection data to be written at that address. The network controller 132 accepts this information and at the appropriate point in the cycle of the network writes the connection. The network is thus available to the state microprocessor and addressable as memory for the purpose of establishing connections between the ports in the system.

CONSOLE MICROPROCESSOR—CMP

For interfacing the control complex to one or more attendant consoles, up to a maximum of 16, circuit connections indicated at 183 are provided interconnecting such consoles to the console microprocessor 180. It should be noted in passing that attendant consoles are not necessary to the operation of the system but are provided only when desired. The console microprocessor receives messages corresponding to button pushes at the attendant consoles via the circuit connections 183, analyzes the messages, and returns messages that will light appropriate lamps on the attendant consoles via the circuit connections 183. In addition, the console microprocessor sends commands to the state processor 130 via the interprocessor buffer 181 to keep the state processor properly informed of device states, and to request the state processor to make appropriate connections. The console microprocessor 180 also receives messages from the state processor 130 via interprocessor buffer 182, such commands directing the console processor to attend certain calls.

The console microprocessor also communicates with the data base microprocessor 170 via interprocessor buffer 174, for example to request console class of service, and receives messages from the data base microprocessor via the interprocessor buffer 175, for example, responses to class of service requests.

BUSY LAMP MICROPROCESSOR—BMP

It was noted above that an optional busy lamp field may be provided with the attendant's console to indicate the status and allow direct station selection for selected ones of the system lines within particular groups. To accomplish that it is necessary to provide communication between the busy lamp microprocessor 190 and the console microprocessor 180, such communication being accomplished via interprocessor buffer 191 communicating requests by the busy lamp microprocessor to the console microprocessor, and by interprocessor buffer 192 communicating requests or messages in the opposite direction. In addition, the busy lamp microprocessor has simplex communication with the state microprocessor via the interprocessor buffer 193, such buffer allowing the state microprocessor to issue commands to the busy lamp microprocessor. The busy lamp microprocessor has circuit connections 194 to the busy lamp field/direct station select consoles, the connections 194 indicating that up to 16 busy lamp field consoles may be provided.

It is noted in summary that the control complex architecture described above simplifies both programming and communication between processors in the distributed complex by providing dedicated channels only to processors which must intercommunicate. In the simple case of the line or trunk microprocessors, communication is provided only between such processor and the state microprocessor. In that case, two interprocessor buffers are required one to route information in each direction. The interrelationship between the register, data base and state microprocessors illustrates a more complex situation where the register and data base microprocessors must communicate not only with the state microprocessor, but also with each other. The structure described in detail above serves to accomplish this function. Also worthy of note are the interprocessor buffers 172 and 173 which both communicate data from the state microprocessor to the data base microprocessor, indicating that more than one such buffer may be provided to assure adequate communication on over a path expected to be busy. Also worthy of note is the simplex communication between the state microprocessor and the busy lamp microprocessor provided by interprocessor buffer 193, illustrating that the buffers may be used when communication is desired in only one direction.

FIGS. 3-6 schematically illustrate the interrelationship between the elements of the control complex 55 as well as the relationship between those elements and other portions of the switching system. FIG. 3 relates to the microprocessor control itself, and therefore illustrates the structure of each of the state 130, line 140, register 150, trunk 160, data base 170, console 180 or busy lamp field 190 microprocessor controls. Each of those controls includes a processor 200 which is the control element of the system, a memory 102 programmed to cause the processor to carry out the functions assigned to it, and interprocessor buffer means 203 for providing communication paths with partner processors. For the sake of system reliability, the entire controller thus described, as well as the bus structure, is duplicated such that if a module of the primary processor fails a corresponding module of the secondary processor can be automatically switched into position in its place allowing the system to continue to function. The redundant copy of each microprocessor control includes elements which are the same as the corresponding elements in the primary copy, and may simply be switched into place to replace a faulty element as necessary. Accordingly, the redundant copy 1 elements will be assigned primed reference numerals corresponding to their unprimed counterparts in the copy 0 control. Accordingly, a second processor 200' is provided as well as a second program memory 201' and a second set of communication paths illustrated by interprocessor buffer 202'. As one means of detecting system malfunctions, each of the processor controls includes two microprocessor chips, microprocessor chips 207, 208 making up processor 200 and microprocessor chips 207', 208' making up processor 200'. The microprocessor chips, themselves are commercially available devices, such as the Intel 8080 or Texas Instruments TMS 8080. Those devices can be paired for checking as illustrated in FIG. 3, or used singly in a less sophisticated system. When used in pairs, each of the microprocessor chips within a processor is driven by the same program, and the microprocessor outputs are continually compared such that any discrepancy noted by the comparator is used as a signal indicating a potential system malfunction.

The copy 0-microprocessor 200 has a bus 212, illustrated as bidirectional for the sake of convenience, connecting it to its interprocessor buffer array 202. An output bus 213 is provided representing the connections between the copy 0 buffers 202 and the copy 0 controller of partner processors. A second bus 214 is also provided, coupled between the copy 0 buffer 202 of the control in question and the copy one control of the partner processors. Thus, if the copy 1 control of a partner processor were active, the illustrated bus structure would allow the copy 1 processor to communicate with the copy 0 processor in question. Thus, redundancy is provided on a processor by processor basis such that if a single processor fails only that unit is replaced, leaving backup processors for the remainder of the control complex. It is seen that the copy 1-control 200' is provided with a similar bus 212' interconnecting it to its interprocessor buffer 202', and a pair of output busses 213', 214' to the respective copies of the partner processors. The flexibility provided by this bus structure will now be apparent.

Similar flexibility is provided by the bus structure interconnecting the program memories 201, 201' to the controls 200, 200'. It is seen that a first bus 218 connects the copy 0 memory not only to the copy 0 control 200 but also the copy 1 control 200'. Similarly, the bus 210' connects the copy 1 program memory 201' to both the copy 0 controller 200 and the copy 1 controller 200'.

Further details of that bus structure are shown in FIG. 4 wherein the program memories 201, 201' are shown to comprise a memory file including a plurality of memory cards $M_1-M_d$. As will be appreciated, using the illustrated structure the copy 0 and copy 1 memories are replaceable on a card for card basis such that if a single memory card fails it can be automatically replaced by its backup in the redundant file, leaving available backup for the remaining cards. To accommodate that function a pair of bus multiplexers 220, 220' are provided having bus connections to each memory card for each of the copies and other bus connections to both controls 200, 200'. Thus, the system can be configured with any combination of memory cards serving either the copy 0 or copy 1 controllers.

Whereas FIG. 4 illustrates the bus structure between each microprocessor control unit and its associated program memory, FIG. 5 shows the bus structure interconnecting redundant copies of the controllers and their partner processors. For the sake of illustration, FIG. 5 shows the bus structure interconnecting state microprocessor control generally indicated at 130 and like line microprocessor control generally indicated at 140. It will be recalled from the description of FIG. 2 that the line microprocessor communicates only with the state microprocessor. Accordingly, it will be realized that FIG. 5 shows only this portion of the bus structure, it being appreciated that the state microprocessor has additional elements for communicating with other ones of its partner processors.

FIG. 5 shows the redundant copies of the line microprocessor control 140, 140' and the state microprocessor control 130, 130', each of the line and state processors occupying different files in an equipment frame and interconnected by inter-file wiring 225 as shown. Each of the microprocessors controls 130, 130', 140, 140' includes an associated program memory, and the program memories may be interconnected between copy 0 and copy 1 as described in connection with FIG. 4. For sending messages from the copy 0 line microprocessor 140 to the state microprocessor, the interprocessor buffer 141 has the send section 141a connected to the copy 0 line microprocessor 140. It will be recalled that each of the interprocessor buffers, such as buffer 141 includes intermediate memory in the preferred embodiment, although such memory, for the sake of simplicity, is not illustrated in FIG. 5. The receive side section 141'b of the buffer 141 is connected to the state microprocessor 130 by a bus structure which can be configured for communication to either copy of the state microprocessor. Accordingly, the receive side control 141'b is connected to a copy 0 bus extender 222 and also to a copy 1 bus extender 222', the bus extenders being connected to their respective copy 0 or copy 1 microprocessor controls 130, 130'. The bus extenders 222, 222' are simply interface circuits which provide d.c. isolation between the microprocessor controls and thus will not be described in further detail. To allow the copy 1 line microprocessor controller 140' to communicate with both the copy 0 and copy 1 state microprocessor controllers, the interprocessor buffer 141' has its send side 141a' connected to copy 1 control 140' and the interprocessor buffer return side 141b' connected to both of the bus extenders 222 and 222'. The interprocessor buffers 142, 142' communicating information from the state microprocessor control to the line microprocessor control are similarly connected. Accordingly, either copy of either microprocessor control may communicate with either copy of its partner such that an operable configuration may be attained even in the presence of circuit failures.

PROCESSOR CONTROL OF SWITCHING SYSTEM

Having drawn attention to the bus structure interconnecting the microprocessor and its associated program memory, and to the bus structure interconnecting partner processors, attention will now be directed to FIG. 6 which focuses on a typical microprocessor control and its relationship to the switching system. As described in connection with FIGS. 3 and 4, there is shown a redundant pair of microprocessor controls 200, 200', their associated program memories 201, 201' and the bus multiplexers 220, 220' for interconnecting such elements. Also like FIG. 5, there is shown a portion of redundant sending interprocessor buffers 141, 141' as well as return partner interprocessor buffers 142, 142' connected through associated bus extenders 221, 221'. Timers 229, 229' are connected to the outputs of the respective processor copies 200, 200' to monitor processor operation, and are serviced on a regular basis by the associated processor copy. If the processor fails to service the timer within the pre-established interval, the timer overflows to indicate that the processor has malfunctioned, thereby providing an appropriate input to the maintenance and fault detection circuitry.

FIG. 6 further shows that a plurality of bus extenders are provided for connecting the microprocessor control to other elements of the system, allowing the microprocessor control to address those elements just as the interprocessor buffers are addressed. In other words, both the interprocessor buffers and the external elements are addressed as words of memory, particular blocks of memory addresses being dedicated to such elements, such that when those addresses are generated by the microprocessor, the microprocessor is in communication with the other devices rather than with actual memory.

The bus extenders 230, 230' are provided to allow the active one of the redundant microprocessors to communicate through the active one of high level interface circuits 231, 231' to the switching system via low level interface circuits 233-235. The address bits generated by the microprocessor are decoded in this chain of circuitry to put the processor in contact with sense and control points 237-239 distributed throughout the switching system. For example, the address bits can be partly decoded in the bus extender, partly in the high level interface and partly in the low level interface, allowing the processor to selectively address groups of eight sense or control points. The processor can couple the address with a read signal to check the state of a group of sense points via its data bus, or with a write signal to write data on its data bus into a selected group of control points. With respect to address decoding, it is seen that the bus extenders 230, 230' function to selectively address the high level interfaces 231, 231', or via connections 250, 250', similar high level interfaces in other equipment frames. Similarly the high level interface 231 or 231', when addressed, can address the group of low level interfaces 233-235 in file 1, or via connections 251, 251', similar groups in other files. Finally, the low order address bits passed to the low level interfaces 233-235, activate one of such interfaces and cause it to select one of the groups of eight sense or control points CD1-CDY.

Accordingly, if a microprocessor is in a read mode, an addressed sense point will be read as memory to provide data to the microprocessor control. Assuming, for example that the high level interface 231 is addressed and the appropriate bits address a particular word serviced by the low level interface 234, the data from the addressed sense points in the group 238 will be available on the microprocessor's data lines, such that it can read the condition of the 8 sense points in question. Similarly, if the processor is in the write mode, data will flow from the processor through the circuitry in question, to the control points to write those control points as determined by the processor. Thus, in a scanning mode the processor generates the appropriate address to activate the bus extender 230 and the high level interface 231, and manipulates the lower order address bits to actuate the low level interfaces 233–235 in sequence, thus being able to scan all of the sense points in the file in question. The CPU then manipulates the appropriate bit in the address to enable a subsequent file, and performs a similar operation to scan those points. Writing can be accomplished in the same fashion, the processor simply actuating the write as opposed to the read line.

The bus extenders 240, 240' illustrate that the processor can communicate with still further devices. In the illustrated embodiment, those bus extenders communicate with an input/output device 241 and a maintenance display panel 242. These elements are positioned in the equipment frame, the maintenance panel 242 providing an indication of system status, and the input/output panel 241 allowing a craftsperson certain control over the operation of the system.

As noted at the outset, the total function of the switching exchange is distributed among the individual microprocessors of the control complex, which exchange data only as necessary in order to coordinate their efforts. Further details on that interrelationship will be given hereinafter. For purposes of a complete disclosure attention will first be directed to a more detailed description of the elements described in connection with FIGS. 2 through 6. In general the description will progress by way of a more detailed block diagram, followed by a circuit diagram of a particular embodiment. It is to be remembered, however, that these details are offered as exemplary embodiments of the elements in question, and that such elements may be implemented in numerous ways apparent to one skilled in the art without departing from the scope of the invention.

IPB STRUCTURE—OVERVIEW

Turning now to FIG. 7, there is shown a more detailed block diagram of an interprocessor buffer. Since each of the interprocessor buffers shown in FIG. 2 can be identical, the buffer illustrated in FIG. 7 will be taken as interprocessor buffer 141, that is, the buffer which communicates data from the line microprocessor 140 to the state microprocessor 130. As described generally above, the buffer 141 includes a send section 141a, a receive section 141b and intermediate storage 141c individually accessible to both sending and receiving microprocessors. The send side control 141a has circuit connections to its associated copy of the microprocessor 140, among which are address and parity 250 comprising address bits A1–A16 and AP, and data plus parity 251 comprising data bits D1–D8 and DP. Control signals 252 from the sending microprocessor include a read signal and a write signal. A copy active signal 253 is also provided to activate the send side control when the microprocessor copy connected thereto is the active one of the redundant pair. Both the send side control 141a and the receive side control 141b are assigned a unique address by interprocessor buffer address straps 254, which are wired in the back plane of the card file. Accordingly, the microprocessor has the ability to selectively address its interprocessor buffers by appropriate control of signals on the address lines 250.

The receive side control 141b is connected to both copies of the receiving microprocessor and accordingly includes two sets of address and parity lines 255, 255', two sets of data and parity lines 256, 256', two sets of read/write control lines 257, 257' and separate copy 0 active and copy 1 active lines 258, 258'.

Turning now to the intermediate storage, it is seen that the memory is divided into two sections, a 15 byte message buffer 260 and a single byte status latch 261. The buffer 260 is a read/write memory having a capacity of 15 bytes, each byte comprising 9 bits, 8 bits of data plus parity. The status byte 261 also holds 9 bits and, in addition to storing data for transfer between sending and receiving processors, functions as a ready/done flag for transferring control between such processors. Finally, a buffer address multiplexer 262 is provided for addressing the 15 byte message buffer 260, and individually allows address access to that buffer from the send and receive side controls.

With exceptions to be noted below, the send side control 141a generally writes task signals to the intermediate storage 141c, whereas the receive side control 141b generally reads those task signals. To that end, the data signals coupled via connections 251 to the send side control are provided as data inputs 264 to both the status byte latch 261 and the message buffer 260. Writing of the status byte latch 261 is controlled by a write signal 265 decoded from incoming control signals 252. Reading or writing of the 15 byte buffer 260 is under the control of a read/write signal 266 also derived from incoming control signals 252. Data to be written is provided on bus 264, whereas data read from the memory is coupled to output bus 271. The four low order address bits AS1–AS4 are used to selectively address the words within the memory 141c, the send side bits on line 267 and the receive side bits on line 269 being coupled as inputs to the buffer address multiplexer 262, such that a selected set passes through the multiplexer to address the words of memory. The state of the address multiplexer 262 is determined by a select signal 268 produced by the send side control 141a. The send side control monitors the state of the status byte latch 261 to hold the interprocessor buffer ready to receive data from the sending processor whenever the status byte latch is in the all 0 condition, and to transfer control to the receive side whenever non-0 data appears in the status byte latch.

The word stored within the status byte latch is readable by both the send and receive side controls, the output data 270 comprising DS1–DS8 and DSP being connected to both of such controls. Accordingly the send side processor can read the status byte to determine if the interprocessor buffer is available to transfer a command, whereas the receive side processor can similarly read the status byte to determine if there are any commands for servicing.

The receive side control has no write capability with respect to the 15 byte message buffer 260, but does have write capability to the status byte latch 261. This is provided by means of a control set line 272 and a control reset line 273. The reset line 273 allows the receiving controller to reset the status byte 261 after reading a message therein to transfer control back to the sending processor. The set capability is utilized mainly in the maintenance mode. Finally, parity checking is done in both the send and receive controls and all-seems-well lines are provided as outputs from each, such lines having a pulse placed thereon in the event a parity error is detected. The send side control has only a single all-seems-well line 274, whereas the receive side control has both copy 0 and copy 1 all-seems-well lines 275, 275'.

As noted previously, the interprocessor buffers are the asynchronous communication channels which link partner processors, and are provided to transfer task signals between processors for the purpose of coordinating the functions of the switching system. It will now be apparent that each of the partner processors connected via an interprocessor buffer has separate access to the buffer such that the sending processor can write a message while the receiving processor is performing other functions, following which the sending processor can return to servicing its dedicated elements while the receiving processor, when it finds time, can read the message and execute the task signal. In the illustrated embodiment, 16 bytes are provided for storing task signals. These task signals, depending on the complexity of the message may be as short as 2 bytes or as long as 16 bytes. If the messages are short, a group of such messages may be loaded into the buffer before transfer to the receiving processor.

The first byte of any task signal specifies the command corresponding directly to a task to be done within the receiving microprocessor. In the table of commands which will be described below, the command itself is referred to as the reference code. Following the command will be one or more bytes of information, the number of which varies from command to command, but is known by the receiving processor for each particular type of command. Specific commands and command formats are uniquely specified for both the sending and receiving microprocessors. This is desirable to ease decoding and illegal state checking of command bytes and to ease system debugging and maintenance functions. The command code 00 (null) is used throughout the system as a stop/no-command indicator. Any byte that is 00 when a command code is expected means "no further information in this buffer."

TRANSFER OF TASK SIGNALS

The normal operation of the control complex to transfer a task signal from a sending to a receiving microprocessor is as follows. After a sending microprocessor executes a program which produces as an output a task signal for a partner processor, it reads the status byte 261 to determine whether the buffer is empty and ready to receive a message. If it is, it loads the buffer, starting with the message buffer portion 260, and lastly loading the command byte of message 1 into the status byte latch 261. The buffer address multiplexer thereupon switches address control of the memory 260 from the sending to the receiving microprocessor. The receiving microprocessor during its normal servicing of the portions of the switching exchange assigned to it, scans the status byte to see if any task signals are waiting to be executed. When it determines that data is loaded in the status byte latch 261 it will initially re-read the status byte to assure that the information had stabilized, then proceed to read and execute each of the task signals contained in the buffer. After execution of the last task, the receiving processor produces an appropriate signal on the control lines 257, 257' to reset the status byte latch 261, indicating the interprocessor buffer is ready for transfer of another message.

There are 256 locations of memory reserved in each microprocessor for buffer addressing. Conveniently, both sending and receiving microprocessors use identical addresses to access the buffer connecting them. There are two sets of address usage, one grouped about the state microprocessor and another about the data base microprocessor.

The overall buffer addressing plan uses the high order 8 bits as a displacement to the buffer location. More specifically, the high order 8 bits must form a particular pattern in order to allow any processor to address its interprocessor buffers. The next 4 bits select a specific interprocessor buffer (one of 16). The low order 4 bits, as noted in connection with the description of FIG. 7, select individual words withinthe buffer.

Due in part to the distributed control complex architecture, the programs concerned with driving or reading the interprocessor buffers are uniform in all microprocessors. In a sending microprocessor, driving work is done by a sub-program after an interprocessor buffer queue has been loaded by other sub-programs. As a sub-program in a microprocessor creates task signals for a partner processor, such task signals are loaded into an interprocessor buffer queue in its data memory. The buffer driver sub-program is brought into action periodically by the procesor main program. The buffer driver sub-program tests the interprocessor buffer queue for messages waiting to be sent. If there are any, it causes the status byte latch 261 in the interprocessor buffer to be tested. If it detects a null condition (buffer available) the driver loads as many waiting task signals as possible into the buffer. It follows the task signals with a null in the next consecutive memory location unless all 16 bytes of the buffer are used. Finally, it loads byte 1 last with the reference code of the first message, thereby indicating that the buffer is ready to be read.

In the receiving processor, the main program periodically calls the command analyzer sub-program which tests each incoming interprocessor buffer for task signals waiting to be serviced. More specifically, the command analyzer causes the status byte 261 of each incoming interprocessor buffer to be read in order to test for a non-zero (ready) condition. When a ready buffer is detected, the analyzer re-reads the command byte to assure its integrity. The byte is tested for all-0 (stop/no-command) and if tested to show all-0, the analyzer returns to the main program. If the status byte is valid, the command analyzer analyzes the command contained therein and jumps to the sub-program which handles that specific command. The sub-program reads the data following the command byte and performs the required functions whereupon it returns to the command analyzer with a memory pointer to the next command, if any. The analyzer checks that the next command byte location is still within the interprocessor buffer, and if it is, reads the next command. If the command is a null, the analyzer returns to the main program as stated above. If the command is valid, it services it in the manner described above. This processing continues until all task signals in the interprocessor buffer are exhausted, whereupon the receiving processor resets the status byte then returns to the main program.

IPB STRUCTURE—FIGS. 9a–9h

With that working knowledge of the structure of the interprocessor buffers and their operation under the control of the programs of the respective sending and receiving processors, attention will now be directed to FIGS. 9a–9h showing a circuit diagram of a preferred embodiment of such interprocessor buffer.

IPB LOADING

Turning first to FIG. 9a, there is shown at 250 the incoming send side address lines SA1–SA16 and SAP from the sending microprocessor. Inverting drivers generally indicated at 280 couple the incoming send side address signals to decoding circuitry. The highorder 8 bits SA9–SA16, which it is recalled provide a fixed displacement assigned to interprocessor buffers, are decoded by gating circuitry 282. It will be appreciated from a consideration of the circuit diagram that the fixed displacement is hexidecimal 1F, which when received by the decoding circuitry 282 produces a high at the output of AND gate 283. That AND gate enables a comparator 284 which serves to decode the address assigned to a particular interprocessor buffer. It is seen that the four address lines SA5–SA8 are provided as one group of inputs to the decoder 284 for comparison against the strapped address signals ST5–ST8. Each interprocessor buffer has strapped connections in the back plane wiring related thereto which assign an address to that buffer unique within its grouping. Accordingly, when the send side microprocessor puts that address on the address lines SA5–SA8, the comparator 284 is satisfied, enabling that particular interprocessor buffer. It is seen that the output of decoder 284 partly enables a pair of NAND gates 285, 286 (FIG. 9b). The NAND gate 285 has a second input provided from the sending microprocessor comprising a message write signal SMWR*. The output of NAND gate 285 is coupled to the write inputs of the memory circuits 288 which make up the message buffer 260, so that the sending microprocessor can write the message buffer. The second input of NAND gate 286 is provided by the output of a four input AND gate 289, which has as inputs the four low order send side address signals SA1–SA4. Accordingly, when the four low order address bits are all low (making the inverted address signals all high), the AND gate 289 is satisfied thereby enabling the NAND gate 286. It will be apparent that this occurs when the sending microprocessor is addressing word 0 in the interprocessor storage, that is, the status byte. Accordingly, the output of NAND gate 286 may be taken as a send side status byte access signal. That signal partly enables a NOR gate 290 which has coupled to its second input the send side message write signal SMWR* buffered by two inverters. The output of NOR gate 290 is connected to the clock inputs of the latches 291 which comprise a primary status byte latch 292 so that the sending microprocessor has the ability to write the primary status byte latch.

The information which is written into the message buffer and status byte latch is controlled by the sending microprocessor which places 8 bits of data and parity on the data lines generally indicated at 251 (FIG. 9c). The send side data SD1–SD8 and SDP is coupled through an array of inverting drivers generally indicated at 294 and provided as inputs to both the memories 288 of the message buffer 260 and to the data inputs of the latches 291.

For addressing the memories to store this data in particular locations, the four low order address bits SA0–SA4 are connected as inputs to the buffer address multiplexer 262 whose outputs in turn are coupled to the address inputs of the memories 288. The selector input of the buffer address multiplexer 282 is driven by decoding circuitry generally indicated at 296 which is responsive to the output condition of the status byte register 292. It is seen that the output signals D1–D8 from the status byte register are provided as inputs to that gating circuitry such that the output of a NAND gate 297 will be low only when the status byte register is in the null condition. In that condition the NAND gate 297, having its output coupled to the select input of the buffer address multiplexer 262 causes that multiplexer to pass the low order address signals SA1–SA4 received from the sending microprocessor. In the other condition, it causes the multiplexer 262 to pass the receive side address signals RA1–RA4 which will be referred to below. In either case, the address signals are passed to the message buffer 260 to selectively address the word locations therein. In short, when the sending microprocessor has a message to be written into a particular interprocessor buffer, it addresses that buffer, addresses a specific word location with the four low order address bits, and outputs the data to be written along with a message write signal SMWR whereupon the data is written into the selected word in the message buffer. As a last step of loading a buffer the sending microprocessor addresses the status byte by producing the address 0000 in the four low order address bits. That satisfies AND gate 289 which, in turn, satisfies NAND gate 286, to allow the SWR* write signal to pass NOR gate 290, which clocks the latches 291. As a result, the data held on the microprocessor data lines is loaded into the primary status byte register. The fact that a non-null word is in the status byte is detected by gating circuitry 296 which thereupon switches control of the buffer address multiplexer 262 from the send side to the receive side microprocessor.

IPB UNLOADING

Turning now to the receive side control, and with reference to FIG. 9d, it is seen that the receive side address bits 255, 255' include only the eight low order address bits A1–A8 and parity AP. It is recalled from FIG. 6 that the receiving microprocessor communicates with the interprocessor buffer through a bus extender. For purposes of minimizing interframe wiring and also for purposes of reliability, it is convenient to partially decode the receive side addresses on the bus extender itself, rather than pass all bits to the lower order circuitry, in this case the interprocessor buffer. As will be described below, the high order 8 address bits are decoded in the bus extender where they are used as enabling signals to pass the control signals 257, 257'. Accordingly, the read signal RPL* and the write signal WR* coupled via the bus extender to the interprocessor buffer at 257, 257' are active only when the receiving microprocessor outputs the displacement address assigned to interprocessor buffers.

The address signals and control signals from the respective microprocessor copies are coupled as inputs to a group of 2 to 1 multiplexers 300 which serve as selectors to pass signals from one or the other of the microprocessor copies. Selection is accomplished by the output of a driver 301 which has provided as an input the copy 1 active signal ACT*/1. A gross enabling signal is provided by the send active signal SACT* which is produced by the bus configuration circuitry associated with the microprocessor. The SACT* signals are coupled via inverter 302 to the input of a NAND gate 304. The second input of gate 304 is driven by an Exclusive OR gate 303 which has its inputs driven by ACT* for copies 0 and 1 inverted by gate 309, 301 respectively. The output of NAND gate 304 drives the enable input of the selectors 300 such that they are enabled only if SACT* is active and one but not both of the ACT* signals is active.

As in the case of the send side controller, the middle order address bits A5–A8 selectively address individual interprocessor buffers, being coupled to a comparator 305 which compares A5–A8 against the strapped address signals ST5–ST8. When a match is detected the comparator 305 is satisfied, producing a high output signal which is passed to the A input of a 2 of 4 decoder 307 (FIG. 9e). The decoder is enabled by a low signal applied to its gate terminals via an inverter 308, whose input is the read pulse RPL from the active microprocessor. The copy 0 active signal, passed through inverter 309, is coupled to the control input of the upper half of the selector 307, whereas the copy 1 active signal, passed through inverter 301, drives the control input of the lower half. Accordingly, which half of the selector 307 is active depends on which copy of the receiving microprocessor is active. Assuming copy 0 is active, the information provided on the A and B inputs is decoded to activate one of the four upper output lines. With the call processing comparator 305 satisfied, and assuming that the maintenance comparator 312 is not satisfied, the 1Y1 output of the selector 307 will be enabled, thereby satisfying an AND gate 314 which produces as an output signal a message read copy 0 signal MRD0. That signal enables a plurality of tri-state drivers 315 (FIG. 9f), which allow data signals to pass from the interprocessor buffer to the copy 0 data output lines D1/0–D7/0 and DP/0. Alternatively, when the copy 1 control signal is active an AND gate 316 is satisfied to enable the drivers 317 for copy 1 data.

The data to be passed by the drivers is coupled thereto via selectors 318 which receive as one set of inputs the 8 bits of message data and parity MD0–MD8 and MDP from the message buffer 260, and as a second set of inputs the outputs of a secondary status byte register 320. The relationship between the primary and secondary status byte registers will be described below. Assume for the moment that the secondary status byte register 320 contains the same data as the primary register 292.

The select input of the multiplexers 318 is driven by a four input AND gate 321 (FIG. 9d) which is responsive to the four low order address bits inverted in selector 300. Accordingly, when those bits are all 0 (indicating the status byte is being addressed) the AND gate 321 is satisfied, which causes the selectors 318 to pass the data from the secondary status byte register to the active group of tri-state drivers 315, 317. When a word other than byte 0 is being addressed, the output of the AND gate 321 is low, causing the selectors 318 to pass data from the addressed word of the message buffer 260. Which word will be passed is dependent on the four low order address bits, those bits inverted by selector 300 being coupled as inputs to the buffer address multiplexer 262 (FIG. 9b). When the receive side microprocessor has control, the selector input to that multiplexer will cause the receive addresses to be passed therethrough, to address selected words within the memories 288.

In summary there has been described the structure which allows a sending microprocessor to selectively write data into interprocessor storage (including the message buffer and status byte), and also the structure which allows the receiving microprocessor to read that storage. It will be apparent that address control of the storage by the sending and receiving microprocessor is transferred by hardware within the interprocessor buffer, and specifically by decoding circuitry 296 which responds to the condition of the status byte register 292. When that register stores a null, send side addresses SA1–SA4 are passed through the multiplexer 262 to the message buffer 260. In any other condition receive side address signals RA1–RA4 address that storage.

SEND-RECEIVE SIDE SHARING OF IPB

Since the status byte serves as a ready/done flag in the present embodiment, it is necessary to allow the sending microprocessor to read the status byte in order to determine if the buffer is availabe to receive a task signal. Similarly, it is necessary to allow the receiving microprocessor to write the status byte in order to signal completion of servicing of task signals previously written. Attention will now be directed to the means for accomplishing those functions.

In the presently preferred embodiment, the status byte is comprised of the primary and secondary registers 292, 320. This represents a refinement of the approach utilizing only one such register accessed by both sending and receiving processors. In call processing both approaches are suitable because the receiving processor always looks to the status byte twice to assure that the data there contained is valid. However, in a limited number of cases in the maintenance mode, the status byte might be written by one processor then read by the other before the data has stabilized. The primary and secondary status byte register configuration shown herein is utilized to cover that contingency.

As described above the primary status byte register 292 receives the reference code portion of a command signal as the last step of loading an interprocessor buffer. That data word is clocked into the primary register by the status word write SWR signal produced by NOR gate 290. Thereupon the decoding circuitry 296 recognizes the non-null condition of the primary status byte and transfers address control over the message buffer 260 to the receiving processor. In this condition, however, the sending processor retains the ability to read the status byte to determine when the buffer is again available to receive a further task signal. To accomplish that a NAND gate 330 has its first input driven by the output of the call processing comparator 284, which has a high output when the interprocessor buffer in question is addressed. The second input of NAND gate 330 is the inverted send side read pulse SRPL. When those two signals concur the output of NAND gate 330 is drive low, which low signal is applied via AND gate 331 to the gate inputs of selectors 332.Accordingly, the selectors 332 are enabled to pass one of the two groups of input data, that is the message data MD1–MD8, MDP or the primary status byte data D1–D8, DP, depending on the state of the selector input. When the send side microprocessor is reading the status byte, it outputs the address 0 in the four low order address bits, which in turn satisfies the AND gate 289 to select the status byte data as described above. Thus, the send side microprocessor can access the primary status byte register 292 even though control has passed to the receive side microprocessor.

As noted above, whether or not the receive side microprocessor is in control of the interprocessor buffer, it periodically scans the status byte in order to detect task signals to be executed. With the primary and secondary register arrangement illustrated, it can read the secondary status byte at any time and it can update the secondary with data from the primary at any time except when the sending processor is accessing the primary. To that end, the output of the send enable NAND gate 286 (FIG. 9b) is coupled to the input of an AND gate 335 (FIG. 9e) whose output in turn is coupled to the D input of a flip-flop 336. Accordingly, with the send side active, the output of gate 335 remains low such that even if the flip-flop 336 is clocked, its $\overline{Q}$ output will remain high. This will prevent clocking of the secondary status byte register 320 so that it retains the data written from the primary on the last update. But even in that condition when the receive side processor addresses the IPB in question to read the status byte, the comparator 305 is satisfied and causes the selector 307 to produce a message read signal MRD0, which in combination with the 0 address detected by AND gate 321 enables the tri-state drivers 315 for reading the secondary status byte.

When the send side is not accessing the status byte register, the send enable signal coupled as an input to AND gate 335 will be high. The second input is provided by the $\overline{Q}$ output of another flip-flop 337 which, except in conditions to be noted below, remains high. Accordingly, in the normal condition the output of AND gate 335 is high, maintaining a high signal on the D input of the flip-flop 336. The clock input for the flip-flop 336 is produced by an AND gate 338 having a first input driven by an AND gate 339. It is seen that the AND gate 339 is satisfied whenever the interprocessor buffer in question is addressed with the low order bits addressing the status byte (0000). The second input of AND gate 338 is provided by the read pulse from the active microprocessor RPL passed through selector 300. Accordingly, the receiving microprocessor clocks a data 1 into the flip-flop 336 driving the $\overline{Q}$ output thereof low. The inverter 340, resistor 341 and capacitor 342 coupled back through inverter 343 to the reset input of the flip-flop 336 causes that circuit to operate as a monostable multivibrator. Upon being clocked the $\overline{Q}$ output will switch low then return high after a predetermined period. Accordingly, the status read clock signal SRC at the output of inverter 340 will be a brief positive pulse, coupled to the clock inputs of the secondary status byte register 320. The inputs of that register are provided by the outputs of the primary register, such that generation of a status read clock causes the output of the secondary status byte register 320 to agree with the data stored in the primary register 292. That data is coupled to the inputs of selectors 318 for passage via the tri-state drivers to the receiving microprocessor as described above. In this way, the receiving microprocessor can test the secondary status byte register to determine if a message is waiting.

The receive side processor is also provided the ability to write the primary status byte register as a signal to the send side processor that the interprocessor buffer is available for receipt of task signals. When the primary status byte register 292 is to be reset, as in normal processing, the receive side microprocessor addresses the status byte register in the appropriate IPB, satisfying AND gate 339 which has its output coupled to the data input of a flip-flop 344. Accordingly, the flip-flop when clocked will drive its Q output high, partially satisfying a NAND gate 345, which generates a status reset signal SR. That signal is coupled to the preset input of each of the latches 291 within the primary status byte register. Alternatively, clocking a 0 into the latch 344 satisfies another NAND gate 346 which generates a status set signal SS, which is coupled to the clear input of each of the latches 291, setting the primary status register to the all 1 state. This function, however, is used only in the maintenance mode.

The clock signal for the flip-flop 344 is derived from an AND gate 348 which has a first input driven by NOR gate 349 which in turn receives the high output of AND gate 339 when the status byte is addressed by the receive side processor. The second input of AND gate 348 is the write signal WR* inverted in selector 300. Concurrence of the address and write signals clocks the flip-flop 344, as well as a second flip-flop 349. It is noted that it is also possible to clock those flip-flops by a high signal produced by AND gate 350 which is active in the maintenance mode.

As noted above clocking the flip-flop 344 with the D input high partly enables the NAND gate 345 for generating a status reset signal. Clocking the flip-flop 349, which has its data input tied to the positive voltage supply, drives the Q output thereof high. That high signal is coupled to an AND gate 351 which has its second input driven from the send enable signal. It is recalled that that signal is low only when the send side processor is addressing the status byte and is high for all other conditions. As a result, the AND gate 351 will pass a clock signal to the flip-flop 337. That flip-flop, having its data input tied to the positive voltage supply, will respond by driving the Q output thereof low. Associated with the flip-flop 337 are inverters 353, 356, resistor 354 and capacitor 355 causing that circuit to operate as a one shot multivibrator. Near the termination of the period of the multivibrator the output of inverter 357 will switch high, satisfying the NAND gate 345 to couple the status reset signal to the primary status byte register. Thereupon that register will be reset, providing an indication to the sending processor that the interprocessor buffer is available. It is noteworthy that the one shot multivibrator including flip-flop 337 cannot be clocked when the send side processor is addressing the primary status byte, so as to prevent false transient data being read by the send side microprocessor. It is also worthy of note that the secondary status byte register cannot be updated while the primary is being accessed, so as to prevent the receive side processor from receiving false transient data.

MAINTENANCE CIRCUITRY

The maintenance aspects of the interprocessor buffer circuitry will be noted only briefly since automatic fault isolation forms no important part of the present invention. Referring first to the receive side control, it is seen that the incoming address signals are applied to a parity checker 360, the output of which is coupled to a parity error latch 361 via gating circuitry 362. The latch will be clocked whenever a parity error is detected during a read or write cycle and when the receiving processor is accessing the IPB in either the call processing or maintenance modes. The output of AND gate 363, in addition to clocking the parity error flip-flop 361, is provided to a pair of NAND gates 364 which drive the all-seems-well lines of the respective copies.

For allowing the receiving processor to access the interprocessor buffer in the maintenance mode, a second comparator 312 is provided to detect the maintenance address. The maintenance address for interprocessor buffers is assigned as the interprocessor buffer displacement in the high order address bits, 0 in the address bits A5–A8 and the address of the interprocessor buffer in question in the address bits A1–A4. A four input AND gate 365 detects the all 0 condition of bits A5–A8 to enable the comparator 312. That comparator compares the strapped address signals ST5–ST8 against the address bits A1–A4 to produce an enabling signal, which is coupled to the gating circuitry 362 and also to the 2 of 4 decoder 307. When the comparator 312 is enabled, the 1Y2 or 2Y2 output of the decoder 307 is activated depending on which copy of the receiving microprocessor is active. Accordingly, maintenance read signals MNTRD for copy 0 or copy 1 will be generated by AND gates 366, 367 respectively. Those signals enable either the tri-state drivers 368 or 369 which read the output of the parity error flip-flop onto the D1 data line of the active microprocessor. The D1 signal is also returned via gating circuitry 369, 370 to reset the parity error latch 361 in the write mode.

Turning to the send side control, it is seen that a parity check on the incoming address lines is performed by parity checkers 372. The parity checker output, in a similar fashion to the receive side control, is fed to the clock input of an address parity error latch 373. An all-seems-well line is also provided, driven by a NOR gate 374 in the clock gating circuitry of the parity error latch 373. The data bits of the send side processor are also checked for parity in parity checker 376 whose output is coupled to a NOR gate 377, which clocks a data parity error flip-flop 378. The output of the gate 377 also drives the aforementioned all-seems-well line.

The sending processor also has a maintenance comparator 380 which responds to the same address as the maintenance comparator described in connection with receive circuitry. When it is satisfied, it produces a high output signal which, in combination with a send side receive pulse SRPL* satisfies an AND gate 381 which activates the group of tri-state drivers 382 for readout of data stored in the parity error latches 373, 378. Addressing the interprocessor buffer in the maintenance mode in combination with a send side write signal SMWR* partly enables a pair of NAND gates 383, 384 having the SD1 and SD2 send data bits coupled thereto for the purpose of clearing the parity error latches 373, 378.

PARTIAL DECODING OF RECEIVE SIDE ADDRESS

Turning briefly to FIG. 9g, there is shown a portion of a bus extender, for example bus extender 221 of FIG. 6, which accomplishes decoding of the high order address bits for the receive side processor. It should be noted that it is entirely possible to decode all 16 address bits at the receive side control of the IPB, just as is done for the send side. To that extent, the circuitry shown in FIG. 9e may be considered a portion of the interprocessor buffer.

The address decoding circuitry shown in FIG. 9a includes a pair of comparators 386, 387 for decoding the high order address bits from the receive side microprocessor A10–A16. It is recalled from the foregoing description that the displacement address assigned to interprocessor buffers is 1F. Accordingly, the four high order bits are decoded in the comparator 387 which produces a high output signal when the address bits A16–A13 are 0001, respectively. That output signal is coupled to the enabling input of the decoder 386 which compares the address bits A10–A12 to strapped address bits ST10–ST12. The strapping assigns an address to the bus extender in question. For the bus extender driving interprocessor buffers, that address will be 111. When that address appears on the lines A10–A12, the comparator 386 produces a high output which is coupled via inverter 388 to partially enable a pair of inverted logic NAND gates 389, 390. In this condition the gate 389 is enabled to pass the write signal SWR* when produced by the microprocessor, to partly enable a further pair of NAND gates 391, 392. In a similar fashion the gate 390 is enabled to pass the read signal SPL* when present to partly enable a further pair of NAND gates 393, 394.

Which of those gates will pass the signal is dependent upon the state of address bit A9 from the microprocessor. That address bit is passed through a pair of inverters 395, 396, such that when the address bit is in the 1 condition the NAND gates 392 or 394 will be enabled. Similarly, when the address bit is in the 0 condition the NAND gates 391 or 393 are enabled. Address bit 9 is used for further decoding typically to allow driving of separate A and B cables, for servicing two separate pieces of lower level equipment. When used with IPB's the A9 bit is always 1, to satisfy the displacement address 1F requirement for addressing IPB's.

It is seen that the gates 391, 392 produce the write signals WR*A and WR*B, the first of which is connected to the interprocessor buffer in the same copy and the second of which is connected to the interprocessor buffer in the duplicated copy. Similarly, the gates 393, 394 produce the read signals RPL*A and RPL*B which are similarly connected. The manner in which those signals control reading of the temporary storage in the interprocessor buffer and writing of the status latch has been described above.

MICROPROCESSOR—PROGRAM MEMORY RELATIONSHIP

Having considered in detail the structure which provides the dedicated communication paths between partner processors in the distributed arrangement, attention will now be directed to the circuitry within each processor, and specifically to the bus configuration which couples each copy of the microprocessor to the associated program memory copies. FIG. 10 shows a control bus multiplexer, such as multiplexer 220 or 220' described in connection with FIG. 6. The control bus multiplexer includes an address and control multiplexer 440, and a data multiplexer 450, both of which have connections to both copies of the associated microprocessor 200, 200', and further connections to only one of the program memories 201. The multiplexer, in effect, allows either of the connected microprocessors to use the associated program memory, such that an operable microprocessor-memory configuration can be achieved even in the presence of circuit failures. The signals passed between the control bus multiplexer and the respective copies of the microprocessor include 16 bits of address plus parity 401, 401', control 402, 402', bus configuration control 403, 403', copy 0/copy 1 active 404, 404' and 8 bits of data plus parity 405, 405'. Referring to FIG. 11a, it is seen that the 16 bits of address signal are coupled through a series of 2 to 1 multiplexers 444-447 whose outputs are coupled to a plurality of NOR gate drivers 444'-4447'. The outputs of the drivers produce address signals A1-A16 which are coupled to the program memory address bus. The address parity signal AP is selected in multiplexer 466. Which of the address signals are selected is dependent upon the state of the copy active lines 404, 404'. Those signals are passed through respective Exclusive OR gates 462, 461 to provide inputs to a further Exclusive OR gate 463. In addition, the Exclusive OR gate 462, driven by the copy 1 active signal drives the selector inputs of the 2 to 1 multiplexers 444-447 as well as multiplexers 466, 467.

In addition, the outputs of exclusive OR gates 461, 462 are provided as inputs to a pair of NAND gates 464, 465 to partly enable those gates. A second partial enabling signal is developed by exclusive OR gate 463, passed through NAND gate 463a and inverter 463b. The second input of NAND gate 463a is derived from the output of multiplexer 466, which is the selected one of the bus configuration control signals 403, 403', SR/C0 or SR/C1. The final input to NAND gates 464, 465 is the memory read signal MRD coupled from the active microprocessor through selector 467 and inverters 471, 471a. Thus, depending on which microprocessor copy is active, and in the presence of a memory read signal, one of the NAND gages 464, 465 will be satisfied to generate internal control signals for allowing access to the data bus.

The multiplexer 467 receives control signals 403, 403' from the respective copies, and specifically read signals SRD, write signals SWR and memory access signals SMAC. It selects the signal from the appropriate copy under the control of the copy 1 active signal, and couples those signals to respective drivers 471, 473, 475. The driver 475 produces a memory access signal used in the memory along with the address bits. The NAND gate 473 responds to the write signal from the selector 467 as well as from the output of inverter 464b (indicating that only one copy active signal is high) to produce a memory write signal MWR. The inverter 471 simply inverts the selected read signal SRD to produce a memory read signal MRD. In addition to the function of that signal in the memory, it is also inverted by inverter 471a to appear at the input of exclusive OR gate 478 to produce a signal identified as 479 which will be described in connection with the memory data circuitry of FIG. 11b. The inverted memory read signal also serves as a partial enabling signal for the three input NAND gates 464, 465 described above.

FIG. 11b shows the data multiplexer which handles bidirectional data flow between the associated program memory and the active microprocessor copy. Accordingly, the left-hand side of FIG. 11b shows memory data MD1-MD8, MDP, whereas the right-hand side shows D1-D8 and DP for both copy 0 and copy 1 microprocessors. The memory data signals are coupled to pairs of NOR gates 481, 485 for passing addressed data from the memory to the microprocessor. The gates 481 are enabled only when the direct control copy 0 signal DC/C0 produced by NAND gate 465 is active, whereas the gates 485 are enabled only when the direct control copy 1 signal DC/C1 produced by NAND gate 464 is active. The signals passed by the enabled array of gates are inverted at 483 or 487 to appear as data for the copy 0 or copy 1 microprocessor.

For data flow in the other direction, data coming from the microprocessor for passage to an addressed word in memory is coupled to the inputs of arrays of tri-state drivers 482, 484, 486, 488. It is seen that the copy 0 data is coupled to the inputs of the drivers 482, 486 whereas copy 1 data is coupled to the inputs of drivers 484, 488. The outputs of both drivers for any bit position are commoned, and are connected to the memory data bus for writing the data into memory. A first enabling signal for the array of tri-state drivers is provided by the output signal 479 from the exclusive OR gate 478 having an input driven by a status write output signal SW0 from the active microprocessor. The enabling signal is low only during a processor write cycle, so that the tri-state driver blocks 482, 484, 486, 488 are disabled at all other times. Second enabling signals for the tri-state drivers are provided by the copy active signals. When copy 1 is active, the line 491 is derived from copy 1 active disables the copy 0 drivers 484, 486, while the signal 493 derived from copy 0 active enables the copy 1 drivers 484, 488. Accordingly, the copy 1 microprocessor will be allowed to write the associated memory. In the opposite condition, the drivers 482, 486 will be enabled to allow the microprocessor of copy 0 to write the associated memory.

As a result of this circuit arrangement either microprocessor has complete and independent access to either memory copy such that a workable configuration can be achieved even in the presence of substantial circuit failures.

Having now described the manner in which each microprocessor communicates with its own dedicated program memory, and the structure by which partner processors intercommunicate, attention will now be directed to the interfacing circuitry by which a microprocessor has access to the portions of the switching system assigned to it for servicing. As described in general above, the switching system includes sense points which provide input stimuli to the control complex and control points by which the control complex may cause desired action in the switching system. As a generality it can be stated that a processor has access to its associated sense and control points (if such points are provided for a particular processor) by way of the dual level interface arrangement described in connection with FIG. 6. More specifically, the microprocessor via the appropriate bus extender can access one of a plurality of high level interface circuits 231 or 231' and through those circuits access one of a greater plurality of low level interface circuits 233-235. By way of this circuit arrangement the associated microprocessor may address groups of 8 sense or 8 control points for reading or writing as if they were words of memory.

Turning now to FIG. 12, there is shown a detailed block diagram for a high level interface circuit, which circuit partially decodes the address signals from the associated microprocessor to address one of a possible plurality of lower order circuits, and which passes data signals between the microprocessor and the lower order circuits. FIGS. 13a-13b show a more detailed logic diagram of the high level interface, with the circuit elements grouped and reference numerals keyed to those used in FIG. 12. Accordingly, the following description applies to both FIG. 12 which is useful in understanding the overall operation and to FIGS. 13a-b which is useful in studying the structure which accomplishes that operation.

Recalling from FIG. 6 that either copy of a high level interface circuit can receive inputs from either of the duplicated microprocessors, it will be seen in FIGS. 12, 13a and 13b that a plurality of 2 to 1 multiplexers are provided for selecting signals from or routing signals to the active copy of the microprocessor. A first 2 to 1 multiplexer 501 (FIGS. 12 and 13a) serves as an address selector, having as inputs address bits A1-A16 and parity AP from copy 0, as welll as the corresponding bits from copy 1. A data select multiplexer 503 controls the flow of data bits D1-D8 to the high level interface from the respective copies of the associated microprocessor and a data driver circuit 521 performs that function for data flow in the opposite direction. A further multiplexer comprising a control selector 505 has provided as input signals the write and read control signals from both copies 0 and 1 for selecting therebetween. A frame enable signal is also coupled to the control selector on line 506. As will be described below, the frame enable signal is generated within the high level interface when appropriate decoding circuitry therein detects its assigned address. As a result, the control signals will be allowed to pass the selector 505 only when the active microprocessor is in fact addressing the high level interface in question.

The copy 0 and copy 1 active signals are coupled to a copy select circuit 507, having an exclusive OR gate 507a (FIG. 13a) to assure that only one copy is active at any time, and for producing copy 0 and copy 1 active signals for controlling information flow. The copy 1 active signal is also used to drive the selector inputs of the multiplexers described thus far.

An address parity checker 513 and a data parity checker 515 are provided to examine each received word for the purpose of detecting parity errors. In the event a parity error is detected, an address parity error APE or data parity error DPE signal, as the case may be, is generated which sets an APE or DPE latch in the status word latch arrangement 530, and also causes the all seems well encoder 511 to produce a pulse on the all-seems-well ASW line for the active copy.

The address bits received from the active copy of the microprocessor are partly decoded in the high level interface and partly passed to lower order circuitry for decoding there. The high order bits A9-A16 are coupled to a high level interface address decoder 525 where they are decoded to produce a frame enable signal 506. The high order bits, that is address bits A13-A16 must assume a fixed pattern reserved for addressing high level interfaces, whereas the address bits A9-A12 must match back plane strapped bits for a particular high level interface board effected by means of strapping ST9-ST12. FIG. 13a shows that the mid order bits are compared to the strapped address in a comparator 525a, while the predetermined pattern in the high order bits is detected in gating circuitry 525b. When all conditions are satisfied the frame enable signal is generated on the line 506, and coupled back to the control selector 505 which then is allowed to pass control signals from the active CPU. The mid order address bits A6-A8 are coupled to a 1 of 8 low level interface enable decoder 527 which produces file enable signals FLE1-FLE8 which actuate respective blocks of low level equipment. A 1 to 8 error detector 529 is provided to assure that only one of the file enable signals is active at any given time. If more than one file enable signal is active, a 1 of 8 error signal is produced which is coupled back to a 1 of 8 error latch within the status word latch array 530. The low order bits A1-A5 are doubly inverted by inverters 526, 528 to appear as LA1-LA5 address signals to be decoded in the low order circuitry. In addition, a low level interface address parity generator 535 sends an appropriate parity bit with each low order address word. The address bits LA1-LA5, as inverted by inverter 526 are also coupled to a maintenance access decode circuit 531 where they are decoded to provide a maintenance access signal MAC, and also to a status word write circuit 532 which controls writing of the status word latches in the maintenance mode. In summary, it is seen that when an appropriate address appears at the high level interface circuit, it activates that circuit, it causes 1 of 8 file enable signals to be generated, and it passes 5 bits of address data as well as the file enable signals to the lower order circuitry for addressing particular circuits therein.

Having considered addressing in the high level interface, attention will now be directed to the circuitry associated with data words. Data bits D1-D8 from the active copy, as passed through the data select multiplexer 503 are coupled to a read/write low level interface data gate 518. The control signals for that gate allow the data bits to be passed when maintenance is not accessing the high level interface $\overline{MAC}$, when the trouble latch is not set $\overline{TRBL}$, and when the read pulse is active. At that time, the data bits D1-D8 and DP are passed through the gate 518 where they appear as low level data LD1-LD8 and LDP to the low level interface. A low level interface control gate 519 is also provided to pass read R, write WR and high level active HLA signals from the high level interface to the low order circuits. As will be described in greater detail below, the data is accepted and handled in accordance with the file enable, low order address and control bits passed thereto.

A further path for data flow is from an addressed low level interface to the CPU by way of the high level interface. To that end, data bits LD1-LD8 received from the low order circuitry are coupled to a tri-state data bus 540 for passage back to the active copy of the microprocessor. The tri-state data bus 540 is enabled by a data/status word select circuit 543, which enables the tri-state data bus when the system is not in the maintenance mode $\overline{MAC}$ and when a read pulse RPL is present. At that time, the data bits pass through the tri-state bus to form input data DIN1-DIN8 which is coupled to a data driver 521. The data driver 521 also has coupled thereto an input signal from a data driver control circuit 517, which in turn receives the copy 0 and copy 1 active signals. Accordingly, appropriate gates in the data driver circuit 521 are enabled to allow the data bits to pass to the D1-D8 lines of the active copy of the microprocessor. In this way, the low order circuits can communicate back to the microprocessor.

Further paths for data flow exist from the high level interface itself back to the microprocessor. In this case, data within the status word latches 530 is read to the microprocessor. To accomplish that, the data/status word select circuit 543 switches its output lead in response to the maintenance access signal MAC going active. The tri-state data bus 540 is disabled, and the status word select circuit 522 is enabled. The status word select circuit selects one of two words for transmission back to the CPU, in dependence on the state of address bit A3. When the write pulse from the active copy is present, the word selected by the bit A3 is read from the status word latches 530 and coupled via the status word select circuit 522 to the data drivers 521 for transmission to the active copy as described above.

Finally, it is possible for the CPU to write data into the high level interface, this being accomplished by the data bits D1-D8 being coupled directly to the status word data latches 530, in combination with a write pulse coupled through the control select circuit 505.

In summary, the active microprocessor has full read/write control not only over the high level interface but also over the low level circuits connected to that interface. Thus, the microprocessor can address through the high level and low level interface circuits selected groups of sense and control points disposed in the switching system. Coupling of data onto its data bus along with a write signal will allow an addressed group of control points to be written. Similarly, production of a read signal will cause the data from an addressed group of sense points to appear on the data bus via the interface circuits. In addition, in the maintenance mode the processor has the ability to read and write the status word latches 530 in the high level interface. As will now be apparent the latches are used to store information concerning the operation of the associated circuitry. Among the latches are a data parity error latch DPE, address parity error latch APE, high level active latch HLA, high level trouble latch TRBL, one of 8 error latch 1/8E, address parity invert latch API, low level interface data parity error latch LDPE, and low level interface all-seems-well latch LASW. In addition a signal copy identification bit S/C0 and S/C1 serves as an input to the status byte latch circuit 530. The output states of these latch circuits are grouped to comprise two status words which are routed to the status word select circuit 522 for readout under the control of address bit A3 as noted above. Table 1 below shows the format of the two words, word 0 and word 1, which may be read from or written to the status word latch circuitry 230. There is shown the read format for word 0, followed by the write format therefor, then the read and write format for word 1.

TABLE 1

| | | | | Word 0 | | | | |
|---|---|---|---|---|---|---|---|---|
| D8 | D7 | D6 | D5 | D4 | D3 | D2 | D1 | |
| Co-py ID | API | LDPE | HLA | ASW | ⅛E | DPE | APE | Read |
| API Reset | API Set | HLA Reset | HLA Set | — | — | Reset all Error FF's | | Write |
| | | | | Word 1 | | | | |
| NOT USED | | | | | | — | TRBL | Read |
| NOT USED | | | | | | TRBL Reset | TRBL Set | Write |

The largest part of the communication between the high level interface circuit and the switching system is accomplished via low level interface circuits to be described below. As will become more apparent the low level interface circuit is arranged to allow the processor to address groups of 8 sense or control points for reading the sense points or writing the control points. In some cases, however, it is desirable to provide modified low order circuitry for communication between the high level interface and the switching system. One example is the communication path by which the state microprocessor writes connections into the switching network. In that case the low order circuitry is configured as a pair of CPU interface cards described in Pepping et al. U.S. application Ser. No. 833,954, filed Sept. 16, 1977 and entitled Telecommunications Network Having Multi-Function Spare Network Block. The low order circuitry in that case accepts words of data written thereto via the high level interface circuit and holds those words until the appropriate point in the cycle of the network whereupon it writes connections represented by the stored words into the connection memories. Other forms of low level circuitry for communication between the high level interface and the switching system can also be used. As further examples, the low level circuitry interposed between the high level interface of the console microprocessor and the consoles themselves can be specially adapted to the communication needs of that sub-system. Similarly, when the system is provided with a magnetic tape unit, a special low order circuit can be utilized to format and transfer data between the tape unit and the high level interface serving the data base microprocessor.

LOW LEVEL INTERFACE

While numerous low order circuits can be configured to meet various requirements, the basic unit which finds widespread application is the low level interface circuit, the block diagram of which is shown in FIG. 14. More specifically, the low level interface circuit is used for communication with low level multiplex and clock circuits, the master clock circuits, the high level clock circuits, the loop start/ground start trunk circuits, the two wire and four wire trunk circuits, the line circuits, the A/D and D/A code converters, the tone generator control circuits, the dual tone multi-frequency receivers, and the dial pulse receiver/sender circuits.

It will be recalled from FIG. 6 that the low level interface circuits are dispersed in the respective files of the switching system, and each low level interface may be accessed by the active one of the redundant pair of associated high level interfaces. As a result, a plurality of 2 to 1 multiplexers 561 are needed to select address, data and control signals from the active one of the associated high level interfaces. FIG. 14 shows the address signals from each copy include a particular one of the file enable signals FLE1-5 as well as the low order address signals LA1-LA5 and parity LAP. Eight data bits plus parity are provided from each high level interface, LD1-LD8 and LDP. Also coupled from the high level interface to the selector 561 are low level read and low level write control signals LR, LWR and the high level active signals HLA for the respective copies which are used to control the state of the selector 561.

The selected address signals passed through selector 561 are checked for parity in address monitor 563 and are decoded in a file maintenance decode circuit 565 and in a file address and card enable circuit 569. The maintenance decode circuit 565 responds to a maintenance address to place an active signal on line 566 which causes the associated microprocessor to access the status latches 567. The file address and card enable circuit 569 serves to decode the incoming file address signals FA1-FA5 to produce the card enable signals CE1-CE32. Those signals are used to selectively address one of a possible 32 groups of sense or control points, each group providing up to an 8 bit word for reading or writing by the associated microprocessor. In cases where the low level interface does not have a large number of sense or control points to service, the file address signals may be used directly, without decoding, to select one of five groups of such points. To that end, the file address signals FA1-FA5 are also output from the file address and card enable circuit 569.

Control signals selected through the multiplexer 561 are also provided to the file address and card enable circuit 569, such that output signals file read and file write FR and FW are coupled to the network circuitry, and specifically to the sense and control points in question.

Data flow from the high level interface to the switching system is routed from the active high level interface through the selector 561 to the file data byte 573 for writing the control points with data on file data lines FD1-FD8. Data flow in the other direction is through the file data byte 573 to the low level data byte 575 which uses a control signal from the selector 561 to place the data on either bus 572 or 574 depending on which copy of the associated high level interface is active. The data within the status latches 567 may also be read back through the high level interface, a bus 570 coupling the status latches to the low level data byte for reading that data onto the bus 572 or 574. The status latches 567 may also be written with data on the bus 564.

FIGS. 15a-15b show the circuitry of a particular embodiment of the block diagram of FIG. 14. The copy select circuitry 561 includes address selectors 581, 583 which select the low order address bits LA1-LA5 from the active high level interface. A control selector also within block 583 selects the active file enable FLE, low level read LR and low level write LWR. Also included is an address and parity selector 593 which selects LAP and LDP. The high level active signals from the respective copies are coupled through an array of Exclusive OR gates, the output of copy 1 Exclusive OR gat controlling the selector inputs of the selectors 561, and the output of the final stage Exclusive OR gate producing a HLA signal when one but not both of the high level interface signals is active. A data copy selector 595, 597 selects 8 bits of data from the active high level interface.

Concentrating first on the address signals, it is seen that the low level addresses LA1-LA5 passed through the selectors 581, 583 appear as file address signals FA1-FA5. Those signals are decoded in maintenance decoder 565 along with the FLE' signal derived from the particular file enable signal FLE which is connected to the card in question. When the maintenance decode circuit is satisfied, the output AND gate 582 produces a high file maintenance output signal F/M which is coupled to an AND gate 584 (FIG. 15b) where it is combined with the low level write signal LWR to produce a low level maintenance write signal LWR*. When that signal is active, the CPU may put data on the data lines to write the latches in the status word latch circuit 567.

For use in call processing, the file address signals FA1-FA5 on bus 562 are coupled as inputs to a pair of decoders 585, 587 which form part of the file address and card enable circuit 569 of FIG. 14. The five address bits are there decoded to provide a 1 of 32 output signal which is coupled to the low order switching system circuit cards for addressing particular groups of sense and control points thereon. An example of a control point is found in the line circuit arrangement where each circuit card services 8 telephone lines. A latch is provided for each telephone line, has a common ring generator connected thereto, and controls the application of ringing to the associated telephone line. When the line microprocessor desires to initiate or terminate ringing of a particular line, it couples the appropriate address signal on its address but which filters through the bus extender, the high level interface and the low level interface to activate one of the card enable signals CE1-CE32. In addition to the address put out by the processor, it places data on its data bus for controlling the state of the 8 control points which it is addressing. Activation of the particular card enable signal gates the data lines through to the control points which are configured as simple latches, with the data lines having set and reset capability thereover. Accordingly, the CPU places appropriate 1 or 0 bits in the data word such that the appropriate latches are set or reset to initiate or terminate ringing in selected lines.

Sense points are addressed in the same way, although typically the sense points are constantly scanned by the processor as it looks for new assignments. The sense points, for example on the line circuit card may comprise the outputs of respective loop current detectors, or alternatively, latches set or reset by the outputs of the loop current detectors. Accordingly, by continually scanning the sense points the processor can detect significant state changes for interpretation as requests for service.

Returning to FIG. 15a, it is recalled that in some cases the file address signals FA1-FA5 may be used directly to select one of five groups of sense or control points. Accordingly, the file address and card enable circuitry 569 shown in the upper right-hand corner of FIG. 15a has outputs FA1-FA5 in addition to the card enable outputs. For determining whether the sense points are to be read or the control points to be written, the control signals LR and LWR passed through the selector 561, are coupled to a pair of NOR gates 589. Those gates are enabled by a NAND gate 586 which is satisfied by FLE' in response to detection of the appropriate file enable signal and by $\overline{TRBL}$ indicating the circuit is functioning properly. In that condition the read signal LR or the write signal LWR are passed to the low order circuits for gating the data lines through to the sense and control points.

Turning now to the data lines, it is seen that the incoming data lines from the high level interface are coupled through copy selectors 595, 597 to appear as file data signals FDA1-FDA8. For use in maintenance, those signals are passed to the inputs of NAND gates driving the status latches 567, such NAND gates being enabled by the LWR' signal described above. For purposes of call processing, those signals are coupled as inputs to an array of tri-state drivers 573 (FIG. 15b) which are enabled by a tri-state bus enable signal TBE derived at the output of an AND gate 598. As shown in FIG. 15a, that gate is satisfied when the trouble flip-flop is in the normal condition $\overline{TRBL}$, when FLE' is high indicating receipt of the associated address, and when LR" is high which is the normal condition except for a 100 nanosecond period following the leading edge of a read pulse. This latter feature serves to disable the tri-state drivers 573 during a read operation so that the data lines FD1-FD8 are available to carry data from the sense points to the high level interface. When the tri-state drivers 573 are enabled, they pass data from the CPU routed through the high level interface to the data lines FD1-FD8 coupled to the low order circuit in the switching system for writing a particular group of sense points addressed by the card enable signals CE1-CE32.

Data flow in the opposite direction from the switching system circuitry to the processor occurs in the presence of a read pulse RPL. The processor places outputs the appropriate address to access the particular group of sense points in question. In addition, it outputs a read pulse which appears at the low level interface as low level read LR. That signal is coupled through the selector 583 via a pair of inverters 610, 611 to the input of a delay line 599. In addition, the LR signal is applied directly to the input of an AND gate 612.

The delay line 599 is used to allow the data to stabilize before latching it for return to the processor. The read signal LR which generates the file read FR is also applied to the delay line 599 where there is provided an 80 nanosecond and a 100 nanosecond delay. The 80 nanosecond delayed output read signal comprises a data latch signal D/L which is applied to the enable inputs of the data latches 575. Accordingly, the outputs of the data latches 575 follow the signals on the input lines FD1-FD8 for the first 80 nanoseconds following the leading edge of a read pulse. At the termination of 80 nanoseconds the enable signal falls, latching the data in the latches 575 for passage through the high level interface to the microprocessor. The 100 nanosecond output from the delay line 599 is coupled to the AND gate 612 along with the LR signal to produce the LR" signal. That signal will be low from the leading edge of a read pulse until the expiration of 100 nanoseconds. The LR" signal is applied to the input of AND gate 598 as described previously in order to disable the tri-state drivers 573 for a 100 nanosecond period following the leading edge of a read pulse. Accordingly, data may flow from the switching system circuitry into the data latches without interference from data on the lines coupled to the circuit by the high level interface.

Data clocked into the latches 575 appears at the outputs as file data FD1'-FD8', where it is coupled to two groups of NAND gates in the low level data byte circuit 575. The leftmost group of gates is enabled by the FLE'/C1 signal to pass FD1'-FD8' to the copy 1 high level interface, whereas the rightmost group of NAND gates are enabled by FLE"/C0 to pass FD1'-FD8' to the copy 0 high level interface. The FLE" signals are produced in gating circuitry indicated generally at 615 which decodes the write signal LR in combination with the file enable signal FLE' and either the copy 0 or copy 1 high level active signal to produce the appropriate output.

For the sake of completeness, it will be noted that the outputs of the status latch circuit 567 are coupled as inputs to a further tri-state data bus 616 which is enabled by an LR' signal produced by a NOR gate 617 (FIG. 15a) in the presence of an active file maintenance F/M signal. It is also seen that the LR" signal produced by AND gate 612 is coupled as an input to NOR gate 617 to disable the tri-state drivers 616 for a 100 nanosecond period following each read pulse.

DISTRIBUTED PROCESSORS

As noted as the outset, the various functions of the switching exchange are segmented along call processing lines, and the respective segments are assigned to dedicated microprocessors in the distributed arrangement. Attention will now be directed to each microprocessor in turn and the memory which constitute that microprocessor as means for performing the functions assigned to it. Before examining the details of each microprocessor control unit, its relationship to the switching system and also its relationship to the other microprocessor, attention will first be directed to the program hierarchy which is applicable to all of the control units. Such program hierarchy will be described specifically in connection with the data base microprocessor, with the understanding that the description generally applies to each of the microprocessors.

In the following description, reference will be made to command messages, reference codes, arguments and the like. Tables 2 and 3, appended to the end of this specification for convenience, provide reference information useful in understanding the operation of the respective microprocessors. Table 2 lists the common abbreviations used in interprocessor buffer commands. Table 3 is a convenient grouping, broken down by microprocessor, of commands sent and commands received by each microprocessor. The reference code in that table is the information byte which identifies the operation to be performed by the receiving processor. Recalling the description of the interprocessor buffer, the reference code is the last command loaded into the status byte which transfer control of the buffer to the receiving processor, and specifies the sub-program to be invoked.

PROGRAM HIERARCHY

FIG. 16 graphically illustrates for the data base microprocessor 170, the multiple level hierarchial organization typical of all microprocessors in the control complex 55. The levels are main program, programs, and sub-programs.

Main Program Level Routines—All Microprocessors

All microprocessors use these main programs:

1. Master Sequencer: This routine determines the sequence of services to be performed by invoking routines of the program level in a predetermined and established sequence. The Master Sequencer loops through the established sequence infinitely.

2. Time Interrupt Handler: A ten-millisecond interrupt is provided as the only call processing required interrupt in the switching system. The Time Interrupt Handler maintains a clock in memory that may be referenced by other routines for testing time dependent conditions.

Program Level Routines—All Microprocessors

1. IPB Loader

The programs concerned with loading a selected IPB and unloading data therefrom are uniform in all microprocessors. In the sending microprocessor, loading is done by a program after an IPB queue has been loaded by other sub-programs. In the sending processor this loading is done by a program that moves data from a portion of a 64 byte queue area within the processor memory to the 16 byte IPB. The 64 byte internal queue is a communications buffer between the call processing logic sub-programs and the IPB. The queue is desirable to:

1. Provide a holding area for outgoing commands during periods when the IPB is being unloaded (from the last IPB transmission) by the receiving processor.
2. Consolidate a number of commands, each considerably less than 16 bytes, into a single IPB transmission, thus making more efficient use of the IPB.
3. Accommodate activity surges that could momentarily overload the 16 byte IPB.

As selected sub-programs in a microprocessor create command messages, the same are loaded into the appropriate IPB queues. The buffer loader program is brought into action periodically by the processor main program. The buffer driver will test the queue for messages waiting to be sent, and if there are any, it will test byte #1 of the IPB for all zero (buffer available condition). If the buffer is available, the driver will load as many messages as possible into it; follow them with a null in the next consecutive memory location (unless all sixteen bytes of the buffer are used); and load byte #1 last to show the ready condition.

2. IPB Command Analyzer

In the receiving microprocessor, a command analyzer program looks at the IPB to determine if the IPB is loaded, and if so, analyses the 1st command (in Byte #1 of the IPB) and jumps to the sub-program, i.e., function module, handling that specific command. This is depicted in FIG. 16 for the Data Base Microprocessor program organization, the chart showing that in executing the "command analyzer" program the "normal dialed number" command, reference code 74 in the Byte #1 of the IPB, has been read and the "normal dialed #" command handler sub-program has been invoked. After the command has been serviced, control is returned to the command analyzer program for analysis of the next command in the IPB. All remaining commands required to be serviced are serviced in this manner.

The main program in the receiving processor will periodically call the command analyzer program which will test each incoming IPB for non-zero (ready condition). When a ready buffer is detected, the analyzer re-reads the command byte to assure its integrity. The byte is tested for all-zero (stop/no command) and if tested to show all-zero, the analyzer returns to main program. Valid command bytes are used to call the appropriate command handler sub-program. The sub-program reads the data (if any) following the command byte and performs the required function and then returns to the analyzer with a memory pointer to the next command, if any. The analyzer checks that the next command byte location is still within the IPB, and if it is reads the command. The processing continues until command messages in the IPB are exhausted, then returns to the main program.

OTHER PROGRAM LEVEL AND SUB-PROGRAM LEVEL ROUTINES—INDIVIDUAL MICROPROCESSORS

Line Microprocessor

Operations:

The line microprocessor 140 serves as the introductory service port through which all control signals pass to and from line circuits. For each line in the switching system, a single bit sense point and single bit control point are available to the line processor 140, from which the LMP 140 determines the on-hook/ off-hook condition of the particular line circuit, detects significant on-hook/off-hook transitions and reports the same to the state processor 130 through the associated sender interprocessor buffer 141a and receive IPB buffer 141b. Significant line transitions that are detectible are new off-hooks, disconnects (sustained on-hook) and flashes. Controls which are exercised are ringing and halt ringing on each line circuit. The analysis of dial pulses is specifically not a task of the line processor 140.

The line processor 140 reports line activities only to the state processor 130 and receives control information only from the state processor 130. For all information being sent out, the line processor 140 converts the pertinent line equipment address (hardware location) to its network slot number. Likewise, for all information received from the state processor 130, the line processor 140 converts the network slot number to an equipment address.

Line Sense and Control Points:

There is one sense and one control point for every line circuit in the switching system. The sense and control points are read and written eight-at-a-time in eight bit bytes. A block of memory addresses is reserved for this purpose, such memory block is accessed using the equipment address of the desired block of eight lines added to a displacement address as shown in FIG. 32a.

Addressing within the block of eight lines is done by manipulation of the byte as read from the calculated address.

The state of the sense bit corresponding to a particular line circuit reflects the D.C. state of that loop and will be "one" when that line is off hook. A "double look" is performed upon sense points to filter out line noise and contact bounce.

The state of the control bit determines the ring state of the line circuit. A mementary "1" written to the control point causes ringing of the line; a "0" causes ring to stop. The sense and control bits of each line are located at an identical address and are differentiated only by the read (for sense) and write (for control) instruction that is used to access them. The format of sense and control data bits within the byte is shown in FIG. 32b.

Attenuator Control Points:

Each line circuit has an associated variable attenuator in the voice path going from line to network. This attenuator must be set to one of eight levels during the initial phase of each call. The level is determined by the state processor 30 and is transmitted to the line processor 40. The line processor 40 in turn controls the variable attenuator by writing two control bytes to addresses of non-existing line cards (example: card 15) in the line file being of interest.

Buffer Communications:

The line processor 140 communicates only with the state processor 130 and this is done through the interprocessor buffers, using the commands and formats outlined in Table 3.

OTHER PROGRAM LEVEL ROUTINES:

1. Scan Program: The scan program monitors the on-hook and off-hook status of each line circuit and modifys that state of the line and prepares relevant outgoing IPB commands.

SUB-PROGRAM LEVEL ROUTINES:

1. Ring Control: Causes ringing current to be applied or removed from a specified line (but does not provide 2-seconds-on, 4-seconds-off interruption of ringing).

2. Command Handlers: Each IPB Command received by the LMP 140 causes a command handler sub-program to be executed, thus setting the conditions dictated by the command.

3. NSN to EA Translator: Converts Network Slot Numbers to Equipment Addresses.

4. EA to NSN Translator: Converts Equipment Addresses to Network Slot Numbers.

5. Attenuator Control: Drives sense points with specified attenuation selection data.

Register Microprocessor

Operations:

The register microprocessor RMP 150 receives and sends all dialed numbers for the switching system. The dialed numbers may be presented as pulse streams direct from DC signalling or as 4-bit parallel binary numbers provided by a DTMF receiver. Regardless of input format, the register processor 150 outputs the dialed number as a series of digits stored in four bit codes to the appropriate microprocessor.

The register processor 150 receives two fundamental types of call processing commands from the state processor 130, namely, receive digits and send digits, and one fundamental command type from the data base processor 170, namely, receive n digits. The register processor 150 receives sense information with DC signalling and/or DTMF digits from dial receiver/sender units of the registers and sends control information with pulse signalling or DTMF digits to the dial receiver/sender units. Up to 64 dial rexceiver/sender units may be equipped, each supporting dialing on one circuit to which it is connected by the network 52.

Upon completion off a dialed number, the register processor 150 sends a completion command with the dialed number usually to the data base processor 170, but in some instances to the state processor 130. The register processor 150 also sends control bits to the receivers to select certain tones that are returned to the attached originating party, to set-reset the 9th Bit as sent to a terminating party, and to reset certain sense points from the receiver.

Register Sense and Control Points:

There are 8 sense and 8 control points for each receiver/sender. The sense points are read and the control points are written in a single byte-perreceiver/sender format. For each register the sense and control bytes are located at an identical address and are differentiated only by the read (for sense) and write (for control) instruction that is used to access them. There are 64 memory addresses reserved for register sense/control points and each is accessed using its equipment address as shown in FIG. 33. Format of the data in the sense points and control is shown in FIG. 34.

The left-most (Ready) bit of the sense byte is set to "1" when valid data is present on the four rightmost (DTMF Digit) bits. This bit can be reset only by writing a "1" in the same position back to the receiver as a control bit. This control allows the immediate resetting of ready so that data is not mistakenly re-read and a second time. The four right-most sense bits contain (in binary form) the digit being received by the DTMF portion of the receiver.

The second-from-left sense bit represents the DC state of the line or trunk to which the receiver is listening via the network. This bit will be set to "1" when the device goes to the on-hook state and will remain "1" until reset by a "1" in the same position written to the receiver as a control bit; thus becoming a simple dial pulse counter.

The third-from-left sense bit represents the instantaneous DC state of the line or trunk to which the receiver is listening. This bit follows the on-hook to off-hook condition of the line or trunk with "1" representing the off-hook condition, and is used to detect end-of-digit periods, in-register flashes, and disconnects.

The control byte allows the register processor 50 to perform DC signalling and application of tones. The third-from-left bit controls DC signalling through the network 21. Writing a "1" to this point causes an off-hook indication to be initiated toward the network 52 by the particular receiver/sender. The off-hook indication is maintained until a "0" is written to the same bit, and vice-versa.

The right-most three bits select a progress tone to be sent toward the network from the receiver/sender. When sent, the bits are latched, and the tone will be sent until another tone or quiet is selected.

Buffer Communications:

The register processor communicates with the state processor 180 and the data base processor 170 through the IPB's, using the commands outlined in Table 3.

OTHER PROGRAM LEVEL ROUTINES

1. Scan Program: The scan program monitors the sense byte of each register and passes control to an appropriate state logic program as determined by the condition of the sense byte and the correct state of the register.

2. Outpulse Drivers: Three routines are invoked at selected, staggered 10-millisecond interrupts to provide the register outpulsing function. These routines are:
   Prepare outpulsing
   set outpulses
   reset outpulses

SUB-PROGRAM LEVEL ROUTINES

1. Sense Point State Logic: A number of sub-programs provide appropriate actions for the individual state and sense point conditions encountered. Each sets a new state and/or prepares relevant outgoing IPB commands.

2. Elapsed Time State Logic: A number of sub-programs provide appropriate actions for certain elapsed time periods of certain states. Each sub-program sets new states and/or issues IPB commands as may be relevant.

3. Command Handlers: Each IPB Command received by the RMP 150 causes a command handler sub-program to be executed, thus setting the conditions dictated by the command.

TRUNK MICROPROCESSOR

Operations:

The trunk microprocessor 160 serves the switching system as an introductory service port through which all trunk sense and control signals pass from and to the trunk circuits. The TMP 160 detects and assimilates any significant state changes in trunks and, regardless of the trunk type, reports changes in a uniform format to the state processor 130. Analysis of incoming dial pulses and the sending of outgoing dial pulses is specifically not a task of the trunk processor 160.

The trunk processor 160 receives four sense points and delivers four control points to each trunk. The significance of sense and control points varies from trunk-type to trunk-type and thus the procedures for utilizing the points will vary. In order to correctly process each trunk, the trunk processor 160 maintains an abbreviated class-of-service table with enough information to correctly identify each trunk's type. This class-of-service table is derived from the general class of service information kept by the data base processor 170.

Conditions to be recognized and interpreted by the TMP 160 are incoming trunk seizure, trunk disconnect, stop/allow dial, distant party answer, and trunk flash. Controls to be exercised are outgoing seizure, disconnect, answer supervision, allow out-dialing, set attenuation, recognize/disregard flash, and permit outward flash. Control information from the remainder of the system is received from the state processor 130. In these commands, trunks are identified by a network slot number that must be translated into a trunk equipment number (hardward location). Likewise, the trunk processor 160 must take the reverse translation when preparing a command message for the state processor 130.

Figure 35A:
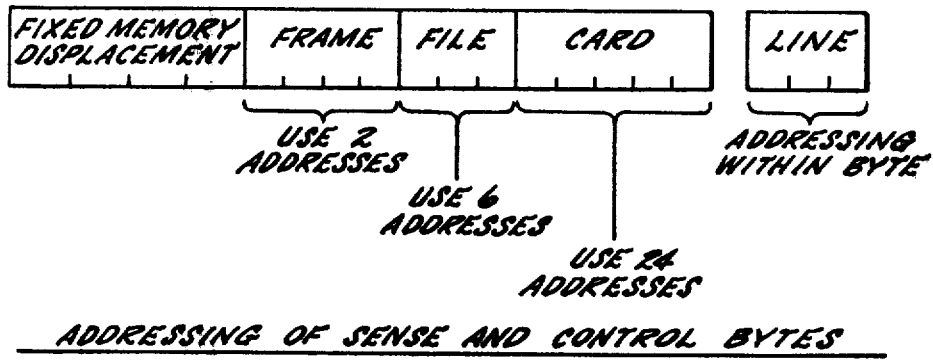

Trunk Sense and Control Points:

There are 4 sense and 4 control points for every trunk in the system. These are read and written 2-trunks at a time in eight bit bytes. Memory addresses are reserved for this purpose and are accessed using the equipment address of the individual trunk, as shown in FIG. 35*a*.

A "double-look" or equivalent technique must be used when reading sense points in order to filter out noise from contact bounce.

Figure 35B:
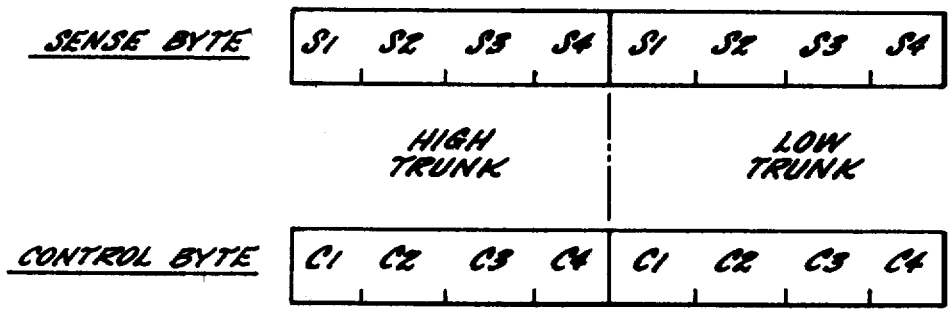

The four sense and four control points of an individual trunk are located at the same address and are differentiated only by the read (for sense) or write (for control) instructions that is used to access them. The format of sense and control data bits within the byte is shown in FIG. 35*b*.

The significance of sense and control points varies from trunk type to trunk type. The trunk processor 60 makes use of its knowledge of the trunk type connected at each equipment address and thereby interprets sense points and signals control points appropriately.

Attenuator Control Points:

Each trunk has an associated variable attenuator in the voice path going from trunk to network. This attenuator must be set to one of eight levels during the initial periods of each call. The level is determined by the state processor 130 and is transmitted to the trunk processor 160. The trunk processor 160 in turn controls the variable attenuator by writing two control bytes to the attenuator control.

Buffer Communications:

The trunk processor 160 communicates only with the state processor 130 and this is done through the interprocessor buffer IPB using the commands and formats oulined in Table 3 hereof.

OTHER PROGRAM LEVEL ROUTINES

1. Scan Program: The scan program monitors the sense points of each trunk for significant changes and invokes the appropriate trunk logic sub-program when changes are detected.

SUB-PROGRAM LEVEL ROUTINES

1. Trunk Logic Sub-Programs: There is one trunk logic sub-program for each trunk type that the trunk processor 60 must handle. Each sub-program modifys the trunk's state appropriately and prepares relevant outgoing IPB commands.

2. Command Handlers: Each IPB command received by the TMP 160 causes a command handler sub-program to be executed, thus setting the conditions dictated by the command.

3. Delay Queue Handler: The delay queue handler is a convenience routine designed to uniformly handle the large number of times events that occur during various protocols for trunk seizure and release.

4. Attenuator Control: Drives sense points with specified attenuation selection data.

5. NSN to EA Translator: Converts network slot numbers to equipment addresses.

6. EA to NSN Translator: Converts equipment addresses to network slot numbers.

STATE MICROPROCESSOR

Operations:

The state microprocessor SMP 130 coordinates the bulk of call processing activity in the switching system. The SMP 130 makes all decisions concerning call states, party states, next allowable states, and register assignments. Through an interface with the switching network, the SMP 130 controls all connections among lines, trunks, registers, attendants, and tone sources.

The state processor 130 maintains two-way communication with all other processors in the system through the inter processor buffers (IPBs) which send and receive a large variety of command messages.

The state processor 130 is driven solely by the commands it receives; there are no sense point inputs. Most commands are related to a particular call in progress and to the state and class assignments of the parties involved. Processing results in the issue of one or more commands to the other microprocessors and/or connection commands to the network 52.

State Sense and Control Points:

The state processor 130 has no call processing sense points. All its stimulus for action is received through the interprocessor buffers.

The state processor 30 controls the network 52 through sixteen bytes addressed as memory locations of the state processor 130. Two twelve bit network slot numbers (NSN's), that of the listening party and that of the talking party, must be conveyed to one of four 4 byte buffers which corresponds to the one of four network blocks in which the connection is to be made.

Each network block will read its four bytes every 125 microseconds. There is no "network done" flag associated with the bytes, hence the state processor 130 does not write more frequently than every 125 microseconds. The state processor 130 always writes the high order byte last, and this sets a "data ready" for the network block.

Buffer Communications:

The state processor communicates with all other processors in the system via standard interprocessor buffers using the commands outlined in Table 3.

OTHER PROGRAM LEVEL ROUTINES

1. Busy/Idle Update: The busy/idle update program periodically transmits updating data to the data base processor 170 so that it may maintain a current map of busy and idle conditions of lines and trunks, and (if implemented) the BMP microprocessor 190.

2. Short Action Queue Servicing: The short action queue servicing program scans entries of time conditional events that have been placed in a queue by other programs and sub-programs. If the conditional time of any event has expired the short action queue servicing routine causes the event to occur.

3. Camp-On-Queue Servicing: The camp on queue servicing program searches a list of calls waiting to be made when both parties become idle.

4. Register Allocation: This is a group of routines designed to allocate available registers and to service a queue of parties wanting registers when none are available.

5. Time Audit: The time audit program periodically checks the time that each line, trunk, and register has been in its current state and invokes appropriate action if that time has exceeded a predetermined limit.

6. State Audit: The state audit program performs a periodic consistency check of the state and reference memory of each station, trunk, and register in the system and between parties talking to each other.

SUB-PROGRAM LEVEL ROUTINES

1. Command Logic: Each IPB command received by the SMP 130 causes a particular command handler sub-program to be invoked. Each command handler contains the logic for permitting or denying, based on states of the parties involved, the action requested by the incoming command.

2. State Driver: The state driver sub-program performs all the actions necessary to change a party from one state to another. Included are the modification of the state, modification of the reference memory indicating to whom the party is talking, modification of the network control memory (connection), and issue of appropriate IPB commands.

3. Device Usage Monitor: Gathers counts of usage data (number of times used) from lines, trunks, registers, consoles and so forth for the system.

4. Traffic Recording: Provides as output data all significant events required to reconstruct complete calling information (monitor particular numbers dialed for checking and charge-back functions).

CONSOLE MICROPROCESSOR

Operations:

The Console Microprocessor CMP 180 performs all call processing functions associated with attendant console activity. This includes assuming a level of control normally exercised by the state processor SMP 130 in such activities as specifying whether conditions are correct to allow connections, specification of the connections, maintenance of console call states, call camp-on feature implementations, call holding feature implementation and time audits.

The console processor 180 maintains two-way communication via IPB(s) with the SMP 130, DMP 170 and, in a minor role the Busy Lamp Field Processor BMP 190. The primary interchange of information is connection commands to the SMP 130 and affirm/disaffirm commands in response from the SMP 130.

The console processor 180 is driven by a combination of the IPB commands received (representing new calls and connections) and the selection button activity on the attendant consoles (representing human direction as to how the calls are to be handled). Attendant consoles are scanned by the CMP 180 for selection button activity by looking at a single input port per console. Button selections are expressed at this port by eight bit codes, a unique code being used to represent each push button on the attendant console. Likewise, lamps on each attendant console are controlled by a single output port per attendant console. The large number of lamps on the attendant console combined with the requirement for steady or flashing display of each lamp requires that two bytes be transmitted to properly illuminate any particular lamp.

The CMP 180 handles calls for several customer groups. All tasks performed by the CMP 180 must provide for assigning and manipulating calls within the correct customer group.

Console Sense and Control Points:

The individual attendant console input and output ports serve as the sense and control points, respectively. Each attendant console's input/output port is accessed by a specific pair of adjacent memory addresses. The first of the memory addresses is a status byte used to determine readiness of the port to send or receive. The second memory address is used to send or receive the actual data byte. Predetermined code bytes are written to each port and read from each port to communicate with the corresponding attendant console.

Buffer Communications:

The console processor 180 communicates with the SMP 130, DMP 170, and the BMP 190 through the interprocessor Buffers (IPBs) using the command outlined in Table 3.

OTHER PROGRAM LEVEL ROUTINES

1. Read Keys: The read keys program scans all input ports and passes control to the proper sub-program when new button depressions (activations) from an attendant console are discovered at the port.

2. Assign Call: The assign call program looks at the attendant queue (for each customer group) and if there are any waiting calls, assigns them to the longest idle attendant of the proper customer group.

3. Time Audit: The time audit program periodically checks all console call states and invokes appropriate action if the allowable time of the particular state has been exceeded.

4. Write Console Lamps: The write console lamps program transmits control information via the output ports to the appropriate attendant consoles from an internally kept queue.

SUB-PROGRAM LEVEL ROUTINES

1. Key Modules: A number of individual key module sub-programs provide the logic that must be executed for each particular key press and state condition encountered.

2. Control Table Driver: The control table driver sub-program supports key module sub-programs by permitting a large part of the work to be expressed in a tabular form referred to as a control table. The control table defines next states to be entered, IPB commands to be sent, and lamps to be lighted.

3. Command Handlers: Each IPB Command received by the CMP 180 causes a command handler sub-program to be executed, thus setting the conditions dictated by the command.

BUSY LAMP FIELD MICROPROCESSOR

Operations:

The busy lamp field microprocessor BMP 190 serves as an input and output information handler for one or more optional busy-lamp-field/direct-station-select consoles hereinafter referred to as BLF consoles. The BMP 190 detects requests from BLF consoles for the status display of a specific hundreds/group of stations and provides display data to the requesting BLF console. The BMP 190 also detects connection requests made by an attendant (operator) through the selective depression of a select pushbutton adjacent to a particular station lamp located on the BLF console.

The BMP 190 maintains in its associated memory storage means a busy/idle map of all stations, and also trunks, if desired. The BMP 190 organizes the busy/idle information by hundreds/groups, for example, 400/499 and 1700/1799, in preparation for requests from the BLF consoles. The BMP 190 must accommodate and partition the customer groups. The BMP 190 has a single IPB 193 connected from the SMP 130 to provide busy/idle information, and an IPB 191, connected to the CMP 180 for providing requested directory numbers DN(s).

Busy Lamp Field Sense and Control Points:

The individual BLF console input/output ports serve as the sense and control points, respectively. Each BLF console's input/output port is accessed by a specific pair of adjacent memory addresses. The first of the memory addresses contains a status byte used to determine readiness of the port to send or receive. The second memory address is used to send or receive the actual data byte. Predetermined code bytes are written to each port and read from each port to communicate with the corresponding BLF console.

Buffer Communications:

The BMP 190 receives a single call processing command through the IPB 193 from the SMP 130. This command contains information updating the BMP busy/idle map. The BMP 190 sends a single call processing command through the IPB 191 to the CMP 180. This command sent contains the directory number DN as derived from the specific hundreds/group currently being displayed and added to a direct-station-select button activated by the attendant (operator).

Primary Programs:

The BMP 190 has a two level hierarchial program organization typical of the main programs and program level routines for all other processors in the system.

OTHER PROGRAM LEVEL ROUTINES

1. Busy/Idle Handler: Receives busy/idle data from the incoming IPB 193 and updates the busy/idle map.

2. Read Keys: Scans all input ports and either directs a new hundred/group of busy/idle lamps to be displayed, or a requested directory number to be placed in the internal outgoing IPB queue.

3. Lamp Driver: Periodically sends new lamp display data to each BLF console.

DATA BASE MICROPROCESSOR

Operations:

The data base microprocessor DMP 170 provides storage and retrieval upon request of all primary data structures in the control system. Among these are:

Directory Number Translations
Class of Service Tables
Access Code Translations
First-Digit Translations
Group Structure Tables
Restriction Tables
Call Forwarding Tables
Speed Dial Tables
Customer Group Parameters The DMP 170 also stores peg counters of various system device usages, and supports the non-call-processing ports to the connecting switching system, as previously noted.

The DMP 170 maintains two-way communications through the IPB(s) with the SMP 130, RMP 150, and CMP 180. The primary interchange of information comes in the form of requests for data concerning a particular network slot number or directory number and is delivered as the data requested. The DMP 170 is driven primarily by the request commands from other processors. It has no sense points that input call-processing stimuli. Several customer groups may exist in the system, and the DMP 170 must perform in a manner that maintains separation of the customer groups. This requires maintaining some internal data tables separately for each customer group; other data tables may be mixed together. The magnetic backup media is used for initial system loading and for recovery in the event of catastrophic failures. The keyboard terminal is the mechanism whereby recent change data and maintenance messages are entered into the control system. Because of these important input ports, the DMP 170 also serves as a distributor of program and operating data to all other microprocessors in the system. During these periods the DMP 170 makes special use of IPB(s) to convey the data directly to the SMP 130, RMP 150, and CMP 180. Data for the LMP 140 and TMP 160 is sent first to the SMP 130, which in turn forwards data to the LMP 140 and TMP 160.

Data Base Sense and Control Points:

The various input and output ports associated with the DMP 170 may be thought of as sense and control points respectively. Each is accessed by a specific pair of adjacent memory addresses. At one address is a status byte used to determine the readiness of the port to send or receive data. The other address of the pair contains the actual data byte sent or received. All DMP 170 ports use eight bit ASCII (American Standard Code for Information Interchange) codes for the transfer of information.

Buffer Communications:

The DMP 170 communicates with the SMP 130, RMP 150, and CMP 180 through the IPB(s) using the commands outlined in Table 3.

OTHER PROGRAM LEVEL ROUTINES:

1. Group Camp-on Queue Service: The group camp-on queue service program searches a list of callers waiting to be connected to an available member of a station or trunk group.

2. Keyboard Service: The keyboard service program is periodically invoked to test the terminal input port, to bring in characters appearing there and to pass control to a message analyzer when a full message has been input.

3. Output to Ports: The output-to-ports program is periodically invoked to send data waiting in internally kept queues to their respective output ports.

4. Data Audit: The data audit program continually tests the integrity of data structures by assuring that indirect address are within preset ranges and that address chains are consistent.

SUB-PROGRAM LEVEL ROUTINES:

1. Command Logic Sub-Programs: Each IPB command received by the DMP 170 causes a particular command handler to be invoked. The work of command handlers consist primarily of retrieving data requested and formatting the data into a responsive command; however, in some cases the retrieval process is quite complex requiring several levels of translation and/or group hunts.

2. Message Analyzer: The message analyzer sub-program tests messages from the keyboard and passes control to the proper routine to execute the message request.

3. Recent Change Driver: Modifies data base entries as requested by operating personnel from the keyboard.

DMP PROGRAM HIERARCHY FIG. 16

Each of the microprocessors in the system is provided in its program memory with stored command handler sub-programs which are invoked in response to command messages read from incoming IPBs. The chart of FIG. 16 is included to illustrate the data base microprocessor program hierarchy, and is exemplary of the hierarchy structure of the other microprocessors. The first block represents the IPB analyzer program level routine executed by the data base microprocessor in analyzing incoming IPBs for such messages, and in response to those incoming messages invoking a "function module"; i.e., a sub-program called for by the reference code in the command message. An incoming message might be, for example, a request for originating class of service data (ref. code 62) or for a first digit translation (ref. code 72) which would call for the data base processor to access the NSN/COS table, and the first digit translation table of the data base memory stores, to obtain the requested data and return the data to the requesting processor.

One of the principal operations carried out by the data base microprocessor is the execution, under control of a command handler sub-program, of steps and response to receiving the digits of a dialed number from the register microprocessor (RMP) together with the "normal dialed number" command (74). This is specifically depicted in the chart of FIG. 16 as represented by the legend "normal dialed number analyzer". Under sub-program control the data base microprocessor is operated to access the directory number table for the identifier word corresponding to the received dialed directory number. As illustrated in FIG. 16, having accessed the directory number table and read the identifier word, the data base microprocessor imitates performance performance of that one of the system functions designated by the instruction portion of the identifier word; i.e., standard call, conference call, group hunt, call pick-up, speed call, miscellaneous features.

STANDARD CALL FUNCTION (FIG. 26)

Figure 26:
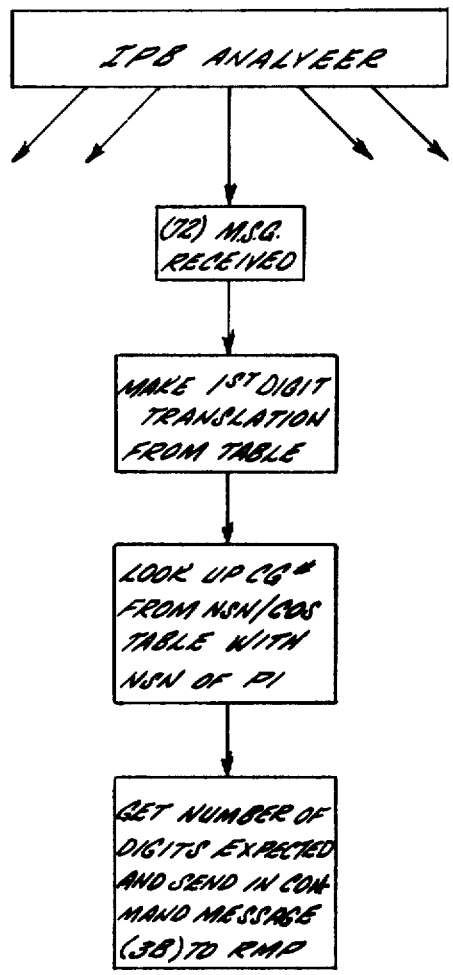

The steps carried out by the data base microprocessor DMP in response to the reading of the instruction (000) designating "standard call" from an identifier word location in the directory number table are shown in FIG. 26. These steps result in the assembly and sending of the standard call message (C9) to the state microprocessor SMP via the outgoing IPB 141.

CONFERENCE CALL (FIG. 27)

Figure 27:
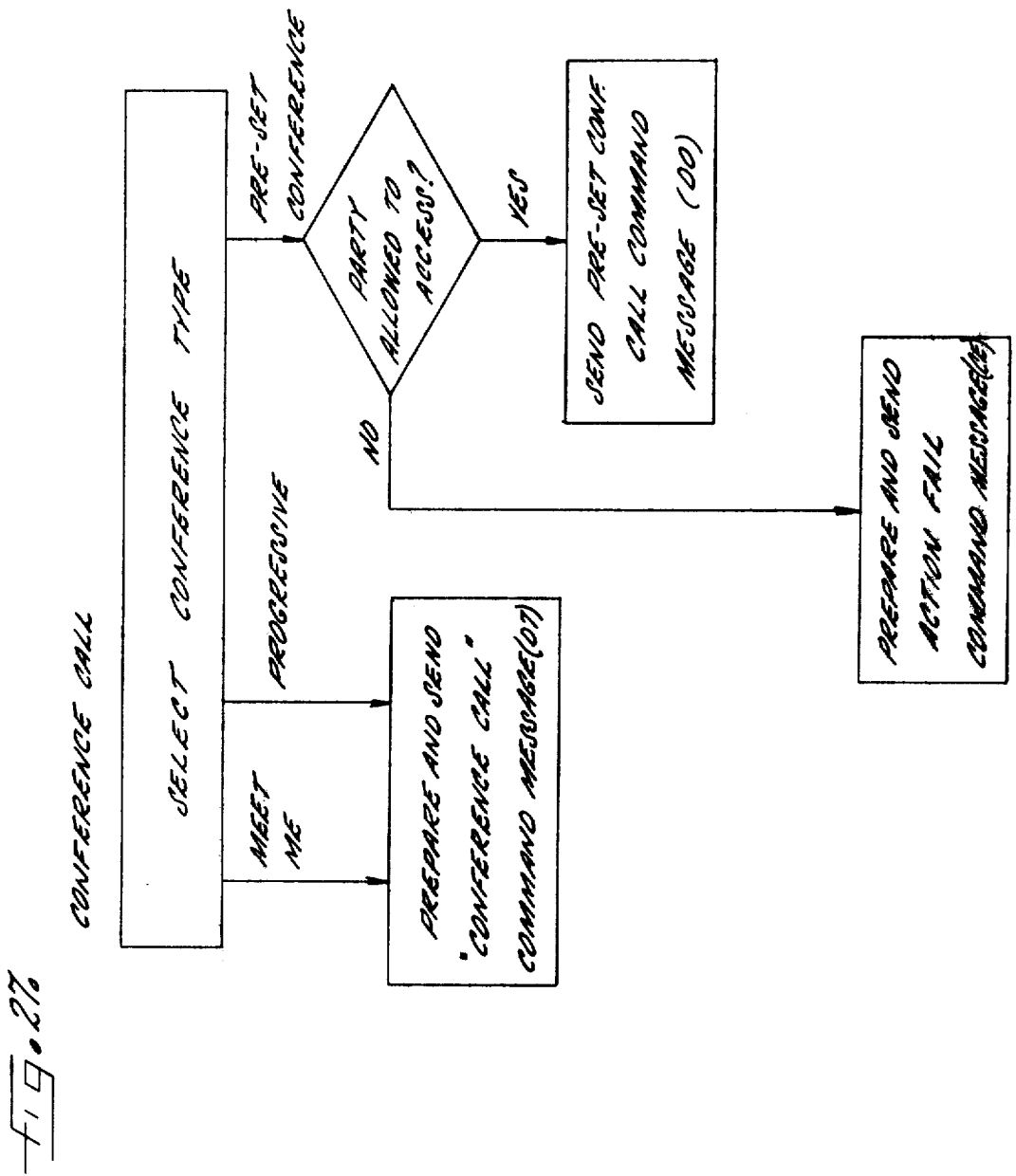

Referring to FIG. 27, the steps carried out by the data base microprocessor in response to the reading of the instruction (100) designating "conference call" in an identifier word located in the directory number table, are illustrated in this flow chart. The "type" code in the argument portion of the identifier word specifies whether the conference call is "meet me or progressive" or a "preset" conference. If either a "meet me" or "progressive" type conference, both being handled in essentially the same manner, the data base microprocessor DMP prepares and sends a conference call command message D7 to the state microprocessor, the contents of that command message being shown in Table 3.

In the case of the "preset" conference the decision is made as to whether the party is allowed to access by analysis of the class of service data and restriction table—if the answer is no, the data microprocessor DMP prepares and sends an action fail message (CE). If there is no restriction on the party, the preset conference is set up by preparing and sending the command message DO (see Table 3).

GROUP HUNT (FIG. 28)

In the group hunt operation a search is made through a listing of NSN numbers for an idle station, or trunk when the group hunt directory number is dialed and the dialed digits are received by the data base microprocessor DMP. Shown in FIG. 28 are the steps executed in response to finding a directory number table identifier word containing the group hunt instruction "001". If the group is "restricted" from access to the calling party, a "group busy" command message D8 is returned to the state microprocessor. If unrestricted, the question is asked "is an idle NSN found in the group?". If there is no idle station in the group listing, the same "group busy" command message D8 is returned to the state microprocessor. If an idle NSN number is found, the call is processed to the network slot number in the same manner as completing a "standard call", by the data base microprocessor preparing and sending the command message C9 to the state microprocessor SMP.

CALL PICK-UP (FIG. 29)

The steps executed under sub-program control in the data base microprocessor in response to the reading of the instruction (110) designating call pick-up from the identifier word in a location in the directory number table, are illustrated in this Figure. "Call Pick-Up" is a system function by which one station may answer incoming calls to any station in a "call pick-up group". Thus, referring to FIG. 29, if it is determined that the calling party is restricted, from general call pick-up, and is not a member of the designated call pick-up group, the data base microprocessor sends an action fail (CE) message. Otherwise it will search out the network slot numbers in the group that are in a "busy" state and prepare and send a call pick-up (CB) command message using the network slot number of a station searched out in the preceding step.

SPEED CALL (FIG. 30)

The programmed operations carried out by the data base microprocessor under subprogram control in response to the reading of an instruction (011) of an identifier word in the directory number table designating "speed call" are shown in FIG. 30. These steps conclude with the preparation and sending of the "speed call" command message CC (See Table 3) by the data base microprocessor. "Speed call" is the system function in which by dialing a directory number, typically abbreviated, a more extensive multi-digit number is located in a look-up table containing the correlation between the abbreviated directory number and the predesignated multi-digit number. As shown in FIG. 30, the data base microprocessor DMP carries out the step of performing look-up of the specified speed dial number, a trunk is assigned, preferably an idle trunk, and the "speed call" command message CC is transmitted to the state microprocessor which executes the steps required to transmit the dial tones over the trunk and complete the call.

MISCELLANEOUS FUNCTION ACCESS CODE (FIG. 31)

Now turning to FIG. 31, the steps are shown which are carried out by the data base microprocessor DBM in response to reading an identifier word from the directory number table 300, having the instruction (010) in the left three bits, designating that the internal access code in the argument portion of the identifier word is in the class of miscellaneous functions or features. Thus, the question is asked (FIG. 31) "internal access code special type?". If "yes", as indicated the sub-program branches to one of several routines for handling a special type of code. Examples given are "call to attendant" and "cancel call forwarding". These "special type" access codes are provided because they represent system functions which are required typically on a very frequent basis or which are directly completed by the data base microprocessor DMP without further interchange of commands with other microprocessors. An example of the latter case is to cancel a station on "call forwarding" so that subsequent calls will be completed as dialed, rather than to the call forwarding network slot number. Such involves the straight-forward step shown in FIG. 31, of canceling "transient area COS entry". Since the state of a party on the "call forwarding" status is determined by checking the transient area for the designated network slot number, to remove a party from call forwarding requires only canceling the transient area entry, as shown. The former case is illustrated by "call to attendant" which results in the data base microprocessor DMP preparing a special command message, (D1) which is loaded into the outgoing IPB in the communication path with the state microprocessor SMP, and initiates the operation of the microprocessors to execute that special function.

Other miscellaneous function access codes, not considered special are handled by the data base microprocessor DMP constructing the access code command message (CA) and inserting into it the standardized internal access code given in the argument portion of the identifier word, and loading that command message in the IPB in the communications path with the state microprocessor SMP.

EXEMPLARY "STANDARD CALL" FUNCTION

The following station-to-station call sequence is representative of the sequential programmed operations carried out by individual microprocessors of the control complex 55 in executing the overall "standard call" system function, and is the normal procedure for dialing another station without the attendant's assistance using DTMF or rotary dial. The station-to-station "standard call" utilizes five different microprocessors of the control complex 55, and the following explanation thereof is organized by action and response of a user call sequence and shows commands generated and response of the control complex 55.

Each command identified by reference code, is essentially a command to the receiving microprocessor to perform some work operation. The command message, including the ref. code together with data is loaded into an outgoing IPB. As such, the IPB units and the associated driving programs also act as the work queueing areas for the control complex 55.

STANDARD CALL STATION TO STATION CALL SEQUENCE

User Call Sequence:

| Action | Response |
|---|---|
| Go Off-Hook | Receive Dial Tone |
| Dial A Station's Directory # (DN) | Receive Ringback Tone Term. Station Rings |
| Go Off-Hook on the Term. Station Proceed as usual for Normal Talk | 2-Way Talk Path |

-continued

STANDARD CALL STATION TO STATION CALL SEQUENCE

Control Complex Call Sequence:

| IPB Commands Generated | Ref. Code | Sending/ Receiving IPB | Response |
|---|---|---|---|
| Line Orig. | A2 | L→S | |
| Busy P1 | 6E | S→B, S→D | |
| Request OCOS | 62 | S→D | |
| OCOS Data | C8 | D→S | Register is Seized |
| Standard Dial | 22 | S→R | P1 gets Dial Tone from R |
| 1st Digit Trans | 72 | R→D | After 1st Digit Dial Tone Stops |
| Receive N More Digits | 3B | D→R | |
| Normal Dialed # | 74 | R→D | |
| Standard Call | C9 | D→S | P1 gets Ringback Register is Released |
| Send Ring | 03 | S→L | |
| Busy P2 | 6E | S→B, S→D | |
| P2 Line Orig | A2 | L→S | Two-Way Talk Path |

Note:
B - BMP
S - SMP
L - LMP
C - CMP
R - RMP
D - DMP

INDIVIDUAL PROCESSOR PROGRAMMED OPERATIONS FIGS. 17-25

Referring to the flow charts of FIGS. 17-25, these illustrate the programmed operations executed by each microprocessor in the order given in the foregoing exemplary sequence. Such programmed operations executed by all the multi-processors, in combination, achieve the "standard call" system function.

In addition to the accompanying flow charts, reference also is made to the appended Table 3, which provides an extensive listing of reference codes, command descriptions and command message formats. The relatively few specific reference codes referred to in the exemplary sequence and in the flow charts, are described in Table 3.

The "standard call" sequence and accompanying flow charts are provided in order to explain, in detail, how the multi-processors are controlled, in combination, to execute a complete system function. While this detail is provided only for a "standard call" function, it fully discloses the manner in which the distributed processors service the associated portions of the switching exchange, and intercommunicate via dedicated channels to coordinate the functions of the exchange in performing a complete operation. With the "standard call" program as exemplary, one skilled in the art, when armed with the disclosure of this specification, will be capable of providing the detail necessary for performance of other system functions.

LMP OPERATIONS FIG. 17

Turning now to FIG. 17, and referring also to the exemplary sequence given above, the first "ref.code" listed is "A2" (all reference codes are in hexidecimal format) which is transmitted in a command message from the line microprocessor LMP to the state microprocessor SMP via an IPB 141. According to the program description earlier provided for the line microprocessor, at the program level the routine is continually scanning lines to detect off-hook line transitions.

Having detected a "new off-hook", the line microprocessor under program control assembles the complete message, consisting of the reference code "A2" and the network slot number (NSN) of the originating line, obtained by translation from the equipment address. As shown in Table 3, the format of the command message is the ref. code A2 and "LS8/MS4", which by definition (Table 2) is the least significant 8 digits and the most significant 4 digits of the network slot number (NSN) of the originating party, P1. Network slot number refers to the time and space slot in the switching network assigned to the station trunk, register, tone or attendant. The FIG. 17 representation in flow chart form of this initial segment or series of steps carried out by the line microprocessor under scanner program control, ends, as shown in FIG. 17 with the block "Send Command Message (A2) to SMP", the state microprocessor 130, which represents the ref. code "A2" and the network slot number LS8/MS4 is loaded into the outgoing IPB 141.

SMP OPERATION

Referring again to the above "standard call" sequence, it illustrates that the next command message transmitted is identified by the ref. code "6E".

Referring to Table 3, the section "Commands Sent By The SMP", under the reference codes there listed is "6E" and the statement that the corresponding command is transmitted to the data base microprocessor DMP as a representation that the originating line P1 is busy, and in the command message format column, the statement that the same command is also sent to the busy lamp microprocessor BMP. The data base microprocessor maintains a busy/idle "map" as one of the "other" tables in the data stores; the busy state of the originating network slot number is stored in the data base memory and provides data, retrievable by the data base microprocessor as to the availability of that station or link to receive calls.

Figure 18:
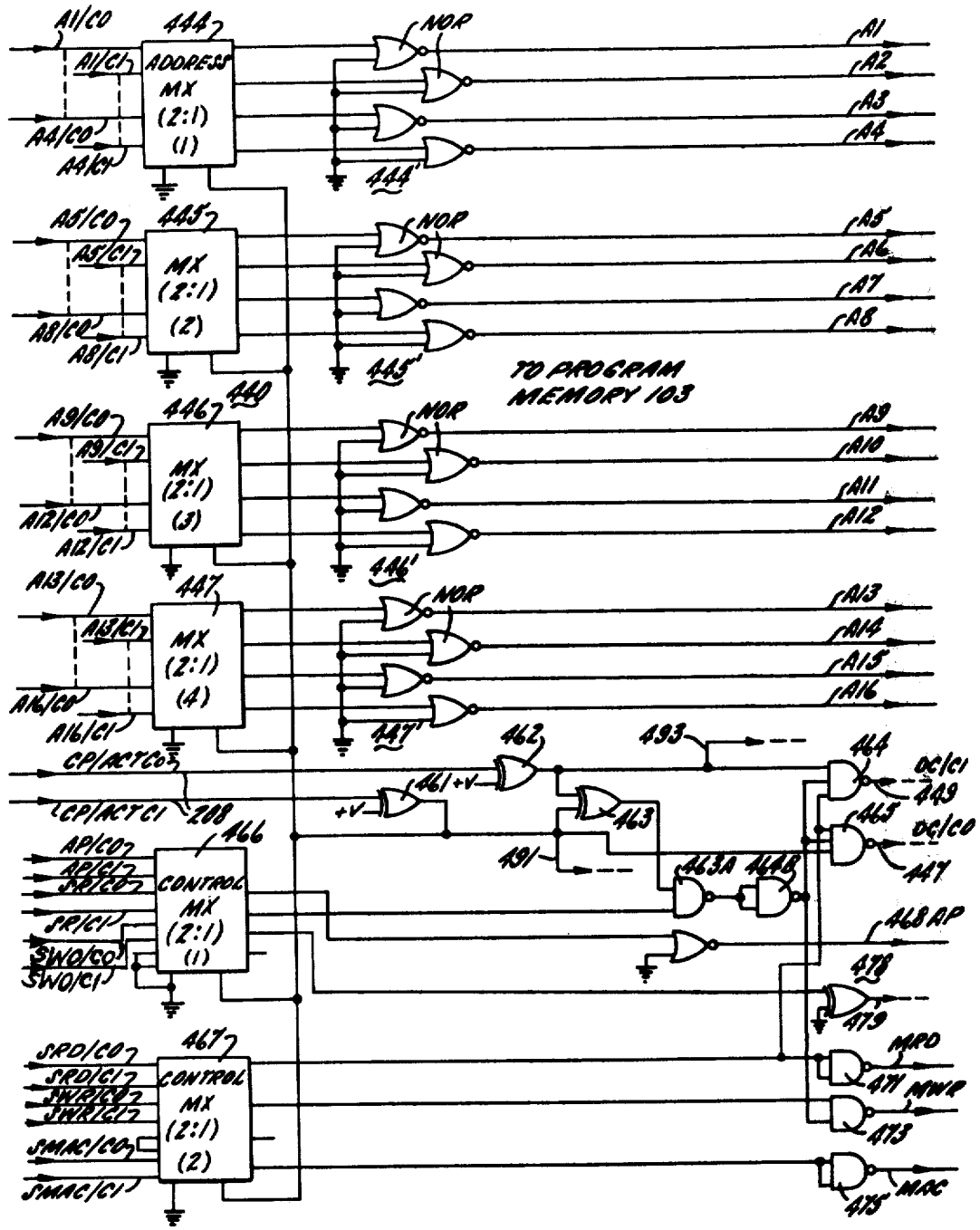

Referring now to FIG. 18, this figure in flow diagram form represents the two segmented operations given in the above standard call sequence as identified by the reference codes 6E and 62. Thus, in the scanning of the incoming IPB 141 the A2 command is found and analyzed. The command handler routine invoked, generates and sends the 6E command to the DMP and the BMP. As shown in FIG. 18, the command handler sub-program then calls for the state microprocessor SMP to transmit to the outgoing IPB 173 (in the communication path with the data base microprocessor 170), the ref. code "62". In Table 3, the ref. code 62 is described as a "request originating COS" (class of service) information, i.e., coded information on restrictions (see Table 4) applicable to the originating line P1. The format given for the complete command message is ref. code "62" and "LS8/MS4", which as noted earlier, is the network slot number of the originating line provided by the line microprocessor as part of the original command message. The command message is assembled by the state microprocessor SMP and loaded into the outgoing IPB 173.

DMP OPERATIONS FIG. 19

The busy/idle IPB message 6E is received (as shown in FIG. 19) by the data base microprocessor DMP and the busy/idle map in the other field of the data base memory, updated to reflect the busy state of P1. As shown in FIG. 19, the IPB analyzer program for the data base microprocessor DMP invokes a second subprogram appropriate to that command, and receives the "request originating COS" message. The flow chart in FIG. 19 indicates that the steps followed are to "Look up in NSN/COS Table to get OCOS for P1" and "Return OCOS In Command Message (C8)", the latter step invoking the assembly of the command message identified by the ref. code "C8" by the data base microprocessor and operating under IPB loader program to load the command message in the outgoing IPB 171 in the path to the partner microprocessor SMP.

SMP OPERATIONS FIG. 20

Figure 20:
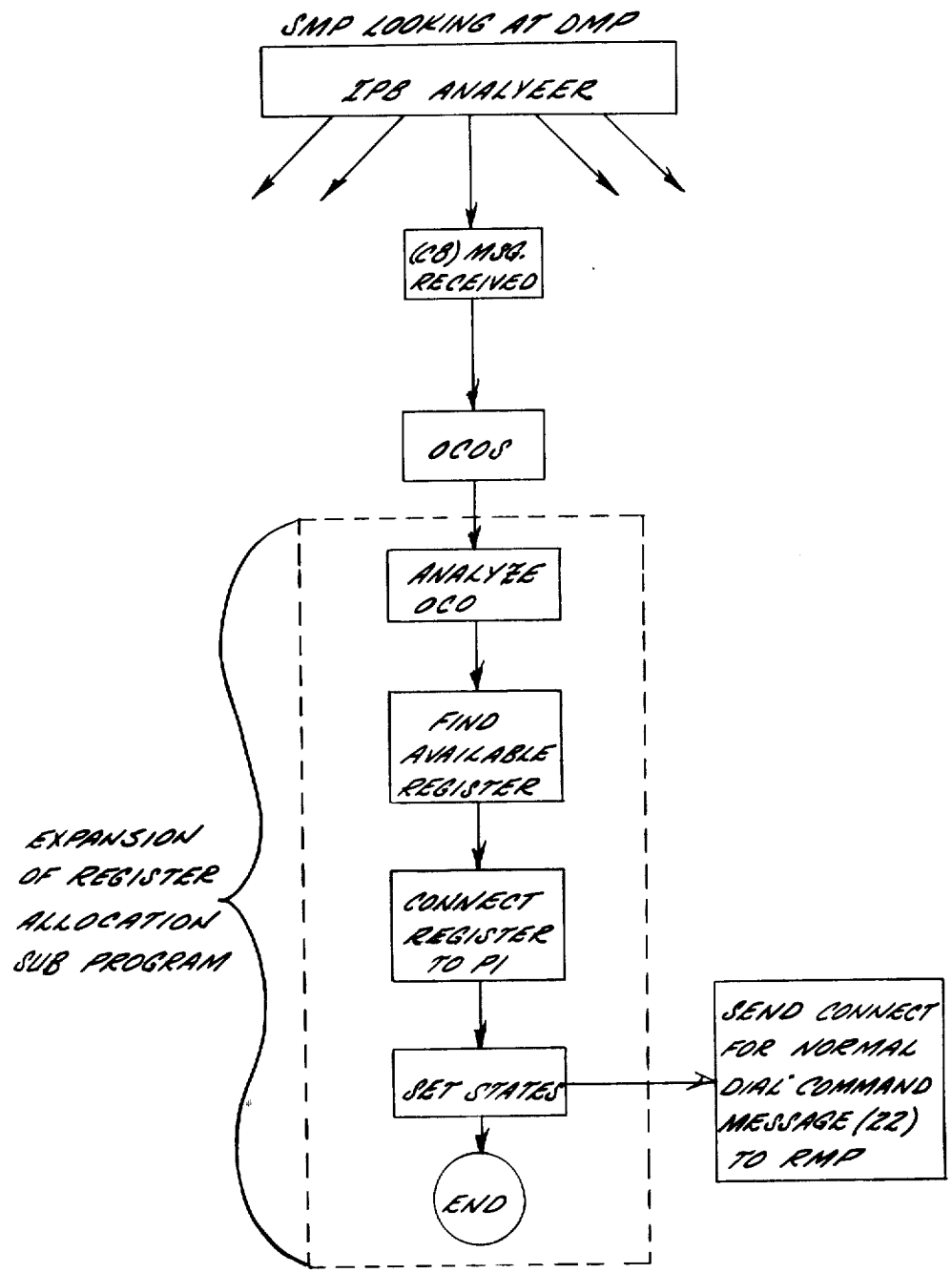

The next program segment, shown in FIG. 20, represents the response of the state microprocessor; scanning the incoming IPBs under IPB analyzer program, the state microprocessor receives the command message identified by the reference code "C8", and invokes the command handler sub-program to analyze the OCOS, find an available register, connect the line circuit thereto, and place the line and tone receiver into the IN-Register States, and load a command message identified by the ref. code 22, representing a command to "connect for normal dial", in an outgoing IPB 152 which is coupled to the register microprocessor RMP. Format of the complete command message identified by the ref. code 22 is shown in Table 3, and includes together with the reference code: R/LS8/MS4.

RMP OPERATIONS FIG. 22

Referring now to FIG. 21, the response of the register microprocessor RMP is shown in the upper part of the figure. It is illustrated that the register microprocessor RMP driven by the IPB analyzer program, scans the incoming IPBs, and detects the stored message in the incoming IPB 152. The command message identified by the reference code 22 "connect for normal dial" is received and in the command handler sub-program invoked in response, the specified register seized and set up to receive digits dialed from the originating party P1, and a dial tone sent to the originating line or party P1.

Also shown in FIG. 22 in the upper right hand portion of the Figure, is the program segment representing the further action of the register microprocessor RMP under program control after a brief time interval. The register microprocessor RMP is driven by the register scanner program and monitors the sense byte of the seized register. When the first dialed digit has been received, the dial tone is removed from the P1 line, and a command message, identified by the ref. code 72, sent to the data base microprocessor DMP, requesting a first digit translation. The command message of ref. code 72 is loaded into the outgoing IPB 153. The format of the command message identified by the ref. code 72, as shown in Table 3, is R/Digit/LS8/MS4.

Referring to the exemplary "station-to-station call sequence" above, the list of reference codes A2, 6E, 62, C8, 22, and 72 correspond, respectively, to the programmed operations diagrammed in the flow charts of FIGS. 17-20 and the upper two portions of FIG. 15.

DMP OPERATIONS FIG. 21

FIG. 21 is a flow chart of the programmed operation of the data base microprocessor DMP to scan the incoming IPBs under the IPB analyzer program and in response to receiving the command message identified by the ref. code 72 to branch to the command handler sub-program. The steps of FIG. 21 correspond to the ref. code 3B listing in the "station-to-station call sequence" which is identified as the command "Receive n more digits".

To provide such information as to the number of expected digits, the data base processor DMP has in the data base memory, a first digit translation table. The NSN/COS table under a command handler sub-program is addressed with the network slot number (NSN) to obtain the customer group number (CG#) of the originating party P1. Using the found CG# and the first digit dialed, the expected length of the directory number is found in the first digit translation table 314. In most instances a firm response may be given, based on the CG# and the 1st digit translation table, that the directory number having that first digit is one, two, three or more digits in length. Any directory number that is not firm, is flagged for "hesitation dialing". A command "Expect n digits", the maximum number included in the numbering plan is returned to the register microprocessor RMP. With the register microprocessor programmed to recognize "hesitation dialing", the register microprocessor will expect "n" digits but recognize a directory number with fewer than "n" digits by the occurrence of a predetermined "hesitation" interval.

One of the features of the system is that the numbering plan can be completely flexible allowing virtually a completely free choice of directory numbers; for example the following may be assigned as directory numbers to different stations in the same customer group, or in different customer groups, or may be assigned to different functions without constraint:

(1) 1,
(2) 1,2
(3) 1,2,3
(4) 1,2,3,4

Even though such four directory numbers may have the same first digit, and are in the same customer group, the system can accomodate the use of such numbers.

In many telecommunication systems heretofore, access codes to special features are required to be in a dedicated group of codes. In the present system, access codes to functions or directory numbers of called station are all treated as "normal" directory numbers. The functions of "call forwarding" for example, may be preassigned a directory number of as few or as many digits as desired and in any area of the numbering plan desired, since a directory number designates a system function. When the full number of digits assigned as a directory number to a function such as "call forwarding" have been dialed, then received and stored in one of the registers by the register microprocessor RMP, the digits are transferred as a "normal dialed number" to the data base microprocessor DMP, precisely as illustrated in the case of the "standard call" function as diagramed in the lower righthand flow chart on FIG. 22.

In short, all system functions (standard call, and the other functions such as conference call, group hunt, etc.) involve the same sequence of programmed operations shown in the flow charts of FIGS. 17-22, and the same sequence of reference codes listed above in the exemplary listing through ref. code 74, the eighth listed.

Directing attention, therefore, to the ninth ref. code in the station-to-station call sequence; namely, "C9", identified as the "standard call" command, according to the listing such ref. code is assembled and transmitted in a command message to the state microprocessor SMP.

Table 3 provides the format of the command message identified by the ref. code "C9" and states that it contains in subsequent bytes following the reference code:

| | |
|---|---|
| LS8(P1)/MS4 | network slot number of P1 |
| LS8(P2)/MS4 | network slot number of P2 |
| (P1) TCOS | terminating class of service P1 |
| (P2) TCOS | terminating class of service P2 |
| P1 (OCOS) | originating class of service P1 |

DMP USE OF DN TABLE FIG. 23

The directory number table is a multiple level table in which the various levels are linked by pointers. Locations in the lowest level store coded electrical signals representing a two byte identifier word having a three bit instruction portion and one and one-half bytes representing an argument of the instruction. The format of the identifier word is the same for all categories of system functions. The three bit instruction word designates one of the larger categories of system functions by the pattern of bits. The one and one-half bytes representing an argument of the instruction, in the case of the "standard call" function represents the network slot number (NSN) of the called party P2. In the case of group hunt, speed call and call pick-up functions, the argument portion of the identifier word represents an identification (ID) number serving as a pointer to separate tables of further data. In the case of the hunt group, for example, the "ID" is an address pointing to one of multiple lists of network slot numbers. Under program control the data base microprocessor will hunt through the designated hunt group for an idle station. In the case of the speed call "ID", the identification number is a pointer address to lists of directory numbers, including prefixes and area codes which are designated by an abbreviated directory number for convenience in dialing.

In the case of the conference call function, the one and one-half bytes of data provide the "conference ID number", type, i.e., is it preset conference, progressive conference or a "meet me" type conference—this two bit code thus identifies which type of conference is designated by the identifier word. The final five bits of the argument portion of the identifier word identifies the size of the conference call.

The conference ID number is a pointer address to another table which identifies a specific port by network slot number of the conference hardware network, and can be utilized in establishing the conference call connections.

With regard to the miscellaneous features or miscellaneous functions argument portion of the identifier word, the one and one-half bytes are used to store a standardized access code which is a reference to the specific system function to be performed. For instance in the case of "message waiting", one of the miscellaneous functions, a dialed number is converted to the standardized number for that "message waiting" function, which in turn directs the state microprocessor SMP to execute assigned tasks to perform this function. To carry out the "message waiting" function, the state microprocessor redirects the register microprocessor RMP (which is already connected) to receive digits from the last dialing to now collect digits of a directory number, specifically for the purpose of placing the directory number identifying a station in a "message waiting" mode.

The directory number table is addressed in response to the combination of (1) coded electrical signals representing a dialed directory number and (2) coded electrical signals identifying the customer group number (CG#) of the originating station P1. The entry level of the table is indexed by the CG#, to find a pointer to the intermediate level of the table, which has blocks of locations corresponding to the customer groups. The intermediate level is indexed by the two higher order digits of the directory number, to obtain the pointer address of one of the multiple blocks of locations in the lowest level. The location in the addressed lowest level block is indexed by the two lower order digits of the directory number.

Referring to FIG. 23, this flow chart illustrates the command handler subprograms which drives the data base micro-processor DBM in response to the "normal dialed #" command 72. As in the case of the other microprocessors of the control complex 55, the data base microprocessor is driven under control of an IPB analyzer program, to scan the incoming IPBs and detect and read the normal dialed number command message identified by the ref. code 72. This command message includes the digits of the dialed number (see Table 3) together with the reference code 72, and is transmitted from the register microprocessor RMP and stored in the IPB 153. FIG. 23 represents expansion of the command handler sub-program driving the data base microprocessor in response to receiving the command message identified by the ref. code 72, and illustrates that the CG# is obtained using the network slot number of P1 and the NSN/COS Table. The CG# is used to enter the directory number table, as indicated in the next logic block of FIG. 23, and obtain the pointer address to the intermediate level 000/00 (thousands/hundreds) block.

Referring again to FIG. 23, the designated function represented by the bit pattern of the higher order three bits in the identifier word, is one of the system functions listed in the six blocks at the bottom of FIG. 23.

In the case of the "standard call" function, the argument of the instruction is the network slot number (NSN) of the called party P2.

The data base microprocessor assembles the command message identified by the standard call reference call "C9" and loads, under the IPB loader program, the command message including reference code, into the outgoing IPB 171. As a preliminary to assembling the "standard call" command message, the data base processor also tests, as shown in FIG. 26, "is the call diversion in effect for the called to party?" Among the tables and memory fields of the data base memory is a table called the transient COS table, which includes a listing of all stations or parties on call forwarding status. The question—is the call diversion in effect—for the party P2, is determined by checking the transient service area provided by the transient table. If the answer to that question is "no", the sub-program driving the data base microprocessor branches to the routine to "prepare and send" the "standard call" command message to the IPB 141. If the answer to the call diversion question is "yes", and it is not a "conditional" call diversion, then the network slot number of the station to which calls are to be forwarded is determined, and the command message prepared and sent to the IPB 141 by the data base microprocessor. In place of using the network slot number of "P2", the network slot number is used of the station to which the party P2 calls are to be diverted or "forwarded".

In addition to the network slot number of the originating party P1, and the network slot number of the called party P2, or in the case of a diverted call the network slot number of the station to which calls are being forwarded, certain class of service information of both parties P1 and P2 is required in the assembly of the command message by the data base microprocessor DMP. That class of service data is obtained from the NSN/COS table using the network slot number of the called party P2. That class of service data for the parties P1 and P2 included in the command message, is subsequently utilized by the state microprocessor in determining whether the class of service assigned to the calling or called party restricts the completion of the standard call between them.

SMP OPERATION FIG. 24

Now turning to FIG. 24, this flow chart represents the operation of the state microprocessor SMP under the IPB analyzer program, and the scanning of the incoming IPBs for messages. The message previously loaded into the IPB 171 by the data base microprocessor and identified by the command "C9" is detected and read. The standard call command handler sub-program is invoked and as shown in the lower portion of FIG. 24, the state microprocessor tests the class of service of both parties and if it finds no restrictions, tests whether the called party is "busy", sets the appropriate states of P1 and P2, assembles a P2 ring command message and transmits a command message identified by the ref. code "03" to the outgoing IPB 142.

As noted in the "station-to-station call sequence" the "03" reference code represents a "send ring" command to the line microprocessor. The state microprocessor also sends the command message identified by the code "60" if it finds P2 in a busy state.

LMP OPERATION FIG. 25

FIG. 25 illustrates the operation under program control of the line microprocessor, specifically the operation under the IPB analyzer program driving the line microprocessor LMP to scan incoming IPBs for messages. As indicated in FIG. 25, the line microprocessor LMP in scanning the incoming IPB 142, unloads the command message represented by the ref. code "03" and recognizes that command message as a command to ring the P2 line. It receives, as indicated in Table 3, the network slot number of the called party (either the party P2 or the station to which the original P2 calls have been diverted by a call forwarding function) and the network slot number is converted to an equipment address under a sub-program provided for that purpose for driving the line microprocessor LMP. The flow chart of FIG. 25 of the operation of the line microprocessor terminates with the "writes ring control byte" step being executed. Referring to the station-to-station call sequence, that illustrates the establishing of the two-way talk path by the line microprocessor and the sending of the command.

TABLE 2

Abbreviations of IPB Commands

| | |
|---|---|
| A | ATTENDANT |
| AL | ALPHA |
| ARG | ARGUMENT |
| AS | ATTENUATOR SELECTION |
| BI | BUSY IDLE |
| CCF | CODE CALL FLAG NIBBLE |
| CG | CUSTOMER GROUP |
| CONF | CONFERENCE |
| COS | CLASS OF SERVICE |
| TAAS | TRUNK ANSWER ANY STATION |
| PCD | PATIENT CALL DIVERSION |
| DN | DIRECTORY NUMBER |
| DSP | DISPLAY |
| ET | ELAPSED TIME |
| F | FLAG |
| FNS | FLEXIBLE NIGHT SERVICE |
| GB | GROUP BUSY |
| G/S | GROUP / SPECIFIC FLAG |
| HIG | HIGH ORDER PART OF GROUP NO. |
| LOG | LOW ORDER PART OF GROUP NO. |
| LS8 | LEAST SIGNIFICANT 8 DIGITS OF NSN |
| MS4 | MOST SIGNIFICANT 4 DIGITS OF NSN |
| NS | NIGHT SERVICE |
| NSN | NETWORK SLOT NUMBER |
| OF | OVERRIDE FLAG |
| OCOS | ORIGINATING CLASS OF SERVICE |
| OG | OUT-GOING |
| OW | OUTWARD |
| P | PARTY |
| PS | PARTY SPLITTING |
| PP | PARTY PARKED |
| QF | QUANTITY FOLLOWING (NUMBER OF BYTES FOLLOWING IN COMMAND) |
| R | REGISTER (WHEN ALONE, ALWAYS MEANS REGISTER EQUIPMENT NUMBER) |
| RMJ | RIGHT MOST JUSTIFIED |
| RSN | REASON |
| S | STATION |
| SAC | STANDARDIZED ACCESS CODE |
| SG | STATION GROUP |
| SH | SECRETARY HUNT |
| STD | STANDARD |
| T | TRUNK |
| TCOS | TERMINATING CLASS OF SERVICE |
| TG | TRUNK GROUP |
| TGN | TRUNK GROUP NUMBER |
| V | VECTOR POINTING TO ASSOCIATED ATTENDANT'S LOOP |
| / | SEPARATION OF BYTES WITHIN COMMAND MESSAGE FORMAT |
| ; | SEPARATION OF FIELDS WITHIN MESSAGE BYTES |

TABLE 3  IPB COMMANDS
COMMANDS RECEIVED BY THE LMP

| Ref. Code | Rcvr. | Sender | Command Description | Command Message Format Byte 1 | Byte 2 |
|---|---|---|---|---|---|
| 02 | LMP | SMP | Terminate Ring | LS8 / | MS4 |
| 03 | LMP | SMP | Send Ring | LS8 / AS Code ; | MS4 |
| 04 | LMP | SMP | Disable Flash | LS8 / | MS4 |
| 05 | LMP | SMP | Enable Flash | LS8 / AS Code ; | MS4 |
| 06 | LMP | SMP | Set Attenuator | LS8 / AS Code ; | MS4 |

Table 5

COMMANDS SENT BY THE LMP

| Ref. Code | Rcvr. | Sender | Command Description | Command Message Format Byte 1 / Byte 2 |
|---|---|---|---|---|
| A2 | SMP | LMP | Line Origination | LS8 / MS4 |
| A3 | SMP | LMP | Line Flash | LS8 / MS4 |
| A4 | SMP | LMP | Line Disconnect | LS8 / MS4 |

COMMANDS RECEIVED BY THE TMP

| Ref. Code | Rcvr. | Sender | Command Description | Command Message Format Byte 1 / Byte 2 |
|---|---|---|---|---|
| 12 | TMP | SMP | Seize Trunk | LS8 / AS Code ; MS4 |
| 13 | TMP | SMP | Request Trunk Disc. | LS8 / MS4 |
| 14 | TMP | SMP | Dialing Complete | LS8 / MS4 |
| 15 | TMP | SMP | P2 Answer | LS8 / AS Code ; MS4 |
| 16 | TMP | SMP | Disconnect 9th Bit | LS8 / MS4 |
| 17 | TMP | SMP | Register Assigned | LS8 / MS4 |
| 18 | TMP | SMP | Register Released | LS8 / AS Code ; MS4 |
| 19 | TMP | SMP | Recognize Flash | LS8 / AS Code ; MS4 |
| 1A | TMP | SMP | Disregard Flash | LS8 / MS4 |
| 1B | TMP | SMP | Set Attenuator | LS8 / AS Code; MS4 |

COMMANDS SENT BY THE TMP

| Ref. Code | Rcvr. | Sender | Command Description | Command Message Format Byte 1 / Byte 2 |
|---|---|---|---|---|
| A8 | SMP | TMP | Incoming Trunk | LS8 / MS4 |
| A9 | SMP | TMP | Trunk Disconnect | LS8 / MS4 |
| AA | SMP | TMP | P2 Answer on O.G. Trunk | LS8 / MS4 |
| AB | SMP | TMP | Stop Dial | LS8 / MS4 |
| AC | SMP | TMP | Allow Dial | LS8 / MS4 |
| AD | SMP | TMP | Trunk Flash | LS8 / MS4 |
| AE | SMP | TMP | Seize Fail | LS8 / MS4 |

COMMANDS RECEIVED BY THE CMP

| Ref. Code | Rcvr. | Sender | Command Description | Command Message Format Byte 1  Byte 2  Byte 3  Byte 4 |
|---|---|---|---|---|
| 42 | CMP | SMP | Attendant Call | LS8 / MS4 / Type |
| 43 | CMP | SMP | Attendant Recall | LS8 / MS4 / Type |
| 46 | CMP | SMP | Disconnect in Queue | LS8 / MS4 |
| 47 | CMP | SMP | Disconnect in Loop | LS8 (P)/ MS4/ LS8 (A)/MS4 |
| 48 | CMP | SMP | P2 Answer | LS8(P2)/MS4/LS8(A)/MS4 |
| 49 | CMP | SMP | In-Loop Recall | LS8(P)/ MS4/LS8(A)/MS4 |
| 4A | CMP | SMP | Affirm (Conn. Compl.) | LS8(P)/ MS4/ V |
| 4B | CMP | SMP | Disaffirm (Conn. Fail) | LS8(P)/MS4/V/RSN |
| 4C | CMP | SMP | Wake-up Fail | LS8/MS4 |
| 4D | CMP | SMP | TAAS Request | LS8/MS4/TAAS COS |
| 4E | CMP | SMP | Split to Attendant | LS8(PS)/MS4/LS8(PP)/MS4 |
| 4F | CMP | SMP | Call to Specific Attn. | LS8(P)/MS4/LS8(A)/MS4 |
| 50 | CMP | SMP | Conference Net Status | Busy / Idle-Flag |
| 58 | CMP | DMP | Std. COS Retrieval | COS/COS/COS/DSPL#1/DSPL#2 |
| 5A | CMP | DMP | Trunk Group Status | 15-8 BI/7-0 BI |
| 5B | CMP | DMP | Wake Up Time | LS8/MS4/Hrs/Min |
| 5C | CMP | DMP | Split COS Retrieval | Same as 58, but 2 NSN's |

Table 3

COMMANDS SENT BY THE CMP

| Ref. Code | Rcvr. | Sender | Command Description | Command Message Format Byte 1 Byte 2 Byte 3 Byte 4 |
|---|---|---|---|---|
| 88 | DMP | CMP | Request Console COS | LS8/MS4/Type |
| 8A | DMP | CMP | Seize Trunk of Group | CG,TGN/V |
| 8B | DMP | CMP | Restrict Trunk Group | CG,TGN |
| 8C | DMP | CMP | Unrestrict Trunk Group | CG,TGN |
| 8D | DMP | CMP | Group Camp-On | LS8/MS4/CG,TGN/V |
| 8E | DMP | CMP | Talk to Specific DN | CG/D3,D4/D1,D2/V |
| B8 | SMP | CMP | Park1 | LS8(P)MS4/LS8(A)/MS4 |
| B9 | SMP | CMP | Talk1 | LS8(P)MS4/LS8(A)/MS4/V |
| BA | SMP | CMP | Park2  LS8(P1)/MS4/ | LS8(P2)/MS4/LS8(A)/MS4 |
| BB | SMP | CMP | Talk2  LS8(P1)/MS4/ | LS8(P2)/MS4/LS8(A)/MS4/V |
| BC | SMP | CMP | Release | LS8(P1)/MS4/LS8(P2)/MS4 |
| BD | SMP | CMP | Disconnect | LS8(P)/MS4/LS8(A)/MS4 |
| BE | SMP | CMP | Start Dial | LS8(A)/MS4/V |
| BF | SMP | CMP | Conference | LS8(P)/MS4/LS8(A)/MS4/V |
| C0 | SMP | CMP | Override Disconnect | LS8(P2)/MS4/LS8(A)/MS4 |
| C1 | SMP | CMP | Override Talk | LS8(P2)/MS4/LS8(A)/MS4 |
| C2 | SMP | CMP | Unserviced | LS8/MS4 |
| C3 | SMP | CMP | Chain | LS8/MS4 |
| C4 | SMP | CMP | Wake-Up Ring | LS8/MS4 |

COMMANDS RECEIVED BY THE RMP

| Ref. Code | Rcvr. | Sender | Command Description | Command Message Format Byte 1 Byte 2 Byte 3 Byte 4 |
|---|---|---|---|---|
| 22 | RMP | SMP | Originating Station | R/LS8/MS4 |
| 23 | RMP | SMP | Orig. D.I.D. Trunk | R/LS8/MS4 |
| 24 | RMP | SMP | Flash (Split) Station | R/LS8/MS4 |
| 25 | RMP | SMP | Set Call Forwarding | R/LS8/MS4 |
| 26 | RMP | SMP | Set Secretary Hunt | R/LS8/MS4 |
| 27 | RMP | SMP | Set P.C.D. | R/LS8/MS4 |
| 28 | RMP | SMP | Set Remote Call Fwd. | R/LS8/MS4 |
| 29 | RMP | SMP | Orig. Sta. C.F. Mode | R/LS8/MS4 |
| 2A | RMP | SMP | Cancel P.C.D. | R/LS8/MS4 |
| 2B | RMP | SMP | Set RM Outdial Restrict | R/LS8/MS4 |
| 2C | RMP | SMP | Set Flexible N.S. | R/LS8(A)/MS4 |
| 2D | RMP | SMP | Set Speed Dialing | R/LS8/CG,MS4 |
| 2E | RMP | SMP | Set Wake-Up Time | R/LS8(A)/MS4 |
| 2F | RMP | SMP | Dial by NSN | R/LS8/MS4 |
| 30 | RMP | SMP | Receive Suffix Digit | R |
| 31 | RMP | SMP | Send Digits Given | R/QF/D1,D2/D3,D4/.../DX |
| 32 | RMP | SMP | Rcv. and Send Digits | R |
| 33 | RMP | SMP | Toll Restrict | R/LS8(Trunk)/MS4 |
| 34 | RMP | SMP | Rcv.,Send, and Restrict | R/LS8(Trunk)/MS4 |
| 35 | RMP | SMP | Register Abort | R |
| 36 | RMP | SMP | Stop Dial | R |
| 37 | RMP | SMP | Allow Dial | R |
| 38 | RMP | SMP | Rcv. Suffix Digit/Grp | R |
| 39 | RMP | SMP | Cancel Remote C.F. | R/LS8/MS4 |
| 3A | RMP | SMP | Rcv. & Send Code Call | R/CCF,- |
| 3B | RMP | SMP | Receive N More Digits | R/N |

COMMANDS SENT BY THE RMP

| Ref. Code | Rcvr. | Sender | Command Description | Command Message Format Byte Sequence |
|---|---|---|---|---|
| 72 | DMP | RMP | Request 1st # Xlation | R/Digit/LS8/MS4 |
| 73 | DMP | RMP | Toll Restrict Inquiry | R/LS8(T)/MS4/D5,D6/D3,D4/D1,D2 |
| 74 | DMP | RMP | Dialed #, Normal | LS8/MS4/D3,D4/D1,D2 |
| 75 | DMP | RMP | Dialed #, Set C.F. | LS8/MS4/D3,D4/D1,D2 |

Table 3 (continued)

Commands Sent by the RMP

| Ref. Code | Rcvr. | Sender | Command Description | Command Message Format Byte Sequence |
|---|---|---|---|---|
| 76 | DMP | RMP | Dialed #, Set S.H. | LS8/MS4/D3,D4/D1,D2 |
| 77 | DMP | RMP | Dialed #, Set P.C.D. | LS8/MS4/D3,D4/D1,D2 |
| 78 | DMP | RMP | Dialed #, Set RM. RST. | LS8/MS4/D3,D4/D1,D2 |
| 79 | DMP | RMP | Dialed #, Set Flex N.S. | LS8(A)/MS4/D3,D4/D1,D2 (T)/D3,D4/D1,D2 (STA) |
| 7A | DMP | RMP | Dialed #, Set Speed Dial | LS8/CG,MS4/QF/DN,DN-1/ .../.../D1,D2 |
| 7B | DMP | RMP | Dialed #, Set Wake-Up | LS8/MS4/D3,D4/D1,D2/ HR/MIN |
| 7C | DMP | RMP | Set Remote Diversion | LS8/MS4/D3,D4/D1,D2 (FROM)/D3,D4/D1,D2 (TO) |
| 7D | DMP | RMP | Dialed #, NSN | LS8/MS4/D3,D4/D1,D2 |
| 7E | DMP | RMP | Reset Rm. Restrict | LS8/MS4/D3,D4/D1,D2 |
| 7F | DMP | RMP | Cancel PCD | LS8/MS4/D3,D4/D1,D2 |
| 80 | DMP | RMP | Cancel Remote | LS8/MS4/D3,D4/D1,D2 |
| B0 | SMP | RMP | Suffix Digit for Grp | Register # /Digit |
| B1 | SMP | RMP | Register Done | Register # |
| B2 | SMP | RMP | Suffix Digit | Register # /Digit |
| B3 | SMP | RMP | Register Time Out | Register # |
| B4 | SMP | RMP | Apparent Disconnect | Register # |
| B5 | SMP | RMP | Flash In-Register | Register # |
| B6 | SMP | RMP | Audible Tone Cycle | Cycle # |

COMMANDS RECEIVED BY THE DMP

| Ref. Code | Rcvr. | Sender | Command Description | Command Message Format Byte Sequence |
|---|---|---|---|---|
| 62 | DMP | SMP | Request Orig. COS | LS8/MS4 |
| 63 | DMP | SMP | Request Term. COS | LS8/MS4 |
| 64 | DMP | SMP | AIOD Send | LS8/MS4 |
| 65 | DMP | SMP | Group Camp-On | LS8/MS4/LOG/HIG |
| 69 | DMP | SMP | Hot Line | LS8/MS4 |
| 6A | DMP | SMP | Traffic Usage Data | LS8/MS4/ET |
| 6E | DMP | SMP | Busy | LS8/MS4 Could also be |
| 6F | DMP | SMP | Idle | LS8/MS4 issued to BMP |
| 72 | DMP | RMP | Request 1st # Xlation | R/Digit/LS8/MS4 |
| 73 | DMP | RMP | Toll Restrict Inquiry | R/LS8(T)/MS4/D5,D6/ D3,D4/D1,D2 |
| 74 | DMP | RMP | Dialed #, Normal | LS8/MS4/D3,D4/D1,D2 |
| 75 | DMP | RMP | Dialed #, Set C.F. | LS8/MS4/D3,D4/D1,D2 |
| 76 | DMP | RMP | Dialed #, Set S.H. | LS8/MS4/D3,D4/D1,D2 |
| 77 | DMP | RMP | Dialed #, Set P.C.D. | LS8/MS4/D3,D4/D1,D2 |
| 78 | DMP | RMP | Dialed #, Set RM. RST. | LS8/MS4/D3,D4/D1,D2 |
| 79 | DMP | RMP | Dialed #, Set Flex N.S. | LS8(A)/MS4/D3,D4/D1, D2(T) D3,D4/D1,D2(STA) |
| 7A | DMP | RMP | Dialed #, Set Speed Dial | LS8/CG,MS4/QF/DN,DN-1/ ...../D1,D2 |
| 7B | DMP | RMP | Dialed #, Set Wake-Up | LS8,MS4/D3,D4/D1,D2/ HR./MIN. |
| 7C | DMP | RMP | Set Remote Diversion | LS8/MS4/D3,D4/D1,D2 (FROM)/D3,D4/D1,D2(TO) |
| 7D | DMP | RMP | Dialed #, NSN | LS8/MS4/D3,D4/D1,D2 |
| 7E | DMP | RMP | Reset Rm. Restrict | LS8/MS4/D3,D4/D1,D2 |
| 7F | DMP | RMP | Cancel PCD | LS8/MS4/D3,D4/D1,D2 |
| 80 | DMP | RMP | Cancel Remote | LS8/MS4/D3,D4/D1,D2 |
| 88 | DMP | CMP | Request Console COS | LS8/MS4/Type |
| 8A | DMP | CMP | Seize Trunk of Group | CG, TGN/V |
| 8B | DMP | CMP | Restrict Trunk Group | CG, TGN |
| 8C | DMP | CMP | Unrestrict Trunk Group | CG,TGN |
| 8D | DMP | CMP | Group Camp-On | LS8/MS4/CG,TGN/V |
| 8E | DMP | CMP | Talk to Specific DN | CG/D3,D4/D1,D2/V |

Table 3

COMMANDS SENT BY THE DMP

| Ref. Code | Rcvr. | Sender | Command Description | Command Message Format Byte Sequence |
|---|---|---|---|---|
| 3B | RMP | DMP | Receive N More Digits | R/N |
| 58 | CMP | DMP | Std. COS Retrieval | COS/COS/COS/DSPL#1/ DSPL#2/TAAS GRP/DN/ DN/LS8/MS4/TYPE |
| 5A | CMP | DMP | Trunk Group Status | 15-8 BI/7-0 BI |
| 5B | CMP | DMP | Wake Up Time | LS8/MS4/HRS/MIN |
| 5C | CMP | DMP | Split COS Retrieval | Same as 58, but 2 NSN |
| C8 | SMP | DMP | Originating COS Data | LS8/TRCOS,MS4/OCOS |
| C9 | SMP | DMP | Standard Call | LS8(P1)/MS4/LS8(P2)/ MS4/(P1) TCOS/(P2) TCOS/(P2)OCOS |
| CA | SMP | DMP | Access Code Dialed | LS8/MS4/SAC/AC COS/ ARG1/ARG2 |
| CB | SMP | DMP | Call Pickup | LS8/MS4/MORE-TO-COME FLAG, QF/LS8/MS4/LS8 MS4/..../LS8/TAAS |
| CC | SMP | DMP | Speed Call | LS8(P1)/MS4/LS8(T)/ MS4/QF/D2,D1/D4,D3/. |
| CD | SMP | DMP | Action Successful | LS8/MS4 |
| CE | SMP | DMP | Action Fails | LS8/MS4 |
| CF | SMP | DMP | Call from Group Queue | LS8(P1)/MS4/LS8(P2)/ MS4/P1TCOS/P2TCOS, P2OCOS |
| D0 | SMP | DMP | Preset Conf. | LS8(P1)/MS4/LS8(Conf) OF, MS4/OF/LS8/MS4/. |
| D1 | SMP | DMP | Route to Attendant | LS8/MS4/TYPE |
| D2 | SMP | DMP | Make Connection | LS8-P1/MS4/LS8-P2/MS4 OCOS(P2) |
| D4 | SMP | DMP | COS Data | LS8/#,MS4/COS BYTE |
| D5 | SMP | DMP | Call from ATT. | Same as Std. Call & Vector |
| D6 | SMP | DMP | Specific ATT. | LS8(P1)/MS4/LS8(A)/ MS4/OCOS |
| D7 | SMP | DMP | Conference | LS8/MS4/LO CONF/HI CONF/ ACCOS |
| D8 | SMP | DMP | Group Busy | LS8(P1)/MS4/TCOS(P1)/ LOG/T-SFLAG, HIG/ P1-TCOS |

COMMANDS RECEIVED BY THE SMP

| Ref. Code | Rcvr. | Sender | Command Description | Command Message Format Byte Sequence |
|---|---|---|---|---|
| A2 | SMP | LMP | Line Origination | LS8/MS4 |
| A3 | SMP | LMP | Line Flash | LS8/MS4 |
| A4 | SMP | LMP | Line Disconnect | LS8/MS4 |
| A8 | SMP | TMP | Incoming Trunk | LS8/MS4 |
| A9 | SMP | TMP | Trunk Disconnect | LS8/MS4 |
| AA | SMP | TMP | P2 Answer on O.G. Trunk | LS8/MS4 |
| AB | SMP | TMP | Stop Dial | LS8/MS4 |
| AC | SMP | TMP | Allow Dial | LS8/MS4 |
| AD | SMP | TMP | Trunk Flash | LS8/MS4 |
| AE | SMP | TMP | Seize Fail | LS8/MS4 |
| B0 | SMP | RMP | Suffix Digit for GRP | Register #/Digit |
| B1 | SMP | RMP | Register Done | Register # |
| B2 | SMP | RMP | Suffix Digit | Register #/Digit |
| B3 | SMP | RMP | Register Time Out | Register # |
| B4 | SMP | RMP | Apparent Disconnect | Register # |
| B5 | SMP | RMP | Flash In-Register | Register # |
| B6 | SMP | RMP | Audible Tone Cycle | Cycle # |
| B8 | SMP | CMP | Park1 | LS8 (P) MS4/LS8 (A)/MS |
| B9 | SMP | CMP | Talk1 | LS8 (P) MS4/LS8 (A)/MS |

Table 3 (Continued)

| | | | | |
|---|---|---|---|---|
| BA | SMP | CMP | Park2 | LS8 (P1)/MS4/LS8 (P2)/MS4/LS8(A)/MS4 |
| BB | SMP | CMP | Talk2 | LS8 (P1)/MS4/LS8 (P2)/MS4/LS8(A)/MS4/V |
| BC | SMP | CMP | Release | LS8(P1)/MS4/LS8(P2)/MS |
| BD | SMP | CMP | Disconnect | LS8(P)/MS4/LS8(A)/MS4 |
| BE | SMP | CMP | Start Dial | LS8(A)/MS4/V |
| BF | SMP | CMP | Conference | LS8(P)/MS4/LS8(A)/MS4/V |
| C0 | SMP | CMP | Override Disconnect | LS8(P2)/MS4/LS8(A)/MS4 |
| C1 | SMP | CMP | Override Talk | LS8(P2)/MS4/LS8(A)/MS4 |
| C2 | SMP | CMP | Unserviced | LS8/MS4 |
| C3 | SMP | CMP | Chain | LS8/MS4 |
| C4 | SMP | CMP | Wake-Up Ring | LS8/MS4 |
| C8 | SMP | DMP | Originating COS Data | LS8/TRCOS,MS4/OCOS |
| C9 | SMP | DMP | Standard Call | LS8(P1)/MS4/LS8(P2)/MS4/(P1) TCOS/(P2)TCOS/(P2)OCOS |
| CA | SMP | DMP | Access Code Dialed | LS8/MS4/SAC/AC COS, ARG1/ARG2 |
| CB | SMP | DMP | Call Pickup | LS8/MS4/MORE-TO-COME FLAG,QF/LS8/MS4/LS8/MS4/.../LS8/MS4 |
| CC | SMP | DMP | Speed Call | LS8(P1)/MS4/LS8(T)/MS4 QF/D2,D1/D4,D5/... |
| CD | SMP | DMP | Action Successful | LS8/MS4 |
| CE | SMP | DMP | Action Fails | LS8/MS4 |
| CF | SMP | DMP | Call From Group Queue | LS8(P1)/MS4/LS8(P2)/GS MS4/P1TCOS/P2TCOS/P2OCOS |
| D0 | SMP | DMP | Preset Conf. | LS8(P1/MS4/LS8(CONF)/OF,MS4/QF/LS8/MS4/... |
| D1 | SMP | DMP | Route to Attendant | LS8/MS4/TYPE |
| D2 | SMP | DMP | Make Connection | LS8-P1/MS4/LS8-P2/MS4/OCOS(P2) |
| D4 | SMP | DMP | COS Data | LS8/#,MS4/COS BYTE |
| D5 | SMP | DMP | Call from ATT. | Same as Std. Call & Vector |
| D6 | SMP | DMP | Specific ATT. | LS8(P1)/MS4/LS8(A)/MS4 OCOS |
| D7 | SMP | DMP | Camp-On from ATT. | Same as Std. Call & Vector |
| D8 | SMP | DMP | Group Busy | LS8(P1)/MS4/TCOS(P1)/LOG/T-S FLAG,HIG/ |

COMMANDS SENT BY THE SMP

| Ref. Code | Rcvr. | Sender | Command Description | Command Message Format Byte Sequence |
|---|---|---|---|---|
| 02 | LMP | SMP | Terminate Ring | LS8/MS4 |
| 03 | LMP | SMP | Send Ring | LS8/as Code ; MS4 |
| 04 | LMP | SMP | Disable Flash | LS8/MS4 |
| 05 | LMP | SMP | Enable Flash | LS8/as Code ; MS4 |
| 06 | LMP | SMP | Set Attenuator | LS8/as Code ; MS4 |
| 12 | TMP | SMP | Seize Trunk | LS8/as Code ; MS4 |
| 13 | TMP | SMP | Request Trunk Disc. | LS8/MS4 |
| 14 | TMP | SMP | Dialing Complete | LS8/MS4 |
| 15 | TMP | SMP | P2 Answer | LS8/as Code ; MS4 |
| 16 | TMP | SMP | Disconnect 9th Bit | LS8/MS4 |
| 17 | TMP | SMP | Register Assigned | LS8/MS4 |
| 18 | TMP | SMP | Register Released | LS8/as Code; MS4 |
| 19 | TMP | SMP | Recognize Flash | LS8/as Code; MS4 |
| 1A | TMP | SMP | Disregard Flash | LS8/MS4 |
| 1B | TMP | SMP | Set Attenuator | LS8/as Code; MS4 |
| 22 | RMP | SMP | Originating Station | R/LS8/MS4 |
| 23 | RMP | SMP | Orig. D.I.D. Trunk | R/LS8/MS4 |
| 24 | RMP | SMP | Flash (Split) Station | R/LS8/MS4 |
| 25 | RMP | SMP | Set Call Forwarding | R/LS8/MS4 |
| 26 | RMP | SMP | Set Secretary Hunt | R/LS8/MS4 |
| 27 | RMP | SMP | Set P.C.D. | R/LS8/MS4 |

Table 3 (Continued)

| | | | | |
|---|---|---|---|---|
| 28 | RMP | SMP | Set Remote Call Fwd. | R/LS8/MS4 |
| 29 | RMP | SMP | Orig. Sta. C. F. Mode | R/LS8/MS4 |
| 2A | RMP | SMP | Cancel PCD | R/LS8/MS4 |
| 2B | RMP | SMP | Set RM Outdial Restrict | R/LS8/MS4 |
| 2C | RMP | SMP | Set Flexible N.S. | R/LS8(A)/MS4 |
| 2D | RMP | SMP | Set Speed Dialing | R/LS8/CG, MS4 |
| 2E | RMP | SMP | Set Wake-Up Time | R/LS8(A)/MS4 |
| 2F | RMP | SMP | Dial By NSN | R/LS8/MS4 |
| 30 | RMP | SMP | Receive Suffix Digit | R |
| 31 | RMP | SMP | Send Digits Given | R/QF/D1,D2/D3,D4/.../DN |
| 32 | RMP | SMP | Rcv. and Send Digits | R |
| 33 | RMP | SMP | Toll Restrict | R/LS8 (TRUNK)/MS4 |
| 34 | RMP | SMP | Rcv.,Send,and Restrict | R/LS8 (TRUNK)/MS4 |
| 35 | RMP | SMP | Register Abort | R |
| 36 | RMP | SMP | Stop Dial | R |
| 37 | RMP | SMP | Allow Dial | R |
| 38 | RMP | SMP | Rcv. Suffix Digit/GRP | R |
| 39 | RMP | SMP | Cancel Remote C.F. | R/LS8/MS4 |
| 3A | RMP | SMP | Rcv. & Send Code Call | R/CCF,- |
| 42 | CMP | SMP | Attendant Call | LS8/MS4/TYPE |
| 43 | CMP | SMP | Attendant Recall | LS8/MS4/TYPE |
| 46 | CMP | SMP | Disconnect in Queue | LS8/MS4 |
| 47 | CMP | SMP | Disconnect in Loop | LS8(P) MS4/LS8(A)/MS4 |
| 48 | CMP | SMP | P2 Answer | LS8(P2)/MS4/LS8(A)/MS4 |
| 49 | CMP | SMP | In-Loop Recall | LS8(P)/MS4/LS8(A)/MS4 |
| 4A | CMP | SMP | Affirm (Conn. Compl.) | LS8 (P)/MS4/V |
| 4B | CMP | SMP | Disaffirm (Conn. Fail) | LS8 (P)/MS4/V/RSN |
| 4C | CMP | SMP | Wake-Up Fail | LS8/MS4 |
| 4D | CMP | SMP | TAAS Request | LS8/MS/TAAS COS |
| 4E | CMP | SMP | Split to Attendant | LS8(PS)/MS4/LS8(PP)/MS4 |
| 4F | CMP | SMP | Call to Specific Attn. | LS8 (P)/MS4/LS8(A)/MS4 |
| 50 | CMP | SMP | Conference Net Status | BUSY/IDLE-FLAG |
| 62 | DMP | SMP | Request Orig. COS | LS8/MS4 |
| 63 | DMP | SMP | Request Term. COS | LS8/MS4 |
| 64 | DMP | SMP | AIOD Send | LS8/MS4 |
| 65 | DMP | SMP | Group Camp-On | LS8/MS4/LOG/HIG |
| 69 | DMP | SMP | Hot Line | LS8/MS4 |
| 6A | DMP | SMP | Traffic Usage Data | LS8/MS4/ET |
| 6E | DMP | SMP | Busy | LS8/MS4 ALSO TO BMP |
| 6F | DMP | SMP | Idle | LS8/MS4 ALSO TO BMP |

The basic operational functions of each of the microprocessors 130, 140, 150, 160, 170, 180 and 190 of the control complex 55 are given in outlined itemized format below:

STATE MICROPROCESSOR (SMP) FUNCTIONS

1. Maintain a record of the state of every NSN in system
   Current situation
   NSN to which connected
   Time of connection
2. Determine, from the current state, a command, and COS information, what the next state of NSN should be
3. Issue commands and controls appurtenant to new states
   Start and stop ring to LMP
   Seize and disconnect to TMP
   Attenuation information to TMP and LMP
   Flash and signalling control to TMP and LMP
   Connect for—(function) to RMP
   Send number to RMP
   Start/stop sending to RMP
   Call to attendant to CMP
   Attendant status and confirmation updates to CMP
   Group CAMP-ON request to DMP
   Class of service requests to DMP
   Network connection control
4. Maintain table of available registers and make assignments
5. Maintain queue of CAMP-ONS to specific NSN's
6. Control conference networks
7. Perform short timing actions such as tone bursts
8. Collect PEG counts and elapsed times for traffic and usage counters
9. Collect and record pertinent call events for detailed call analysis
10. Perform continual audit of NSN states, their related connections, and their elapsed time

LINE MICROPROCESSOR (LMP) FUNCTIONS

1. Scan lines (up to 2400)
   A. Detect new OFF-HOOK
   B. Detect new ON-HOOK
   C. Selectively detect flash (0.5-1.5 second ON-HOOK)
2. Number translations
   A. Equipment number (EA) to network slot number (NSN)
   B. NSN to EA
3. Inform SMP of valid line action
4. Ring or cancel ringing of a line as directed by SMP
5. Set attenuation of a line as directed by SMP

REGISTER MICROPROCESSOR (RMP) FUNCTIONS

1. Collect digits as requested by SMP (64 registers, rotary or DTMF)
   A. Normal dialing—quantity by first digit translation
   B. Feature programming dialing (fixed & variable lengths)
   C. Toll restriction
   D. Suffix digits (singular)
   E. Outside dialing—quantity determined by alogrithim in RMP
2. Deliver and cutoff appropriate dial tone
3. Detect end-of-dialing by caller hesitation
4. Detect flash and reset register of flashing party
5. Cancel register after:
   A. Excessive inter-digit time (computed variable)
   B. Abort command from SMP
   C. Normal completion of dialing
6. Deliver dialed number of DMP (SMP for suffix digit)
7. Send pulsed digits (requested by SMP)
   A. Repeating digits collected
   B. Number given
   C. Hold and allow sending per SMP request
8. Digit collection, sending, and toll restriction may be in conjunction with each other

TRUNK MICROPROCESSOR (TMP) FUNCTIONS

1. Scan trunks
   A. Detect distant end seizure
   B. Detect distant end release
   C. Selectively detect flash
2. Number translations
   A. EA to NSN
   B. NSN to EA
3. Inform SMP of valid trunk action
4. Seize or release trunks as directed by SMP
5. Set attenuation of trunks as directed by SMP
6. Permit/deny 9th bit signalling as directed by SMP
7. Execution of "Handshake" protocol with distant trunk circuit
8. Translation of signalling logic into uniform format
9. Standardize interface of all trunk types to a single, uniform format to/from the control complex

DATA BASE MICROPROCESSOR (DMP) FUNCTIONS

1. Maintain class of service and characteristics information for each device (line, trunk, etc.) connected to the system
2. Maintain and utilize directory number (DM) to network slot number (NSN) and NSN to DN translations
3. Maintain and utilize directory number to standard access code translations
4. Maintain first digit to quantity-of-digits-expected table
5. Maintain and utilize tables of customer groups, trunk groups, line hunt groups, and call pick-up groups
6. Maintain and utilize alternate number translation
7. Maintain and utilize toll restrict tables
8. Maintain miscellaneous system, customer group, and other parameters
9. Maintain traffic and usage peg counters
10. Deliver COS information and translated numbers to CMP and SMP as required
11. Perform group hunts and alternate address conversions prior to translations when required
12. Maintain a busy/idle map to facilitate group hunts
13. Maintain speed dialing information
14. Maintain and utilize group CAMP-ON queues
15. Drive AIOD equipment (automatic identification outward dial)
16. Drive OND equipment (origination number display)
17. Output traffic and usage information to hard copy terminal
18. Perform above functions for each of eight customer groups

CONSOLE MICROPROCESSOR (CMP) FUNCTIONS

1. Scan attendant consoles for button activity
2. Maintain a record of
   A. The state of each console
   B. The state of each loop
3. Receive new call assignments from SMP and place in attendant queue or priority queue
4. Assign calls to available attendant
5. Alter console and loop states per console button presses and SMP requests
6. Control console lamps per console and loop states
7. Display numeric and alpha information on console per state and IPB command information
8. Notify SMP and receive affirmation from SMP of state changes
9. Control flexible and trunk answer any station night service
10. Control wake-up calls in hotel/motel environment
11. Perform above function for 1 to 8 customer groups

BUSY LAMP FIELD MICROPROCESSOR (BMP) FUNCTIONS

1. Maintain a busy/idle map of all stations in the system
2. For each console, drive a busy/idle display for a group of 100 stations selected by the attendant
3. Read direct station select switch closures, translate into a directory number, and send to DMP The microprocessor control complex 55 offers a wide range of service features that can be provided regardless of switching system size. Service features are easily added at any time since the majority of features are software implemented and are contained in a single software package. An exemplary list of the service features as provided by the control complex 55 are categorized in Table 4 below under ten feature groups as are thought to be commonly understood in the pertinent art.

TABLE 4

Microprocessor Service Features

Station Features
Station-to-Station Calling
Station-to-Trunk Calling (DOD)
Station Controlled Transfer (all calls to a station or trunk)
Consultation Hold (all calls to a station or trunk)
Add-On Conference
Attendant Recall
Call Hold
Dial Access to Attendant
Call Pickup
Call Waiting
Station Camp-On (Ring Back)
Executive Camp-On

TABLE 4-continued
Microprocessor Service Features

Executive Override
Call Forwarding (all incoming Calls)
Call Forwarding to Speed Call Number
Secretarial Hunt
Don't Answer - Call Forwarding (DID)
Busy Station - Call Forwarding (DID)
Manual Line
Executive Line
"Hot" Line-Direct to Trunk
"Hot" Line-Direct to Station
"Hot" Line-With Dialing into CO"
Outgoing Trunk Queuing

Attendant Features
Cordless Console (switched loop)
Six Loops
Busy Lamp Field (optional)
DSS (included with BLF)
Trunk Group Busy Lamps
Switched Loop Operation
Control of Trunk Group Access
Alphanumeric Display
Station or Trunk Number
Identification of Call Type
Busy Lamp Field and Direct Station Select (BLF/DSS)
Automatic and 2-way Splitting
Camp On, with Indication
Busy Verification
Automatic Attendant Recall
"Wake-Up" Service
"Do-Not-Disturb" Service
Third Party Call Forwarding
Origination and Completion of All Call Types
Music on Hold and Camp-On
Chain Calling
Attendant Through Dialing
Attendant Delayed Calls
Attendant Keysender Overlap
Priority Queue to Attendant
Attendant Call-Through Test on Trunks
Outgoing Trunk Queue via Attendant
Attendant Transfer
Consoleless Operation

Night Service Features
Trunk Answer any Station (Universal Answer)
Flexible Night Service
Combined Night Service

Group Hunt Features
Station Group Hunt
Master Number Activation
Unbalanced Distribution
Balance Distribution
Last Resort Number
Secretarial Hunt

Conference Features
Attendant Controlled
Meet-Me
Station Controlled (progressive)
Preset

Special Service Features
Paging Access
Dictation Access
Code Call
DTMF Signaling (to Rotary Dial Pulse Conversion)
Speed Calling (Abbreviated Dialing)
ALOD
Call Recording and Storage (all calls)

TABLE 4-continued
Microprocessor Service Features

Hotel/Motel Features
Station-Room Number Correlation
Message Waiting
Message Registration
Station Dialing Restriction
Single Digit Service
LD Trunks
Hotel/Motel Identification over CO Trunks
Toll Diversion
Wake-Up Service
Do-Not-Disturb Service
Room-to-Room Dialing Restriction
Manual Lines
Originating Number Display
Room Number Display ("0" Calls)
Room Status

System Features
Customer Groups
Automatic Call Distribution
Whole System
One or More Customer Groups
Main-Satellite Operation
Centralized Attendant Service
Camp-On Busy
Station Transfer
Traffic Measuring and Storage
On-Site Access
Remote Access with Security
Remote Access to PBX Service
Flexible Route Selection
Trunk Group Overflow
Alternate Routing
Conversation Timing
Intercept Facilities
Attendant
Tone
Optional Recording
Ringing Drop of Call
Immediate Ringback Tone
100 Percent Line Lockout
No Dial Alarm

Trunks
Central-Office Trunks (ground-start or loop-start)
Ringdown Tie Trunks
Dial Repeating Tie Trunks (Loop or E&M Signaling)
Tandem trunks
DID Trunks (Listed Directory Number)
CCSA Trunks (Common Control Switching Arrangement)
Attendant Completing Trunks (to Satellite PBX)
Digital Trunks (interface with T1 line)
Outgoing Trunk Queueing (station and attendant)

Station Restrictions
Station-to-Trunk (Access Denial)
Trunk-to-Station (Station-to-Station Only)
Origination (Termination Only)
Termination (Origination Only)
Toll Denial and Diversion (battery reversal or digit monitoring)
Patient Call Diversion (incoming diversion by control station)

We claim as our invention:

1. Microprocessor control means in a common processor control complex of a telephone switching exchange for performing the functions thereof comprising a plurality of microprocessor control units each including a microprocessor, individual program memory means associated with the respective microprocessors for causing each microprocessor to perform portions of said functions of the telephone switching exchange, the programs in the respective memory means differing one from the other and constructed so that all of the functions of the switching system are sectioned along functional call processing lines and the functions so sectioned are assigned to respective ones of the microprocessor control units for performance thereby, means for transferring command messages between selected pairs of said microprocessors asynchronously of at least one of the microprocessors in a pair for coordinating of the performance of the sectioned functions, the means for transferring comprising dedicated communication paths interposed between and dedicated solely to communication between said pairs of microprocessors, and means for providing each microprocessor in a pair individual access to the communication path associated with that pair.

2. The microprocessor control means as set forth in claim 1 wherein said dedicated communication paths include temporary storage means for accepting commands from one microprocessor in a pair and subsequently transferring said accepted commands to the other microprocessor in said pair.

3. The microprocessor control means as set forth in claim 2 wherein said microprocessors have data lines and address lines, said communication paths having means for connection to the data lines and address lines of both microprocessors in the associated pair, and means for decoding signals on at least some of said address lines for selectively addressing the storage means.

4. The microprocessor control means as set forth in claim 3 wherein said communication paths include control means for selecting the address lines of one or the other of the microprocessors in a pair to address the storage means, and means for switching the control means between the address lines of sending and receiving microprocessors in a pair for communicating commands therebetween.

5. The microprocessor control means as set forth in claim 1 wherein the means for transferring comprise interprocessor buffers interposed between said pairs of microprocessors, each interprocessor buffer having temporary storage means separately addressable by a sending microprocessor in a pair for accepting command messages therefrom and by a receiving microprocessor in the pair for transferring the accepted command messages thereto.

6. The microprocessor control means as set forth in claim 5 wherein said plurality of microprocessors includes a first microprocessor for controlling lines connected to said switching exchange, a state microprocessor for selectively completing connections between said lines in a network of said switching exchange, a register microprocessor for controlling registers of said switching exchange, and a data base microprocessor for performing number translations for said switching exchange.

7. The microprocessor control means as set forth in claim 6 wherein respective interprocessor buffers are interposed between the state and each of the first, register and data base microprocessors, and a further interprocessor buffer is interposed between the register and data base microprocessors.

8. The microprocessor control means as set forth in claim 5 wherein the plurality of microprocessors include line, trunk, register and console microprocessors for performing the functions of said switching exchange relating to lines, trunks, registers and consoles respectively, a state microprocessor for performing the functions of said switching exchange relating to completion of connections and maintaining a record of current device states, and a data base microprocessor for performing the functions of said switching exchange relating to class of service and number translations.

9. The microprocessor control means as set forth in claim 8 wherein a plurality of said interprocessor buffers are provided for transferring command messages between the state and each of the line, trunk, register, console and data base microprocessors respectively, and between the data base and each of said register and console microprocessors respectively.

10. The microprocessor control means as set forth in claim 5 wherein each microprocessor control unit comprises a primary and a redundant unit, means for maintaining only one of said primary or redundant units on line at any time, means responsive to the detection of a fault for interchanging the on line and off line unit, the primary and redundant units having associated primary and redundant interprocessor buffers for communicating command messages with respective primary and redundant units in the other microprocessor control unit of said pair, and means interconnecting the primary unit with the redundant interprocessor buffer and the redundant unit with the primary interprocessor buffer so that switching a microprocessor between its primary and redundant units does not require a corresponding switch in the other microprocessor of the pair.

11. In a telephone switching system having a plurality of access ports and a network for selectively establishing connections between said access ports, the improvement comprising a control complex including a plurality of programmable microprocessors each programmed to perform a respective portion of the functions of said system, said plurality of microprocessors including a state microprocessor having its own clock for operating asynchronously of the other microprocessors in said complex, an instruction memory programmed to cause said state microprocessor to store the current status of the access ports in said system and to modify said current status in response to command signals from at least one of the microprocessors within said complex, and programmed to send command signals to at least one of the microprocessors within said complex for execution of particular functions of the switching system, said state microprocessor having interface means connected to said network and addressable as memory locations for selectively establishing connections in the network in response to command signals received from at least one of the microprocessors within said complex and respective interprocessor buffer means interposed between the state microprocessor and all microprocessors with which it exchanges command signals and having intermediate storage directly accessible by said state and the last mentioned microprocessors for transfer of said command signals therebetween.

12. In a telephone switching system having a plurality of access ports including a plurality of line circuits for connection to a plurality of telephone lines, each of the line circuits having a sense point for indicating the busy or idle status of the associated line and a control point for controlling ringing of that line, said system having a network for selectively establishing connections between said access ports, the improvement comprising a control complex including a plurality of programmable microprocessors each programmed to perform a respective portion of the functions of said system, the respective programs being different one from the other and constructed so that all of the functions of the switching system are sectioned along functional call processing lines and the functions so sectioned are assigned to respective ones of the programmed microprocessors for performance thereby, said plurality of microprocessors including a line microprocessor for performing the sectioned functions related to servicing the line circuits, the line microprocessor having its own clock for operation asynchronously of the other microprocessors in said complex, said line microprocessor having circuit connections to said sense and control points addressable as memory locations, said line microprocessor having an instruction memory programmed to cause said line microprocessor to scan said sense points to detect line state changes and to send command signals to at least one of the microprocessors within said complex informing said last mentioned microprocessor of said state changes, and programmed to execute command signals from at least one of the microprocessors within said complex for writing data into said control points in response thereto and interprocessor buffer means interposed between the line microprocessor and all microprocessors with which it exchanges command signals, the interprocessor buffer means having intermediate storage dedicated solely to transfer of command signals and directly accessible by said line and said last mentioned microprocessors for transfer of said command signals therebetween.

13. In a telephone switching system having a plurality of access ports including trunk circuits for connection to associated telephone trunks, each trunk circuit having a plurality of sense points for indicating the state of the associated trunk and a plurality of control points for controlling the condition of said trunk, said system having a network for selectively establishing connections between said access ports, the improvement comprising a control complex including a plurality of programmable microprocessors each programmed to perform respective portions of the functions of said system, the respective programs being different one from the other and constructed so that all of the functions of the switching system are sectioned along functional call processing lines and the functions so sectioned are assigned to respective ones of the programmed microprocessors, said plurality of microprocessors including a trunk microprocessor for performing the sectioned functions related to servicing the trunk circuits, the trunk microprocessor having its own clock for operation asynchronously of the other microprocessors in said complex, said trunk microprocessor having circuit connections to said sense points and control points addressable as memory locations, said trunk microprocessor having an instruction memory programmed to cause said trunk microprocessor to scan said sense points for detecting trunk state changes and communicating command signals to at least one of the microprocessors within said control complex informing said last mentioned microprocessor of said state changes, and programmed to execute command signals from said at least one of the microprocessors within said complex by writing data into selected ones of said control points, and interprocessor buffer means interposed between the trunk microprocessor and all microprocessors with which it exchanges command signals, the interprocessor buffer means having intermediate storage dedicated solely to transfer of command signals directly accessible by said trunk and said last mentioned microprocessors for transfer of said command signals therebetween.

14. In a telephone switching system having a plurality of access ports including registers for receiving dialed number information, and a network for selectively establishing connections between said access ports, the improvement comprising a control complex including a plurality of programmable microprocessors each programmed to perform respective portions of the functions of said system, said plurality of microprocessors including a register microprocessor having its own clock for operation asynchronously of the other microprocessors in said complex, said register microprocessor having circuit connections to said registers addressable as memory locations, said register microprocessor having an instruction memory programmed to cause said register microprocessor to execute command signals received from at least one of the microprocessors within said complex by receiving and analyzing dialed number information from said registers, and programmed to send command signals to at least one of the microprocessors within said complex informing said last mentioned microprocessor of said analyzed information and interprocessor buffer means interposed between the register microprocessor and all microprocessors with which it exchanges command signals and having intermediate storage directly accessible by said register and said last mentioned microprocessors for transfer of said command signals therebetween.

15. In a telephone switching system having a plurality of access ports, registers for receiving dialed number information, and a network for selectively establishing connections between said access ports, the improvement comprising a control complex including a plurality of programmable microprocessors each programmed to perform respective portions of the functions of said system, said plurality of microprocessors including a data base microprocessor having its own clock for operation asynchronously of the other microprocessors in said complex, said data base microprocessor having a programmed memory storing class of service and number translations for the access ports in the system, said data base microprocessor having an instruction memory programmed to execute command signals from at least one of the microprocessors within said complex requesting class of service information by sending a command signal to at least one of the microprocessors within said complex including the requested class of service information, and programmed to execute command signals from at least one of the microprocessors within said complex requesting dialed number translations by sending command signals to at least one of the microprocessors within said complex including the requested translation, and interprocessor buffer means interposed between the data base microprocessor and all microprocessors with which it exchanges command signals and having intermediate storage directly accessible by said data base and said last mentioned microprocessors for transfer of said command signals therebetween.

16. In a telephone switching system having a plurality of access ports, a network for selectively establishing connections between said access ports, and attendant console means, the improvement comprising a control complex including a plurality of programmable microprocessors each programmed to perform respective portions of the functions of said system, said plurality of microprocessors including a console microprocessor having its own clock for operation asynchronously of the other microprocessors in said complex, the console microprocessor having circuit connections to said console means for receiving messages therefrom and sending messages thereto, said console microprocessor having an instruction memory programmed to cause said console microprocessor to analyze messages received from said console means and send command signals to at least one of the microprocessors within said complex to inform said last mentioned microprocessor of attendant actions, and programmed to execute command signals from at least one of the microprocessors within said complex to control said console means in response thereto, and interprocessor buffer means interposed between the console microprocessor and all microprocessors with which it exchanges command signals and having intermediate storage directly accessible by said console and said last mentioned microprocessors for transfer of said command signals therebetween.

17. A microprocessor control complex in a telephone switching exchange for controlling the functions thereof comprising a plurality of microprocessor control units each having a microprocessor, memory means associated therewith, and interprocessor buffer means; the memory means of each control unit being programmed to cause the associated microprocessor to perform a portion of the functions of the telephone switching exchange, the programs in the respective memory means differing one from the other and constructed so that all of the functions of the switching system are sectioned along functional call processing lines and the functions so sectioned are assigned to respective ones of the microprocessor control units, each interprocessor buffer means comprising a dedicated communications path interposed between and dedicated solely to communication of command messages between the associated microprocessor and another of said microprocessors, said interprocessor buffer means having storage means for command messages communicated on the dedicated path established thereby, and means for providing separate access to said storage means by the respective microprocessors communicating via said path so that said microprocessors operate asynchronously to perform the functions of said telephone switching exchange.

18. The microprocessor control complex as set forth in claim 17 further including a second plurality of microprocessor control units with individual ones of said second plurality being duplicates of individual ones of said plurality of microprocessor control units, means for maintaining one of each duplicated pair of microprocessor control units on line and the other off line, means for monitoring the operability of each of the on line control units for detecting malfunctions thereof, and means responsive to the detection of a malfunction for switching the on line unit off line and the off line unit on line, whereby each of the respective microprocessor control units is individually and automatically replaceable to maintain system operation.

19. The microprocessor control complex as set forth in claim 18 wherein the microprocessor of each of the duplicated microprocessor control units is connected to its associated interprocessor buffer, and including means cross-connecting the respective microprocessors of a pair with the interprocessor buffer of the other, whereby said dedicated communication path connects both microprocessors in a duplicated microprocessor pair so that the on line unit of each pair can communicate via said path.

20. In a microprocessor controlled switching exchange, the improvement comprising a plurality of asynchronously operating microprocessor control units each having a microprocessor, individual memory means for each microprocessor programmed to distribute the functions of the switching exchange among said control units, the programs in the respective memory means differing one from the other and constructed so that all of the functions of the switching system are sectioned along functional call processing lines and the functions so sectioned are assigned to respective ones of the microprocessor control units, means for intercommunicating between pairs of the control units to coordinate performance of the functions of the switching exchange, and said means for intercommunicating comprising interprocessor buffer means connected between and dedicated solely to communication between pairs of said control units for providing dedicated communication paths between said pairs of control units.

21. The improvement as set forth in claim 20 wherein each interprocessor buffer means includes send and receive buffer sections, said send section being connected to the associated microprocessor for receiving command messages sent therefrom, said receive section being connected to the other microprocessor of said pair for providing said command messages for receipt thereby, and means transferring control between said send section and said receive section for communicating command messages between the respective microprocessors.

22. The improvement as set forth in claim 21 wherein the interprocessor buffers of the respective microprocessor control units in a pair provide bidirectional communication between the microprocessors in said pair.

23. The improvement as set forth in claim 21 wherein the microprocessor control units comprise, a line unit for control of line circuits, a trunk unit for control of trunk circuits, a register unit for processing dialing information, a data base unit for performing dialed number translations and a state unit for maintaining a current status record and issuing commands to the others of said units.

24. Microprocessor control means in a telephone switching system having a switching network supervised by a network controller and providing sense and control points for deriving and terminating information respectively to said switching system, said microprocessor control means comprising first microprocessor means having first memory means programmed to constitute said first microprocessor means as means for storing current states-of-call for all lines, trunks and registers of the switching system and providing next states-of-call therefor, second microprocessor means having second memory means programmed to constitute said second microprocessing means as means for monitoring said sense points and writing data into said control points in said switching system, third microprocessor means having third memory means programmed to constitute said third microprocessor means as means for controlling a plurality of registers to accept and process dialing information, fourth microprocessor means having fourth memory means programmed to constitute said fourth microprocessor means as means for performing dialed number translations, and dedicated communications channels interposed between predetermined pairs of said microprocessor means for communicating command messages therebetween to coordinate the tasks performed by the respective microprocessor means.

25. Microprocessor control means in a telephone switching system having a switching network supervised by a network controller and providing sense and control points for deriving and terminating information respectively to said switching system, said microprocessor control means comprising first microprocessor means having first memory means programmed to constitute said first microprocessor means as means for monitoring said sense points, writing data into said control points and storing the the current status for all lines, trunks and registers of the switching system and providing next states-of-call therfor, second microprocessor means having second memory means programmed to constitute said second microprocessor means as means for controlling a plurality of registers to accept and process dialing information, third microprocessor means having third memory means programmed to constitute said third microprocessor means as means for performing dialed number translations, and a plurality of dedicated communications channels, respective ones of which are interposed between the first and second, the first and third, and the second and third microprocessor means for communicating command messages thereby to coordinate the tasks performed by the respective microprocessor means.

26. Microprocessor control means in a telephone switching system having a switching network supervised by a network controller and providing sense and control points for deriving and terminating information to said switching system, said microprocessor control means comprising a state microprocessor having memory means programmed to constitute said state microprocessor as means responsive to received command signals for storing current states for all lines, trunks and registers of the switching system, the memory means of the state microprocessor being programmed to send command signals providing next states for selected lines, trunks or registers and to cause said network controller to establish connections in said switching network, a line microprocessor having memory means programmed to constitute said line microprocessor as means scanning sense points of a plurality of line circuits in the switching system to detect line originations and terminations and to send command signals to said state microprocessor in response thereto, the memory means of the line microprocessor being programmed to cause that microprocessor to execute command signals from the state microprocessor by writing data into line circuit control points, a trunk microprocessor having memory means programmed to constitute said trunk microprocessor as means for scanning sense points of a plurality of trunk circuits to detect trunk circuit state transitions and to send command signals to the state microprocessor in response thereto, the memory means of the trunk microprocessor being programmed to cause the microprocessor to execute command signals from the state microprocessor by writing trunk circuit control points, a register microprocessor having memory means programmed to constitute said register microprocessor as means for controlling a plurality of registers in response to command signals from the state microprocessor to collect and interpret dialed information and to send command signals with said information, a data base microprocessor having memory means programmed to constitute said data base microprocessor as means storing data base tables including dialed number translation tables for responding to command messages from the register microprocessor with said dialed number information to perform a dialed number translation and send a command message to said state microprocessor in response thereto, a console microprocessor having memory means programmed to constitute said console microprocessor as means for controlling a plurality of multi-message attendant consoles in said switching system for monitoring of selected messages to communicate command signals to the state microprocessor and for activating selected other messages in response to command signals from the state microprocessor, said command signals between processors being communicated on dedicated channels coupling sending and receiving processors.

27. In a system serving a plurality of telephone lines, the combination comprising
 (a) a digital switching network,
 (b) a plurality of microprocessor units each having
  (i) a clock,
  (ii) an instruction memory,
  (iii) a data memory, and
  (iv) at least one interprocessor buffer comprising a dedicated communication path connected to a different one of said microprocessor units and dedicated solely to communication between said microprocessor unit and said different microprocessor unit,
 (c) the instruction memory of each microprocessor unit being physically conditioned to contain a program of instructions to constitute that unit as means for carrying out a portion of the overall control functions of the system, the respective programs of instructions differing one from the other and constructed so that all of the control functions are sectioned along functional call processing lines and the functions so sectioned are assigned to respective ones of the microprocessor units, each unit receiving task signals via an interprocessor buffer from at least one other unit for execution of such tasks and sending other task signals to at least one other unit via another interprocessor buffer,
 (d) a first one of said microprocessor units comprising a state microprocessor unit for performing the sectioned functions related to the network, said state microprocessor unit including means for sending task signals to said digital switching network to cause the latter to put up and take down call connections, and
 (e) a second one of said microprocessor units comprising a line microprocessor unit for performing the sectioned functions related to servicing the lines, the line microprocessor unit including means for selectively reading and writing data into and from sense and control points for the telephone lines and treating signals at such points as data memory signals.

28. The combination set forth in claim 27 further characterized in that said line microprocessor unit's instruction memory is physically conditioned to contain a program of instructions by which said sense points are iteratively scanned and identification of any line in a new off-hook status is represented in resulting task signals sent via an interprocessor buffer to the state microprocessor unit, and said state microprocessor unit's instruction memory is physically conditioned to contain a program of instructions by which it constitutes means for responding to said resulting task signals for supplying to said switching network control signals which establish a connection path between the identified line and an available register.

29. The combination set forth in claim 25 further characterized in that a third one of said microprocessor units comprises a register microprocessor unit, said register unit's instruction memory being physically conditioned to constitute that unit as (i) means for responding to dialed numbers collected by the connected register and (ii) means for sending to a fourth microprocessor unit, via an interprocessor buffer, the dialed number in the form of task signals, the fourth microprocessor unit comprising a data base microprocessor unit.

30. The combination set forth in claim 29 further characterized in that said data base microprocessor unit's instruction memory is physically conditioned to contain a program of instructions by which that unit constitutes (i) means for translating the dialed number task signals into a set of signals identifying the line assigned to the dialed number, and (ii) means for sending such identifying signals to said state unit as task signals, and said state microprocessor unit's instruction memory is physically conditioned to contain a program of instructions by which that unit constitutes means, responsive to said identifying signals sent to it by said data base unit for supplying to said line unit task signals commanding ringing of the identified line.

31. The combination set forth in claim 30 further characterized in that said line microprocessor unit's instruction memory is physically conditioned to contain a program which constitutes that unit as a means responsive to received task signals commanding ringing of an identified line for writing a signal to a control point corresponding to such line, said system having line interface means responsive to a written signal at the control point of any given line for supplying a ringing signal to such line.

32. The combination set forth in claim 31 further characterized in that said line microprocessor unit's instruction memory is physically conditioned to constitute that unit as a means responsive to an off-hook status detected at the scanned sense point of a previously ringing line for sending to said state microprocessor task signals identifying that line as a new off hook line.

33. The combination set forth in claim 32 further characterized in that said state microprocessor unit's instruction memory is physically conditioned with a program to constitute that unit as a means, responsive to received task signals identifying a new off hook line for designating that line an answering line if that line were previously ringing, and for supplying to said network task signals which cause the latter to put up a connection between the calling line and the answering line.

34. The combination set forth in claim 33 further characterized in that said line microprocessor unit's instruction memory is physically conditioned by a program to constitute that unit as a means, responsive to a new on-hook status detected at a sense point of a connected line, for transmitting to said state unit task signals commanding disconnection of the line corresponding to that sense point, and said state microprocessor unit's instruction memory is physically conditioned by a program to constitute that unit as means, responsive to disconnect command task signals from said line unit, for sending to said network task signals which cause the latter to take down the connection in which said corresponding line was a part.

35. In a system serving a plurality of telephone lines, the combination comprising
  (a) a digital switching network,
  (b) a plurality of microprocessor units each having
    (i) a clock,
    (ii) an instruction memory,
    (iii) a data memory, and
    (iv) a central processor unit CPU,
  (b') the clocks of said plural units running continuously and asynchronously in relation to one another,
  (c) a plurality of interprocessor buffers each interconnecting one of said units to another of said units and dedicated solely to communication between the interconnected units, said buffer having a first set of bit terminals connected to form readable words of data memory for the one unit and a second set of bit terminals connected to form writable words of data memory for the other unit,
  (d) each of said microprocessor units having its instruction memory physically conditioned by a program to constitute means for processing signals to carry out different respective portions of the control functions associated with said telephone lines, the programs of the respective microprocessor units differing one from the other and constructed so that the control functions are sectioned along functional call processing lines and the functions so sectioned are assigned to respective ones of the microprocessor units,
  (d1) the program for each of said units further constituting that unit as a means for scanning the readable words of data memory in its associated buffer to take in any task signals there present, means responsive to task signals taken in for performing predetermined operations to produce resultant signals, and means for sending as task signals to the writable words of its associated buffer said resultant signals when space exists in those writable words,
  (e) at least a first of said microprocessor units having connections to sense points and control points associated with the respective telephone lines, with its instruction memory programmed (i) to scan said sense points and create task signals in response to a line going newly off-hook or newly on-hook, (ii) to write to said control points signals which will control ringing of a line in response to taken-in task signals designating that such line is to be rung, and
  (f) at least a second of said microprocessor units having writable words of memory data comprising a switching network interface, with its instruction memory programmed to write via said interface paired numbers corresponding to two lines when a connection is to be put up between such lines.

36. The combination set forth in claim 35 further characterized in that said system includes a plurality of registers, and wherein said second microprocessor unit's instruction memory is physically conditioned to make that unit constitute means—responsive to task signals from said first microprocessor unit designating that a given line is newly off-hook—for writing signals to said writable words of data memory comprising the network interface to cause said network to set up a connection from that given line to an available one of said registers.

37. The combination set forth in claim 36 further characterized in that said system includes a dial tone generator, and wherein said second microprocessor unit's instruction memory is physically conditioned to make that unit constitute means—responsive to task signals from said first microprocessor unit designating that a given line is newly off-hook—for writing signals to said writable words of data memory comprising the network interface to cause said network to set up a connection to that given line from said dial tone generator.

38. The combination set forth in claim 36 further characterized in that a third one of said microprocessor units has its instruction memory physically conditioned by a program to form (i) means for receiving from said registers dialed digits collected by each of the latter, and (ii) means for sending as a task signal to another one of said units the dialed digit signals.

39. In a telephone switching system, the improvement comprising a plurality of distributed microprocessors in a distributed microprocessor control complex wherein one of said distributed microprocessors has its own instruction memory addressed only by it, a data memory having a first field addressed only by said one microprocessor as well as second and third fields, the second field including a first interprocessor buffer addressed by said one microprocessor for writing task signals therein, the third field including a second interprocessor buffer addressed by said one microprocessor for reading task signals therefrom, the first interprocessor buffer including means addressed by one other of said distributed microprocessors for reading said task signals written therein as commands for execution by said other microprocessors, and the second interprocessor buffer including means addressed by one other of said distributed microprocessor for writing task signals therein as commands for execution by said one microprocessor.

40. In a telephone switching system for performing call processing, the combination comprising a plurality of microprocessor control units each having a microprocessor and each having its own clock for asynchronous operation, all of the call processing tasks of said system being partitioned along functional call processing lines, each of the microprocessors having an instruction memory programmed to constitute each respective microprocessor as means for performing a partitioned group of the total call processing tasks, the programs in the respective instruction memories differing one from the other and constructed to cause the associated microprocessors to perform the partitioned call processing tasks assigned thereto, at least some of the microprocessors having circuit connections in the switching system addressable as data memory for carrying out the partitioned tasks assigned thereto, the instruction memories of the respective microprocessors being conditioned to use the associated microprocessor to execute task signals from another microprocessor and to produce task signals for execution by another microprocessor, the microprocessors which exchange said task signals being paired for communicating and means communicating said task signals between sending and receiving microprocessors of a pair on dedicated asynchronous communication paths joining said pair and dedicated solely to communicating between said pair, thereby to coordinate the call processing functions distributed among said microprocessors.

41. A method of operating a telephone switching system to perform call processing, comprising the steps of partitioning all of the functions of said switching system along functional call processing lines, conditioning respective program memories of a plurality of microprocessors with different programs to assign one of the partitioned groups of the call processing functions to each microprocessor, driving the microprocessors asynchronously of each other to carry out their respective partitioned functions, operating each microprocessor to produce task signals as input commands for another microprocessor and to respond to commands from another microprocessor so that said microprocessors interact to perform the total function of the switching system, communicating said commands on dedicated asynchronous channels between pairs of microprocessors dedicated solely to communication between said pairs of microprocessors, and temporarily storing said communicated commands in said dedicated asynchronous channels.

42. A method of controlling a telephone switching system having a plurality of lines and trunks, registers for collecting dialed information and a digital switching network for completing connections, said method comprising the steps of servicing all lines with a first control unit, servicing all trunks with a second control unit, servicing all registers with a third control unit, servicing the network with a fourth control unit, driving the control units independently to continuously service the assigned portions of the switching system, producing commands as a result of the servicing operation, communicating the commands between the control units along dedicated asynchronous channels, and executing commands received in a control unit.

43. Microprocessor control means in a common processor control complex of a telephone switching exchange system comprising first microprocessor circuit means providing processing of information through information storage, response and recall, first memory storage means receiving for storage from said microprocessor circuit means first processed information arranged in a first program format and providing upon recall to said microprocessor circuit means second processed information arranged in a second program format predetermined by said first program format, first sender buffer connection means receiving third processed information arranged in a third program format from said microprocessor circuit means and including second memory storage means storing said third processed information for output thereof, and first receiver buffer connection means providing fourth processed information arranged in a fourth program format to said microprocessor circuit means and including third memory storage means storing said fourth processed information for input to said microprocessor circuit means.

44. The microprocessor control means as claimed in claim 43, further including second microprocessor circuit means for providing other processing of information through storage, response and recall, said second microprocessor circuit means being coupled to said first memory storage means for providing said first processed information thereto and receiving said second processed information therefrom, and being coupled to said first sender buffer connection means for providing said third processed information thereto and to said first receiver buffer connection means for receiving said fourth processed information therefrom, whereby said second microprocessor circuit means is redundant to said first microprocessor circuit means.

45. The microprocessor control means as claimed in claim 44 wherein the first microprocessor circuit means comprises master microprocessor circuit means and the second microprocessor circuit means comprises slave microprocessor circuit means.

46. The microprocessor control means as claimed in claim 43 wherein sense and control point means are provided for said switching system for deriving information therefrom and terminating information thereto, respectively, and interface circuit connection means are provided interconnecting said first microprocessor circuit means to said sense and control point means for receiving derived information from the switching system to be processed by said first microprocessor circuit means and for providing other processed information to said control point means for terminating information to said switching system, predetermined numbers of sense and control point pairs comprising said sense and control point means.

47. The microprocessor control means as claimed in claim 46 wherein said interface circuit connection means comprises first level interface connection means connected to said first microprocessor circuit means and a plurality of second level interface connection means, each thereof being connected to a predetermined plurality of said sense and control point pairs, and each of said first level interface connection means being connected to a predetermined plurality of said second level interface connection means.

48. The microprocessor control means as claimed in claim 43 wherein said microprocessor control means further includes a second microprocessor circuit means providing processing of information through information storage, response and recall, fourth memory storage means receiving processed information for storage thereof and being selectively connected to either said first microprocessor circuit means or said second microprocessor circuit means, a second sender buffer connection means receiving other processed information for output thereof and being selectively connected to either said first or said second microprocessor circuit means and a second receiver buffer connection means receiving certain other processed information thereto and being selectively connected to either said first or said second microprocessor circuit means for providing said certain other processed information thereto, said second sender and receiver buffer connection means including fifth and sixth memory storage means, respectively.

49. The microprocessor control means as claimed in claim 48 wherein said first and said fourth memory storage means includes a corresponding plurality of memory store levels, respectively, and first and second bus multiplexer circuit means are provided for connection to said first and said second microprocessor circuit means, respectively, and to said first and said fourth memory storage means, collectively, said first microprocessor circuit means being selectively connected to predetermined corresponding ones of said plurality of memory store levels of said first and said fourth memory storage means through said first bus multiplexer means, and said second microprocessor circuit means being selectively connected to said predetermined corresponding ones of said plurality of memory store levels of said first and said fourth memory storage means through said second bus multiplexer means.

50. The microprocessor control means as claimed in claim 43 wherein said microprocessor control means further includes second microprocessor circuit means providing processing of information through information storage, response and recall, fourth memory storage means receiving for storage from said second microprocessor circuit means fifth processed information arranged in a fifth program format and providing upon recall to said second microprocessor circuit means sixth processed information arranged in a sixth program format predetermined by said fifth program format, second sender buffer connection means having fifth memory storage means receiving from said second microprocessor circuit means said fourth processed information arranged in said fourth program format for connection to said first receiver buffer means, and second receiver buffer connection means having sixth memory storage means providing to said second microprocessor circuit means said third processed information arranged in said third program format connected to said first sender buffer means.

51. The microprocessor control means as claimed in claim 50 including first and second bus extender circuit means connecting said first and second receiver buffer connection means to said first and second microprocessor circuit means respectively.

52. Microprocessor control means for a telephone switching system having switching network means supervised by network controller means and providing sense and control point pair means for deriving and terminating information, respectively, said microprocessor control means comprising first microprocessor means including first memory means and first interprocessor buffer connection means with sender buffer means and receiver buffer means, said first microprocessor means storing current states-of-call for all lines, trunks and registers of the switching system and providing next states-of-call therefor, second microprocessor means including second memory means and second interprocessor buffer connection means with sender buffer means and receiver buffer means, said second microprocessor means being connected to predetermined sense and control point pairs for a plurality of line circuits for monitoring of sense points and writing of data into control points and connectible to said first microprocessor means to send line states thereto and to receive next line states therefrom, third microprocessor means including third memory means and third interprocessor buffer connection means with sender buffer means and receiver buffer means, said third microprocessor means being connected to a plurality of register means for said system for providing sensing, detection, and interpretation of dialed digits received by said register means under instruction of said first microprocessor means and providing outpulsing of accumulated predetermined digits including dialed number information, fourth microprocessor means including fourth memory means and fourth interprocessor buffer connection means with sender and receiver buffer means, said fourth microprocessor means being connected to predetermined sense and control point pairs for a plurality of trunk circuits for monitoring of sense points and writing data into control points and connectible to said first microprocessor means to send trunk states thereto and to receive next trunk states therefrom, fifth microprocessor means including fifth memory means and fifth interprocessor buffer connection means with sender and receiver buffer means, said fifth microprocessor means storing all class-of-service states and dialed number translations, and connecting requested class-of-service to said first microprocessor means and dialed number information of said third microprocessor means, and sixth microprocessor means including sixth memory means and sixth interprocessor buffer connection means with sender and receiver buffer means, said sixth microprocessor means being connected to a plurality of multi-message attendant console means for said system for monitoring of selected messages produced by attendant commands and activating selected other messages, and being connectible to said first microprocessor means to produce and send device state command signals thereto and to receive attendant command messages therefrom and means connected pairs of said microprocessors for communicating said command signals.

53. The microprocessor control means as claimed in claim 52 wherein said first microprocessor means comprises state microprocessor means.

54. The microprocessor control means as claimed in claim 52 wherein said second microprocessor means comprises line microprocessor means.

55. The microprocessor control means as claimed in claim 52 wherein said third microprocessor means comprises register microprocessor means.

56. The microprocessor control means as claimed in claim 52 wherein said fourth microprocessor means comprises trunk microprocessor means.

57. The microprocessor control means as claimed in claim 52 wherein said fifth microprocessor means comprises data base microprocessor means.

58. The microprocessor control means as claimed in claim 52 wherein said sixth microprocessor means comprises console microprocessor means.

59. The microprocessor control means as claimed in claim 52 wherein there are provided seventh microprocessor means including seventh memory means and seventh interprocessor buffer connection means with sender buffer means and receiver buffer means, said seventh microprocessor means being connected to a plurality of attendant busy lamp field means for said system for monitoring and activating of busy lamp field devices thereof, being connectible to said first microprocessor means to receive busy/idle stand command signals therefrom, and being connectible to said sixth microprocessor means to receive second busy lamp field state command signals therefrom and to send first busy lamp field state attendant response signals thereto and respective means connecting said seventh microprocessor means to said first and said sixth microprocessor means for communicating said command signals.

60. The microprocessor control means as claimed in claim 59 wherein said seventh microprocessor means comprises busy lamp field microprocessor means.

61. The microprocessor control means as claimed in claim 52 wherein the sender buffer means of said first microprocessor means is connected to the receiver buffer means of each of said second microprocessor means, said third microprocessor means, said fourth microprocessor means, said fifth microprocessor means, and said sixth microprocessor means, the sender buffer means of said second microprocessor means is connected to the receiver buffer means of said first microprocessor means, the sender buffer means of said third microprocessor means is connected to the receiver buffer means of said first microprocessor means and to the receiver buffer means of said fifth microprocessor means, the sender buffer means of said fourth microprocessor means is connected to the receiver buffer means of said first microprocessor means, the sender buffer means of said fifth microprocessor means is connected to the receiver buffer means of said third microprocessor means and to the receiver buffer means of said sixth microprocessor means, and the sender buffer means of said sixth microprocessor means is connected to the receiver buffer means of said first microprocessor means and to the receiver buffer means of said fifth microprocessor means.

62. Microprocessor control means for use in a telephone switching exchange comprising a plurality of microprocessor means distributed in a spaced multiprocessor configuration, each microprocessor means having associated stored program memory means containing predetermined selectible data programs, a first of said microprocessor means selectively connected to said switching exchange for receiving current party conditions and changed party conditions for input to said associated stored program memory means therefor, and for providing first output signals to said switching exchange from said associated program memory means therefor, said first output signals selectively controlling the operations of said switching exchange in accordance with a predetermined one of said selectible data programs of said stored program memory means thereof responsive to either said received current party conditions or to said received changed party conditions, said first microprocessor means further providing second and third output signals therefrom, a second of said microprocessor means selectively connected to said switching exchange for receiving dialed number information therefrom for input to said associated stored program memory means therefor, connectible to said first microprocessor means for receiving said second output signals therefrom for input to said associated stored program memory means therefor, said second output signals causing said second microprocessor means to process data in accordance with a predetermined one of said selectible data programs of said stored program memory means thereof, and said second microprocessor means providing dialed number information as first output signals therefrom, and a third of said microprocessor means connectible to said first microprocessor means for receiving said third output signals therefrom for input to said associated stored program memory means therefor, said third output signals causing said third microprocessor means to process data in accordance with a predetermined one of said selectible data programs of said stored program memory means therefor, and being connectible to said first microprocessor means for providing dialed number translation information and class-of-service information responsive to said dialed information, and connectible to said second microprocessor means for receiving said dialed number information comprising said first output signals from said second microprocessor means, causing said second microprocessor means to process data in accordance with another predetermined one of said selectible data programs of said stored program memory means therefor, and being connectible to said second microprocessor means for providing said dialed number translations information thereto and dedicated communication paths for providing connection for transferring signals between said microprocessor means.

* * * * *

UNITED STATES PATENT AND TRADEMARK OFFICE
CERTIFICATE OF CORRECTION

PATENT NO. : 4,256,926

DATED : March 17, 1981

INVENTOR(S) : Satyan G. Pitroda; William A. Fechalos; and Carl J. Stehman

It is certified that error appears in the above—identified patent and that said Letters Patent is hereby corrected as shown below:

Col. 6, line 23, cancel "tnose" and insert --those--.

Col. 9, line 10, cancel "a" and insert --$\underline{a}$--, line 11, cancel "b" and insert --$\underline{b}$--, line 11, cancel "c" and insert --$\underline{c}$--.

Col. 20, line 19, cancel "withinthe" and insert --within the--, line 31, cancel "procesor" and insert --processor--.

Col. 21, line 15, cancel "highorder" and insert --high order--.

Col. 24, line 59, cancel "drive" and insert --driven--.

Col. 29, line 27, cancel "gages" and insert --gates--.

Col. 30, line 17, cancel "484" and insert --482--.

Col. 31, line 6, cancel "welll" and insert --well--.

UNITED STATES PATENT AND TRADEMARK OFFICE
CERTIFICATE OF CORRECTION

PATENT NO. : 4,256,926
DATED : March 17, 1981
INVENTOR(S) : Satyan G. Pitroda; William A. Fechalos; and Carl J. Stehman It is certified that error appears in the above—identified patent and that said Letters Patent is hereby corrected as shown below:

Col. 31, line 8, after "D1-D8" insert --and DP--,
　　　　　line 61, cancel "1 to 8" and insert --1 of 8--.
Col. 35, line 66, cancel "but" and insert --bus--.
Col. 37, line 35, cancel "FLE'/C1" and insert --FLE''/C1--,
　　　　　line 60, after "memory" insert --means--.
Col. 38, line 25, cancel "program" and insert --programs--.
Col. 40, line 20, cancel "mementary" and insert --momentary--, Col. 41, line 11, cancel "n" and insert --$\underline{n}$--,
　　　　　line 16, cancel "rexceiver" and insert --receiver--,
　　　　　line 19, cancel "off" and insert --of--,
　　　　　line 46, cancel "and".
Col. 53, line 18, cancel "the" and insert --that--.
Col. 54, line 16, after "under" insert --the--.

Col. 79, last line, after "signals" insert --and--.

UNITED STATES PATENT AND TRADEMARK OFFICE
CERTIFICATE OF CORRECTION

PATENT NO. : 4,256,926

DATED : March 17, 1981

INVENTOR(S) : Satyan G. Pitroda; William A. Fechalos; and Carl J. Stehman

It is certified that error appears in the above—identified patent and that said Letters Patent is hereby corrected as shown below:

Col. 83, line 60, cancel "to cause the" and insert
--to cause that--.

Col. 85, line 10, cancel "25" and insert --28--.

Col. 87, information on the lefthand side of page was deleted in printing. Claims 39 and 40 should read:

--39. In a telephone switching system, the improvement comprising a plurality of distributed microprocessors in a distributed microprocessor control complex wherein one of said distributed microprocessors has its own instruction memory addressed only by it, a data memory having a first field addressed only by said one microprocessor as well as second and third fields, the second field including a first interprocessor buffer addressed by said one microprocessor for writing task signals therein, the third field including a second interprocessor buffer addressed by said one microprocessor for reading task signals therefrom, the first interprocessor buffer including means addressed by one other of said distributed microprocessors for reading said task signals written therein as commands for execution by said other microprocessors, and the second interprocessor buffer including means addressed by one other of said distributed microprocessors for writing task signals therein as commands for execution by said one microprocessor.

UNITED STATES PATENT AND TRADEMARK OFFICE
CERTIFICATE OF CORRECTION

PATENT NO. : 4,256,926

DATED : March 17, 1981

INVENTOR(S) : Satyan G. Pitroda; William A. Fechalos; and Carl J. Stehman

It is certified that error appears in the above—identified patent and that said Letters Patent is hereby corrected as shown below:

--40. In a telephone switching system for performing call processing, the combination comprising a plurality of microprocessor control units each having a microprocessor and each having its own clock for asynchronous operation, all of the call processing tasks of said system being partitioned along functional call processing lines, each of the microprocessors having an instruction memory programmed to constitute each respective microprocessor as means for performing a partitioned group of the total call processing tasks, the programs in the respective instruction memories differing one from the other and constructed to cause the associated microprocessors to perform the partitioned call processing tasks assigned thereto, at least some of the microprocessors having circuit connections in the switching system addressable as data memory for carrying out the partitioned tasks assigned thereto, the instruction memories of the respective microprocessors being conditioned to cause the associated microprocessor to execute task signals from another microprocessor and to produce task signals for execution by another microprocessor, the microprocessors which exchange said task signals being paired for communicating and means communicating said task signals between sending and receiving microprocessors of a pair on dedicated asynchronous communication paths joining said pair and dedicated solely to communicating between said pair, thereby to coordinate the call processing functions distributed among said microprocessors.--

UNITED STATES PATENT AND TRADEMARK OFFICE
CERTIFICATE OF CORRECTION

PATENT NO. : 4,256,926

DATED : March 17, 1981

INVENTOR(S) : Satyan G. Pitroda; William A. Fechalos; and Carl J. Stehman

It is certified that error appears in the above—identified patent and that said Letters Patent is hereby corrected as shown below:

Col. 90, line 20, cancel "to" and insert --from--.
Col. 91, line 4, cancel "of" and insert --to--,
      line 15, cancel "connected" and insert --connecting--,
      line 45, cancel "stand" and insert --state--.
Col. 92, line 66, cancel "connection" and insert --connections--.

Signed and Sealed this

Twenty-fifth Day of August 1981

[SEAL]

Attest:

Attesting Officer

GERALD J. MOSSINGHOFF

Commissioner of Patents and Trademarks